US010414464B2

(12) United States Patent
Moen

(10) Patent No.: US 10,414,464 B2
(45) Date of Patent: Sep. 17, 2019

(54) FOREPART OF A VESSEL

(71) Applicant: Rasmussen Maritime Design AS, Kristiansand (NO)

(72) Inventor: Roar Johan Moen, Tveit (NO)

(73) Assignee: Rasmussen Maritime Design AS, Kristiansand (NO)

( * ) Notice: Subject to any disclaimer, the term of this patent is extended or adjusted under 35 U.S.C. 154(b) by 0 days.

(21) Appl. No.: 15/537,888

(22) PCT Filed: Dec. 21, 2015

(86) PCT No.: PCT/EP2015/080842
§ 371 (c)(1),
(2) Date: Jun. 20, 2017

(87) PCT Pub. No.: WO2016/102497
PCT Pub. Date: Jun. 30, 2016

(65) Prior Publication Data
US 2017/0341712 A1 Nov. 30, 2017

(30) Foreign Application Priority Data
Dec. 22, 2014 (EP) ..................................... 14199833

(51) Int. Cl.
*B63B 1/00* (2006.01)
*B63B 1/06* (2006.01)
(Continued)

(52) U.S. Cl.
CPC .............. *B63B 1/063* (2013.01); *B63B 1/40* (2013.01); *B63B 9/02* (2013.01); *Y02T 70/125* (2013.01); *Y02T 70/126* (2013.01)

(58) Field of Classification Search
CPC .............. B63B 1/06; B63B 1/063; B63B 1/40
(Continued)

(56) References Cited

U.S. PATENT DOCUMENTS

RE26,997 E * 12/1970 Eckert .................... B63B 1/063
                                                            114/61.26
3,946,687 A * 3/1976 Taylor .................... B63B 1/063
                                                            114/61.28
(Continued)

FOREIGN PATENT DOCUMENTS

EP          1457416          9/2004
EP          1457416 Y        9/2004
(Continued)

OTHER PUBLICATIONS

ISRWO of Apr. 11, 2016, submitted, inter alia, as statement of relevance for non-English refs.

*Primary Examiner* — Daniel V Venne
(74) *Attorney, Agent, or Firm* — Christian D. Abel

(57) ABSTRACT

The present invention relates to the design of seagoing vessels and can be used for most hull types from slow-moving ships and barges to high-speed ships and boats that are operated up to planing speed, and also for sailing boats. The invention relates to the design of the vessel's forepart and relates to a device that reduces the vessel's wave resistance within a wide speed range, and also reduces or eliminates spray and wave-breaking resistance.

The device comprises a body that is fully or partly submerged in a mass of water and positioned at the bow area, the body working in interaction with the hull behind. The body is designed and positioned such that it displaces oncoming water mass in the vertical plane and then leads the water mass that passes on the top surface of the body away from and/or parallel to the bow area, such the hull itself, behind the body, displaces oncoming water masses to the least possible extent. A reduced resistance to forward movement from the vessel is thus obtained.

12 Claims, 35 Drawing Sheets

(51) Int. Cl.
    *B63B 1/40*     (2006.01)
    *B63B 9/02*     (2006.01)

(58) Field of Classification Search
    USPC .......................................... 114/61.27, 61.28
    See application file for complete search history.

(56) References Cited

U.S. PATENT DOCUMENTS

| | | | |
|---|---|---|---|
| 4,003,325 A | 1/1977 | Allen | |
| 4,335,671 A | 6/1982 | Warner et al. | |
| 4,550,673 A * | 11/1985 | Ingvason | B63B 1/063 |
| | | | 114/57 |
| 4,658,746 A * | 4/1987 | Ingvason | B63B 1/063 |
| | | | 114/284 |
| 4,776,294 A * | 10/1988 | Childs | B63B 39/06 |
| | | | 114/126 |
| 5,090,352 A * | 2/1992 | Stanford | B63B 1/06 |
| | | | 114/162 |
| 5,280,761 A * | 1/1994 | Karafiath | B63B 1/063 |
| | | | 114/288 |
| 5,566,634 A * | 10/1996 | Petromanolakis | B63B 1/06 |
| | | | 114/61.27 |
| 5,598,802 A * | 2/1997 | Ramde | B63B 1/04 |
| | | | 114/167 |
| 5,711,239 A * | 1/1998 | Ramde | B63B 1/04 |
| | | | 114/57 |
| 6,457,422 B1 | 10/2002 | Elms | |
| 6,893,304 B1 * | 5/2005 | Andersen | B63B 1/042 |
| | | | 114/61.28 |
| 7,191,725 B2 * | 3/2007 | Loui | B63B 1/063 |
| | | | 114/274 |
| 8,261,681 B2 * | 9/2012 | Wobben | B63H 9/02 |
| | | | 114/39.3 |
| 8,875,644 B2 * | 11/2014 | Tvete | B63B 1/06 |
| | | | 114/61.28 |
| 9,205,903 B2 * | 12/2015 | Rohden | B63B 39/06 |
| 9,776,691 B2 * | 10/2017 | Lavini | B63B 1/063 |
| 9,862,458 B2 * | 1/2018 | Van Oossanen | B63B 1/04 |
| 9,908,589 B1 * | 3/2018 | Bailey | B63B 1/06 |
| 2006/0137585 A1 * | 6/2006 | Levander | B63B 1/06 |
| | | | 114/49 |
| 2006/0169191 A1 * | 8/2006 | Loui | B63B 1/063 |
| | | | 114/274 |
| 2009/0223431 A1 * | 9/2009 | Loui | B63B 1/06 |
| | | | 114/274 |
| 2012/0048164 A1 * | 3/2012 | Tvete | B63B 1/06 |
| | | | 114/61.28 |
| 2014/0150704 A1 * | 6/2014 | Petromanolakis | B63B 1/40 |
| | | | 114/274 |
| 2015/0344106 A1 * | 12/2015 | Petromanolakis | B63B 1/40 |
| | | | 114/271 |
| 2016/0347424 A1 * | 12/2016 | Lavini | B63B 1/063 |
| 2017/0197687 A1 * | 7/2017 | Van Oossanen | B63B 1/04 |

FOREIGN PATENT DOCUMENTS

| | | |
|---|---|---|
| EP | 1992558 | 11/2008 |
| EP | 1992558 Y | 11/2008 |
| GB | 992375 | 3/1963 |
| GB | 992375 A | 3/1963 |
| JP | 58-43593 U | 1/1956 |
| JP | S6042187 | 3/1985 |
| JP | S6042187 A | 3/1985 |
| JP | H01314686 | 12/1989 |
| JP | H0656067 A | 1/1994 |
| WO | 2013/011332 | 1/2013 |
| WO | WO 2013/011332 A | 1/2013 |
| WO | 2014/091259 | 1/2014 |
| WO | WO 2014/091259 A | 1/2014 |

\* cited by examiner

A

B

A

B

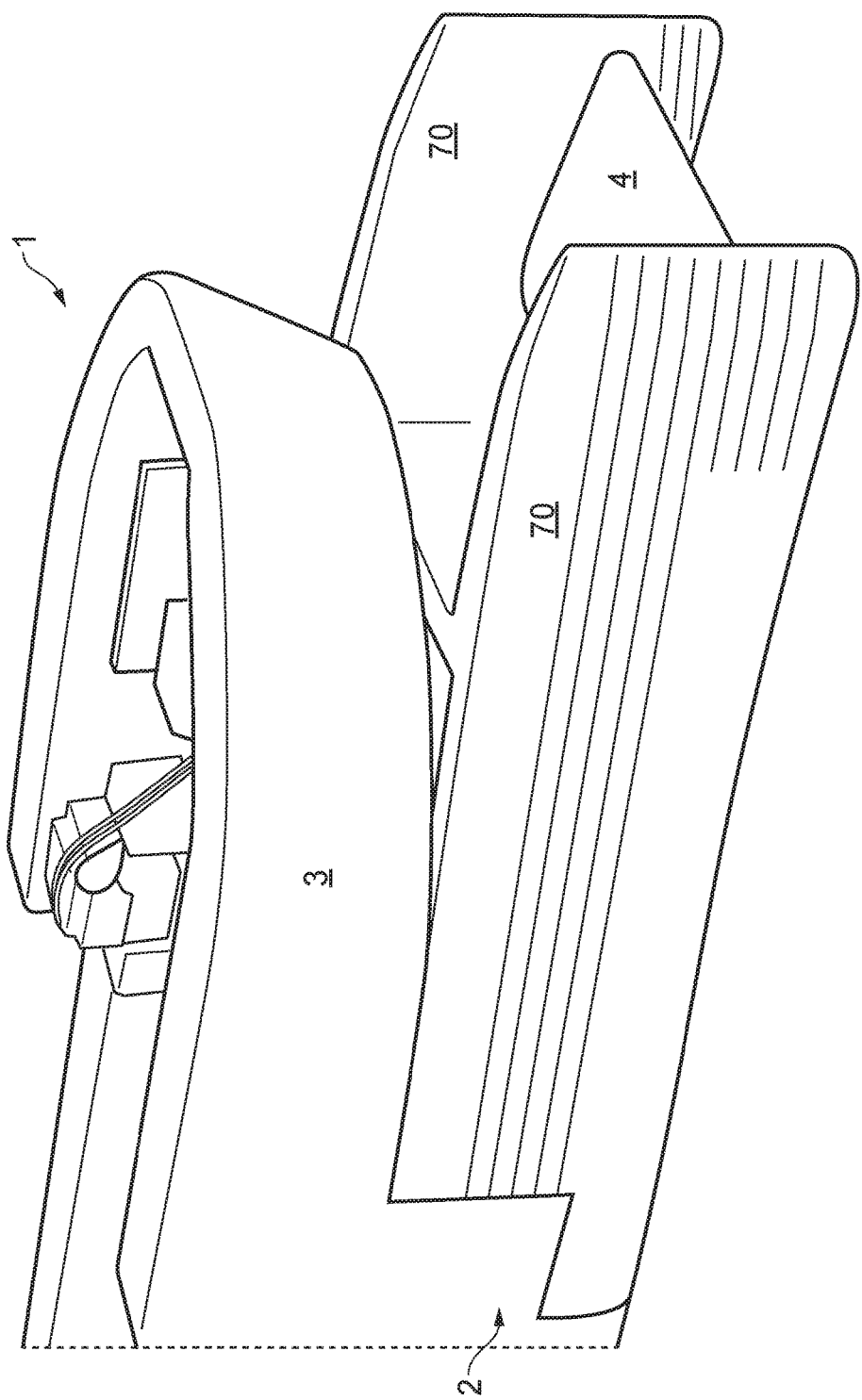

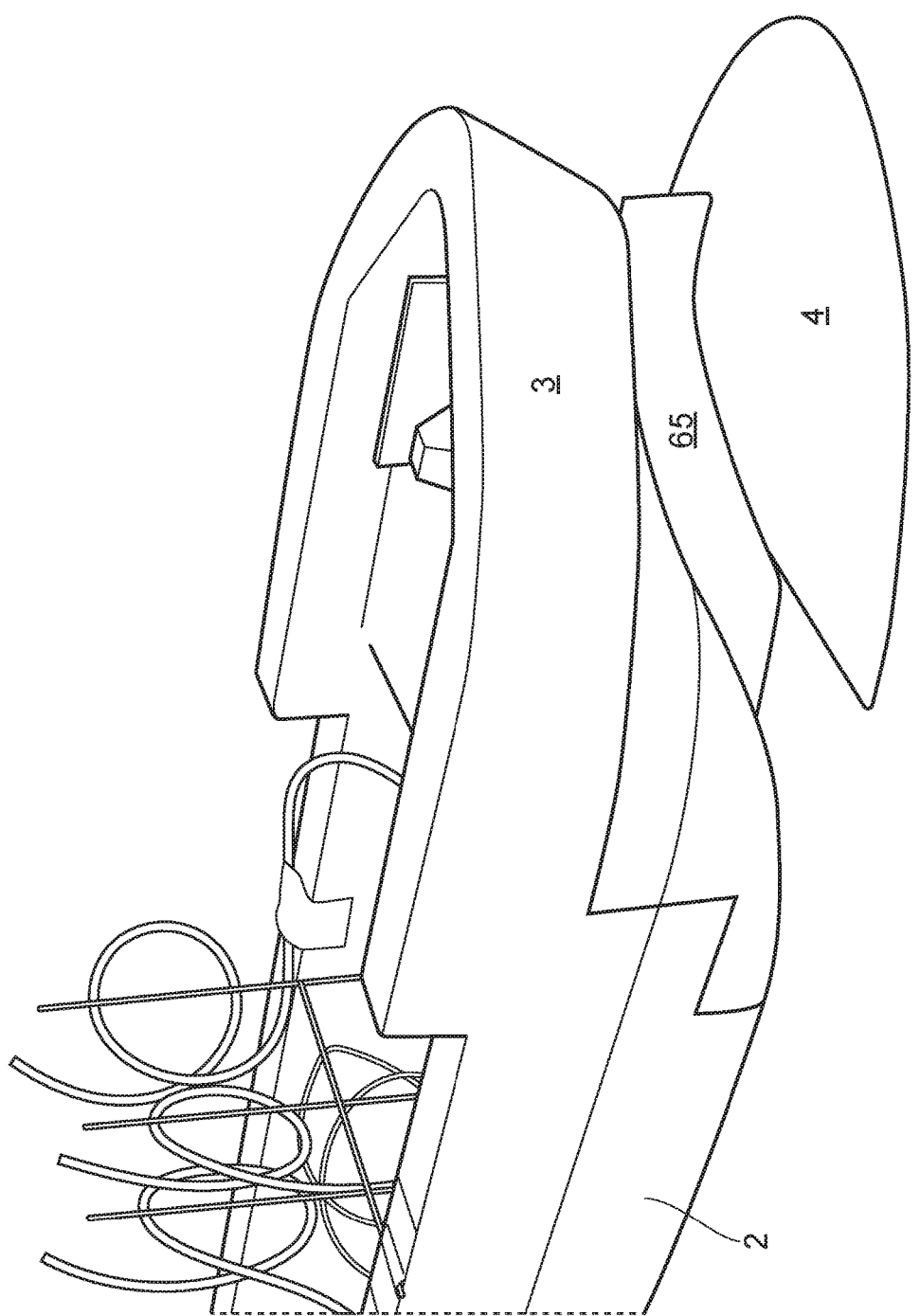

A

B

A

B

C

D

E

FOREPART OF A VESSEL

TECHNICAL FIELD OF THE INVENTION

The present invention relates to the design of seagoing vessels and can be applied to the majority of hull types, from slow-moving ships, rigs and barges to high-speed ships and boats that are operated up to planing speed, and also to sailing boats and multi hull vessels. In particular, the invention relates to the configuration of the vessel's forepart comprising a device that reduces the wave resistance of the vessel, as well as reducing or eliminating spray and wave-breaking resistance.

BACKGROUND OF THE INVENTION

When a vessel moves at the surface of a water mass, a number of different resistance factors act against the vessel's movement. The resistance coefficients for the individual components for a displacement vessel are illustrated in FIG. 1. As can be seen, the frictional resistance $C_F$ and the wave resistance $C_W$ are the two major factors. For a given vessel, Froude's number $[F_N]$ increases with increasing speed, indicated along the x-axis:

$$F_N = \frac{\text{Speed}\left[\frac{m}{s}\right]}{\sqrt{9.81\left[\frac{m}{s^2}\right] \times \text{length of vessel[m]}}} \quad (1)$$

The resistance coefficients $C_F$ and $C_W$ are multiplied by the square of the speed ($v^2$) to obtain the resistance to forward movement in Newtons [N]. Consequently, the wave resistance increases very rapidly with increasing speed.

Most vessels have a bow configuration where the water masses the vessel meets when at speed are essentially displaced laterally in the transverse direction of the vessel. As the vessel moves through the water masses, a local deceleration of the water is produced ahead of the bow, i.e., a reduction of relative water velocity relative to the hull. Further back, where the width of the hull increases, a relative acceleration of the water masses occurs, as the water is forced out to the sides, and possibly under the vessel, as a consequence of the shape of the hull. These relative changes in water velocity are the origin of wave formation and change in pressure, and are given by Bernoulli's equation:

$$\tfrac{1}{2}\rho v^2 + \rho gh + p = \text{constant} \quad (2)$$

Lower relative water velocity leads to an increase in pressure and a wave crest in relation to the surrounding water masses, whilst higher relative water velocity gives lower pressure and a wave trough.

A vessel thus forms a wave crest ahead of the vessel, where the relative water velocity is low. Further back, where the width of the hull increases, a wave trough is produced due to high relative water velocity.

The increased water velocity under the hull also results in lower pressure under the hull, and consequently loss of buoyancy when the vessel's speed increases. This resistance is included in the term wave resistance.

The waves generated by a hull in motion, and which spread to surrounding water masses, represent lost energy. The percentage of the total resistance to forward movement at sustained speed that wave resistance normally constitutes is, depending on vessel type, 30-70%, and increases sharply with increasing speed.

To reduce a vessel's resistance to forward movement, it is therefore crucial to minimise wave resistance.

PRIOR ART

Bulb

To reduce the total wave formation from a vessel, the vast majority of vessels of a certain size are today equipped with a bulb in some form or other. The bulb basically works by causing generation of an own wave in the surrounding water masses. It is attempted to have this wave as much as possible in antiphase to the hull's wave system, so as to obtain favourable wave interference. An illustration of wave formation from a prior art bulb, and the position of the water surface 5, is shown schematically in FIGS. 3A and B.

FIG. 3A is a side view of a vessel with a bulb according to the prior art. The wave system 31 generated by the vessel's bulb is in antiphase to the wave system 32 generated by the hull's bow portion, such that the resultant wave 33, which is the sum of the two wave systems 31 and 32, is virtually flat.

As the length of the wave increases with increasing speed, the problem with a bulb is therefore that the wave trough will be produced further back on the vessel when the speed increases, and further forward when the speed is reduced. The wave crests, on the other hand, will be produced at the same point, and it is therefore only within a limited speed range that the wave from the bulb and the waves from the vessel's hull will have a favourable wave interference. At speeds outside of this limited speed range, the waves from the bulb and the hull will no longer be in antiphase. This can be seen clearly from the schematic illustration shown in FIG. 3B, where the increased wave length results in the bulb's wave system 31 no longer phasing out the wave system 32 generated by the hull's bow portion, such that the resultant wave 33 increases.

In practice, a bulb works at relatively low speeds, typically from $F_N=0.23$ to $F_N=0.28$. There are however vessels where the bulb is positioned far forward in front of the bow portion of the hull such that wave cancellation occurs at higher speeds. But for most vessels, it is of little expedience to place the bulb so far forward of the bow portion. For a speed of $F_N=0.32$, the bulb must be placed about ¼ of the hull's length in front of the bow area, and for a speed of $F_N=0.4$, the bulb must be placed about ½ a hull length in front of the bow area.

Seen from in front, the bulb is often almost spherical. Alternatively, it can be made more triangular. Different configurations of conventional bulbs are shown schematically in FIGS. 4A, B and C. Broken line 5 indicates the water surface. A common feature of all bulbs is that the front area and width are small in relation to the front area and width of the hull below the water surface. Furthermore, bulbs of the prior art have a width/height ratio of about one. The position and configuration of the bulb mean that it basically displaces the water mass forward of the vessel equally in the horizontal and the vertical plane, as shown by arrows in FIGS. 4A, B and C.

Thin Wave-Making Plate

There are also other known solutions based on wave cancellation between two bodies.

Reference is made to U.S. Pat. No. 4,003,325, which describes a thin wave-making bottom plate based on wave cancellation between the wave-making plate and the hull.

U.S. Pat. No. 4,003,325 discloses that the wave-making plate has a maximum width of about ⅓ the hull width and that the vertical thickness of the plate under light loading conditions may occupy as much as ⅓ of the vessel's draft at the bow, and further that the plate is disposed substantially coplanar with the bottom of the hull. The surface area of the thin plate seen from in front is thus very small in relation to the front area of the hull below the water surface (maximum about 11%).

It is noted that the planar/straight top surface of the thin plate body, its limited thickness, and its position substantially coplanar with the hull bottom a distance below the water surface, will only to a small degree generate a wave, and that this wave will thus only to a small degree contribute to phasing out the bow wave produced by the bow lying behind.

As described above in relation to the bulb, this solution, which is based on favourable wave interference, will also only be capable of being optimised within a narrow speed range and in practice only at relatively low speeds.

Wing Profile-Shaped Flange

Reference is made to JPS58-43593U.

As explained above in relation to wave resistance, when a hull passes through a mass of water there will arise local deceleration i.e., reduced relative velocity, of the mass of water ahead of the bow. The lower relative velocity of the water mass leads to a pressure increase and a wave crest (bow wave).

The solution in JPS58-43593U seeks to reduce the height of the bow wave generated by the bow area in that a wing profile shaped flange is placed on the hull bow area below the water surface, the curved top surface of the wing profile resulting in increased velocity and consequently a lower pressure in the bow wave on the top surface of the wing profile shaped flange, which further results in a reduction in the height of the bow wave.

Lifting Foils

Among other known resistance-reducing devices, mention may be made of submerged lifting foils that lift the hull up out of the water. At the curved top surface of the foil, the water velocity increases, thereby producing a lower pressure at the top surface of the foil than at the underside of the foil. The top surface of the foil thus generates a lift.

FIG. 5A shows a mass of water flowing toward and across a foil with an initial velocity $V_0$ in the direction of the double lined arrow at position 1. The arrows pointing 90 degrees away from the foil's top surface indicates a typical underpressure distribution on the top surface of the foil, having a peak underpressure approximately at the maximum thickness of the foil profile at position 3. According to the Bernoulli equation (2), a foil having the underpressure distribution shown in FIG. 5A, will have a velocity distribution of the water mass as illustrated in FIG. 5B reaching a maximum velocity $V_{MAX}$ approximately at the maximum thickness of the foil profile at position 3. The velocity of the water mass accordingly increases from slightly behind the leading edge of the foil at position 2 to the maximum profile thickness at position 3, followed by decreasing water velocity from position 3, via position 4 at the rear top surface of the foil, to position 5, where the water mass again reaches its initial velocity $V_0$. In order to achieve this particular pressure and velocity distribution, the foil must be arranged at a sufficient depth under the water surface.

If the foil is not sufficiently submerged, the negative pressure that is formed at the top surface of the foil will cause a wave trough in the water surface as shown in FIG. 7B, where the broken line 5 indicates the water surface when the foil is not present. The foil thus produces waves, which in turn generate increased resistance. In addition to the wave formation, an insufficiently submerged foil will generate less lift.

Even in the case of sufficiently submerged foils, the lift that is generated by the foil results in a resistance which increases with increasing lift. Since the foils per se cause both frictional resistance and resistance due to lift, a reduction in total resistance will only be achieved for the hull when the hull is lifted up considerably from the water. For a hull of substantial weight, this will in itself require a great deal of energy, and thus be inexpedient. Foils will therefore primarily give lower resistance to forward movement for hulls of relatively low weight that are intended to travel at high speed.

Moreover, it is also known that submerged foils can be intended to counter the vessel's motions.

Furthermore, there are also known submerged foils of some fullness, which in addition to dynamic lift (lift due to underpressure on the top surface of the foil) are intended to give displacement buoyancy (buoyancy resulting from the volume of the foil). Here, reference is made to U.S. Pat. No. 7,191,725 B2.

Wing Board

Reference is made to JP 1-314686 which describes a guiding wing board mounted near a lower tip of a bow. The guiding wing board is described to reduce the wave-making resistance and to suppress turbulence in the bow area.

FIG. 6a of JP 1-314686 shows the pressure distribution at the top surface of the wing board and how the underpressure above the wing board lower the water surface above and behind the wing board when acting alone, c.f. also FIG. 7B in this document. The object of the wing board is to prevent the water surface in front of the bow area of a vessel from swelling up, i.e. not making a wave crest or a wave trough at the location of the bow area.

This is achieved by arranging the wing board at a lower tip of a bow, thereby generating a strong negative pressure region at the back surface of the wing board.

Furthermore, the object of the wing board is to act as a guiding wing board as shown in FIG. 5b of JP 1-314686 (marked with reference numeral 8). As can be seen from FIG. 5a of JP 1-314686, when a wind is blown into a curved wind tunnel 11 generating a large change in flow direction, a flow is separated. However, the separation of the flow is reduced or prevented due to the effect of the guiding wing board 8 shown in FIG. 5b of JP 1-314686. The total flow resistance therefore decreases. The effect of wing board according to JP 1-314686 is claimed to be exactly the same as guiding wing board in a wind tunnel.

It is noted that all the wing boards mounted to a vessel as drawn in JP1-314686 will create substantial vortex turbulence, known as "tip vortex" in the field of aviation. A vortex arises due to pressure differences at the top surface and underside of a foil (or an airplane wing). The pressure at the underside of the foil tries to equalize the underpressure at the top surface of the foil. Such a vortex is illustrated with curved arrows in FIGS. 8A, B and C (foil seen from above, from the side and from in front, respectively). The increased drag due to such a vortex can be significant and is increasing with the pressure difference between the top and bottom surface of a foil. The velocity vector of the water particles effected by the vortex is rotating around an axis about 90 degrees on the direction of travel of the vessels at the wing board's trailing edge, and is unfavorable for the total resistance of the vessel.

Consequently, the wing board according to JP1-314686 will not contribute to decreasing the resistance of the entire flow.

Vortex Inducing Wing

Patent publication JP S60 42187A discloses a wing arrangement in front of the vessel's bow that seeks to reduce wave breaking resistance by deliberate generation of wing end vortexes opposing wave breaking vortexes generated by the bow of vessel.

As a vessel travels forward, the pressure of water surrounding a bow increases, generating a bow wave. If the crest of this bow wave collapses forward it will create a wave breaking vortex. In the solutions disclosed in patent publication JP S60 42187A, this induced wave breaking vortex at the bow is cancelled by a wing end vortex with opposite direction of rotation generated in the water by a wing arranged near the waterline. Further, the wing supresses a raise of water surface ahead of the bow so that the occurrence of a bow wave breaking is reduced. The result claimed, is a significant reduction in wave breaking resistance.

For the generation of wing end vortex reference is made to FIGS. 8A, B and C, and former description in this document.

JP S60 42187A describes a fourth embodiment (cf. FIGS. 14 and 15 of JP S60 42187A) with the same effect as already described above, except for how the bow wave is suppressed. In the fourth embodiment, the wing body is arranged such that water flowing towards the wing changes direction, and thus creates a wave in anti-phase with the bow wave of the ship. The resulting wave is claimed to have considerably reduced height. In addition, also this wing is designed to create a vortex in antiphase with the wave breaking vortex created by the vessel.

Hence, the purpose of the wing is to reduce the wave breaking resistance from the bow area of a vessel.

It is apparent from FIG. 1 that the wave breaking resistance [$C_{WB}$] constitutes a minor part of the wave resistance [$C_W$] of a vessel. The wave pattern resistance [$C_{WP}$] is by far the main contributor to wave resistance [$C_W$].

General Description of the Invention

The object of the present invention is to develop a forepart that reduces the vessel's resistance to forward movement over a wide speed range. Furthermore, the present invention can improve the vessel's seagoing properties, and also allow design of vessels of greater width and shorter length compared with conventional vessels. The objects described above are achieved with a vessel according to patent claim 1. Further advantageous features are defined in the dependent patent claims.

In particular, the invention comprises a vessel comprising a hull with a bow portion defined as the portion of the hull below the water line, and forward of the widest part of the hull. The bow portion has a bow area, defined as a cross sectional area of a cross section through the widest part of the hull as seen from in front below a water surface when the vessel is lying motionless and is floating in a mass of water, and one (or more) body(ies) arranged as a forward protrusion of the bow portion, or arranged separate from but at a distance forward and in proximity to the bow portion, for example upstream of the bow portion. Note that the expression "is lying motionless" should not be interpreted strictly, but to include small movements from, for example, environmental forces such as currents, wind, etc. The body comprises one (or more) leading edge(s), one (or more) trailing edge(s) lying downstream of the leading edge(s), one (or more) underside(s) and one (or more) top surface(s). The top surface of the body comprises one (or more) forward top surface(s) that extend from the leading edge of the body to one (or more) outer contour line(s) of the body seen from in front. The contour line can, as an additional criterion, be found by drawing a line through the points of intersection where the tangents of the top surface in the vessel's direction of travel are horizontal. The highest point of the body, seen from in front, is located higher than half of the vessel's deepest draft when the vessel, without payload and without ballast, is lying motionless and is floating in a mass of water. Note that the expression 'highest point of the body' can also cover the cases where there are several highest points on the top surface and/or one or more highest flat portions. The vessel's deepest draft without payload and without ballast should be measured when the vessel's own fuel tanks and lubricating oil tanks are empty. The deepest draft is defined by the minimum depth of water a vessel can navigate without grounding. Preferably the highest point of the body, seen from in front, is located higher than half of the vessel's deepest draft in at least one of the vessel's loading conditions. More preferably, the highest point of the body, seen from in front, is located higher than ⅔ of the vessel's deepest draft measured in at least one loading condition, more favourable higher than ⅚ of the vessel's deepest draft in at least one loading condition, even more favourable higher than ⅚ of the vessel's deepest draft in at least one loading condition, for example at or near an undisturbed water line.

The shape of the body as seen in a longitudinal vertical cross section and the width of the body is, in at least one of the vessel's load conditions, further designed to displace a water mass forward of the vessel (hereafter referred to as an "oncoming water mass") over the top surface of the body. The oncoming water mass is displaced in a vertical plane along the vessel's direction of travel whereby the water obtains a laminar flow over the forward top surface of the body, preferably the whole of the forward top surface of the body, more preferably over the whole top surface of body. Further, the configuration of the top surface of the body accelerates the oncoming water mass, due to gravity, in a downward direction downstream of the contour line, such that the oncoming water mass obtains a velocity and a direction at the trailing edge of the body that leads the mass of water away from the bow area, or parallel to the bow area, or a combination thereof. Thus, the bow area itself will to the least possible extent displace the oncoming water mass, which results in reduced or no wave resistance from the bow area, and reduced wave resistance for the vessel. By reduced wave resistance here is meant reduced compared with the wave resistance from vessels with conventional bow design. Note that the terms downstream/upstream throughout this document refer to the flow line of the water mass in the position in question.

In an advantageous embodiment, the top surface of the body is further configured such that the oncoming water mass obtains a direction downstream of the contour line that leads the oncoming mass of water away from the bow portion, or parallel to the bow portion, or a combination thereof. Note that the expression 'parallel to the bow portion means that the whole of the water mass that is on the top surface of the body, in the event of displacement past the bow portion is displaced at an angle of attack of less than 25 degrees relative to the flow line the water mass would have had if the bow area had been removed, more advantageously at an angle of attack of less than 15 degrees, even more advantageously at an angle of attack of less than 10 degrees for example exactly parallel.

In another advantageous embodiment, said acceleration comprises a lifting of the oncoming water mass upstream of the contour line.

In another advantageous embodiment, the leading edge of the body extends out to the largest width of the body, seen from above.

In another advantageous embodiment, the leading edge of the body is located upstream of the bow area.

In another advantageous embodiment, the body is arranged such that the leading edge of the body is below or at the water surface in at least one of the vessel's load conditions when the vessel is lying motionless and is floating in a mass of water. The word 'at' here should not be interpreted strictly but to allow the leading edge to project slightly above the water surface.

In another advantageous embodiment, the body is positioned such that the body's highest point, seen from in front, is located higher than ¾ of the vessel's deepest draft, the term deepest draft defined as the vertical distance from the water line to the vessel's lowest point when the vessel, without payload and without ballast, is lying motionless and is floating in a mass of water. For example, the highest point of the body is located at or higher than the water surface. Note that the deepest draft of the vessel can be determined by the vessel's rudder, propeller, the body or another part of the vessel.

In another advantageous embodiment, the contour line of the body and its leading edge, in at least one of the vessel's load conditions, is positioned such that more than 20% of the oncoming water mass is lifted above the water surface.

In another advantageous embodiment, the trailing edge of the body, seen in one vertical section, is pointed or almost pointed, or has any other shape that results in a marked boundary between the top surface and underside of the body. The term 'pointed' should here not be interpreted strictly but also to allow a somewhat blunt or rounded shape. Another definition of 'pointed' may also be that the trailing edge of the body is shaped such that no turbulence or least possible turbulence is generated in the area where the water masses leave the body. Another definition of 'pointed' may be that the trailing edge of the body has, in a vertical section, a maximum thickness that is less than 5% of the body's maximum thickness, for example, less than 3%. Alternatively, the trailing edge of the body, seen in one vertical section, may have a shape identical to, or almost identical to, the trailing edge of a hydrofoil, for example like the trailing edge of one or more hydrofoils illustrated in patent publication U.S. Pat. No. 6,467,422B1 or GB 992375A or JPH0656067A or U.S. Pat. No. 4,335,671A. All these patent publications are included by reference.

In another advantageous embodiment, the shape of the body as seen in a longitudinal vertical cross section of the body and the width of the body, in at least one of the vessel's load conditions, are configured such that more than 20% of the oncoming water mass that passes over the top surface of the body is led under the hull, more advantageously more than 30%, even more advantageously more than 40%, even more advantageously more than 50%, even more advantageously more than 60%, even more advantageously more than 70%, even more advantageously more than 80%, even more advantageously more than 90%, for example 100%. The expression 'under the hull' means below the hull between two vertical plane in the vessel's direction of travel and spaced apart at a distance corresponding to the maximum width of the bow portion at the water surface when the vessel is seen from in front. An example of a vertical section configuration in the direction of travel of the vessel is to adjust the position of the body's trailing edge until a desired velocity vector is obtained. This can be achieved by altering the angle of attach of the body.

In another advantageous embodiment, the body is arranged at a distance from the bow portion, such that at least one passage is formed between the body and the bow portion.

In another advantageous embodiment, the trailing edge of the body is arranged at a distance from the bow portion such that the hull, in at least one of the vessel's load conditions, prevents the part of the oncoming water mass that is led under the hull from rising. Note here that the distance of the trailing edge from the bow portion can be either in the horizontal plane or in the vertical plane or a combination thereof. Note further that the expression 'prevents the oncoming water mass from rising' is intended to mean that this mass of water is held down by the hull, so that the hull prevents or reduces the formation of waves that spread to the surrounding water masses.

In another advantageous embodiment, the body's maximum width (B) divided by the body's maximum height (H), seen from in front, is greater than 1.5 but preferably less than 8.0, for example 4.0.

In another advantageous embodiment, the area of the body, seen from in front, constitutes more than 20% of the bow area at the vessel's maximum draft, more advantageously more than 30%, even more advantageously between 40 and 100%, for example 50%. The area of the body, seen from in front, can be calculated either i) as the maximum cross sectional area of the body or preferably ii) also take into account the trim of the body.

In another advantageous embodiment, the body has a maximum vertical height (H) of which is equal to at least 40% of the hull's draft when the vessel is neutrally trimmed and loaded with 10% of the vessel's maximum payload, more advantageously at least 50% of the hull's draft, even more advantageously at least 60%, even more advantageously at least 70%, for example 75% of the hull's draft.

In another advantageous embodiment, the body has a maximum width, seen from in front, that is at least ⅜ of the hull's maximum width, seen from in front, more advantageously at least ⅝ of the hull's maximum width, even more advantageously at least ⅞ of the hull's maximum width, for example, the whole of the hull's maximum width.

In another advantageous embodiment the top surface of the body comprises at least one convex portion that constitutes more than 10% of the top surface, more advantageously more than 20% of the top surface.

In another advantageous embodiment, the underside of the body, seen in a vertical section along the vessel's direction of travel, is straight. Alternatively, the underside of the body can be configured with at least one convex portion or at least one concave portion, or a combination thereof.

In another advantageous embodiment, the body forms an asymmetrical profile in the vessel's direction of travel.

In another advantageous embodiment, the top surface of the body downstream of the contour line has a configuration which, in at least in one of the vessel's load conditions, results in the oncoming water mass that passes on the top surface of the body is lowered down to, or below, the height position of the leading edge of the body before the oncoming water mass meets the hull.

In another advantageously embodiment, the leading edge of the body has a straight shape or a curved shape, seen from above, or a combination thereof.

In another advantageous embodiment, the trailing edge of the body has a straight shape or a curved shape, seen from above, or a combination thereof.

In another advantageous embodiment, the shape of the body as seen in a longitudinal vertical cross section and the width of the body, in at least one of the vessels load conditions, is designed to lead more than 50%, of a lifted water mass, caused by the displacement of the body, in over the forward top surface of the body. The proportion of the lifted water mass that is led in over the forward top surface of the body is thus supplied with potential energy that can be utilised downstream of the top surface contour line to give the water mass increased velocity at the trailing edge of the body. Note that by increased velocity here is meant a higher velocity than if the water mass had not been lifted above the water surface. Said proportion of lifted water mass can more advantageously constitute over 60%, even more advantageously over 70%, for example 80%.

In another advantageous embodiment, the area of the body (body area), seen from in front, in at least one of the vessel's load conditions, constitutes more than 20% of the part of the bow area located behind the body between two vertical planes in the vessel's longitudinal direction and spaced apart at a distance corresponding to the maximum width of the body.

More advantageously, said body area constitutes more than 30% of said part of the bow area, even more advantageously more than 40%, even more advantageously more than 50%, even more advantageously more than 60%, even more advantageously more than 70%, even more advantageously more than 80%, for example 90%.

In another advantageous embodiment, the width of the body and its position in relation to the water surface, are selected so that, in at least one of the vessel's load conditions, more than 50%, of the oncoming water mass that passes over the top surface of the body is isolated from the surrounding water masses. An isolation of this kind will give as a result that the isolated water mass can be accelerated without significant pressure drop and wave formation in the surrounding water masses. Said proportion of oncoming water mass that is isolated from surrounding water masses can more advantageously constitute over 60%, even more advantageously over 70%, even more advantageously over 80%, for example 100%.

In another advantageous embodiment, the underside of the body, in at least one of the vessel's load conditions, is shaped and/or angled to provide dynamic lift such that the body obtains unchanged, or almost unchanged, buoyancy compared with when the vessel is lying motionless and is floating in a mass of water.

In another advantageous embodiment, the vertical position of the body relative to water surface, in at least one loading condition, is such that the oncoming water mass at the body's top surface downstream the maximum thickness of the body, measured along the vessel's direction of travel and 90 degrees on the body's chord line, obtains a constant or increasing velocity.

In another advantageous embodiment, the vertical position of the body relative to water surface is such that the pressure in the oncoming water mass is constant above the top surface, downstream of the outer contour line.

In another advantageous embodiment, the body's cross sectional area, seen from in front, is decreasing in height towards edges or sides in the body's transverse direction such that the pressure built up at the body's underside and the pressure built up at the body's top surface is equalized at the edges or sides, thereby suppressing generation of vortexes.

In another advantageous embodiment, the periphery at each transverse side of the body comprises a plate extending over more than 50%, of the body along the vessel's direction of travel, the geometrical shape of the plate being designed such that the pressure at the body's underside has no or insignificant effect on the pressure at the body's top surface, thereby suppressing generation of vortexes. The plates may alternatively follow the curvature of the body's edges or sides over more than 50% of the body, or a combination thereof. The plates may be directed vertically, i.e. with a main component in the vertical direction. The term 'vertical' is herein defined as a direction perpendicular to the body's transverse direction after the body has been positioned at the vessel's bow area.

In another embodiment, the body is incorporated as a forward protrusion of the bow portion.

In another embodiment, the body is configured with a tapering section towards the leading edge of the body and/or the trailing edge of the body when seen in the vessel's direction of travel, across at least 20% of the width of the body, preferably at least 30% of the width of the body, more preferably at least 40%, for example 100%.

In another embodiment, the body has mounted thereon at least one foil which, in at least one of the vessel's load conditions, provides dynamic lift, such that the body obtains unchanged, or almost unchanged, buoyancy compared with when the vessel is lying motionless and is floating in a mass of water.

In another embodiment, the top surface of the body, seen in a vertical section along the vessel's direction of travel, comprises at least one convex portion and at least one concave portion.

In another embodiment, the body is configured such that, in at least one of the vessel's load conditions, a negative pressure resulting from water acceleration at the underside of the body is, fully or to a significant degree, neutralised at the trailing edge of the body by the oncoming water mass from the top surface of the body.

In another embodiment, the oncoming water mass which is led over the body's top surface, forms a supercritical flow at the trailing edge of the body.

In another embodiment, the body, at its forward part, is shaped such that it only slightly forms a pressure wave upstream of the body.

In another embodiment, the body is shaped such that, in at least one of the vessel's load conditions, a stationary wave trough is formed at the trailing edge of the body along 20-100% of the vessel's width, more advantageously 30-100%, even more advantageously over 40%, even more advantageously over 60%, for example 100%. In another embodiment, the lowest point of the body is located at a distance below the water surface corresponding to between ⅔ and 3/2 of the hull's deepest draft in at least one of the vessel's load conditions, for example, without payload and without ballast.

In another embodiment, the body is formed with a tapering cross-section out towards the periphery of the body in the transverse direction over at least 20% of the length of the body in the vessel's direction of travel, for example, over at least 50% of the length of the body.

As described herein, the vessel is assumed to be operating at a speed at which the flow characteristic of the oncoming water mass, creates a laminar flow over the forward top surface of the body; cf. FIGS. 20A and B, respectively. Such a speed is within the intended speed of the vessel under operation and will differ between vessels based on vessel design. The lowest of such speeds may referred to as the "lower design speed" of the vessel, below which the flow characteristics of the oncoming water mass is turbulent flow rather than laminar flow.

Another alternative definition of the lower design speed is the speed at which the mean velocity of the oncoming water mass over the forward top surface of the body is not markedly lower than the vessel's speed; cf. FIG. 20B. In FIG. 20A said mean speed of the body's forward top surface is markedly lower.

Another alternative definition of the lower design speed is the speed at which the mean velocity of the oncoming water mass changes from markedly lower (cf. FIG. 20A) to about the same (cf. FIG. 20B) as the vessel's speed at the forward top surface of the body.

Another alternative definition of the lower design speed is the speed of the vessel at which the vessel's energy consumption undergoes a marked drop. Here, reference is made to the results from model tests given in the graph in FIG. 2 where it is estimated that the model boat in Test B undergoes a marked drop in resistance to forward movement at the speed of about 0.99 m/s. This estimate is based on visual observations of change in the flow pattern similar to the change in flow pattern as shown in FIGS. 20A and B, and that this change in Test B occurred just below 1.00 m/s.

Note that any fluid flow patterns, i.e. fluid flow directions and/or fluid velocities, around the body and/or the hull may be observed and determined by numerous measurement techniques. Examples of such measurement techniques are use of colorants in the water passing the body and the hull and/or use of light weight threads attached to the body and/or to the hull (as used in sails for sailboats). These measurement techniques may be complemented with, or replaced by, fluid flow data simulations.

General Mode of Operation of the Invention

The invention comprises a streamlined body which in at least one load condition is fully or partly submerged in a mass of water when the vessel is lying motionless, positioned ahead of the hull behind, the body working in interaction with the hull behind. The body is formed and positioned such that it displaces oncoming water masses in the vertical plane and then leads a mass of water under and/or out towards the sides of the hull behind, such that the hull itself, lying behind the body, displaces oncoming water masses to the least possible extent.

The aforementioned objects are thus achieved, namely that the vessel reduces its resistance to forward movement over a wide speed range, through:
1) reduced wave resistance; and/or
2) reduced or eliminated spray and wave-breaking resistance.

In addition, the seagoing characteristics of the vessel are improved.

The general mode of operation of the invention for the particular embodiment where the oncoming water masses are led under the hull, and the interaction between the body and the hull are explained in the rest of this section with the aid of FIGS. 9A and 9B. The position of water surface is shown by a broken line.

The invention reduces the resistance to forward movement of the vessel. The invention causes formation of a wave trough along a large part of the width of the hull by positioning a wide streamlined body ahead of the hull. The bottom of the wave trough is determined by the defined trailing edge of the body.

The wave trough is created by displacing a substantial proportion of the oncoming water mass in over the leading edge of the body, which is accelerated over the body's curved top surface. The whole or parts of the water mass are lifted, preferably above the water surface. At the rear top surface of the body, the water mass is lowered, due to gravity, in a downward direction and obtains increased relative velocity in relation to the vessel at the trailing edge of the body. As the water mass on the top surface of the body has increased relative velocity at the trailing edge of the body, the extent of the water mass in the vertical plane will decrease. This, together with the velocity vector of the water mass at the trailing edge of the body, forms the wave trough.

Because of the profile of the body and its width, more than 50% of the water mass that is lifted in front of the body (owing to the body's displacement of oncoming water masses) will be led in over the top surface of the body instead of escaping to surrounding water masses as waves. The whole of the water mass that is led in over the top surface of the body is accelerated and will to a great extent be isolated from the surrounding water masses. Displacement of oncoming water and change in water velocity at the top surface of the body thus results only to a small extent in waves in the surrounding water masses beyond the intended wave trough produced behind the body.

The underside of the body is shaped and/or angled to balance the whole or parts of the weight from the masses of water that pass over the top surface of the body, so that the forepart to the least possible extent undergoes a change in draft while at speed.

The hull bow portion is located in the wave trough created at the rear edge of the body, so that the bow portion itself does not displace water masses displaced by the body. The bow portion remains dry or basically dry, while at speed. Further, the vessel's hull prevents the wave trough produced by the body from rising, thereby preventing the wave trough from propagating further in the surrounding water masses as waves.

The force exerted on the body in order to form the wave trough, so as to lead an oncoming water mass away from the bow portion, will result in a resistance for the vessel. However, it is the case that a properly designed body will exert less resistance on the vessel than the wave resistance that is exerted on a vessel of conventional design.

While at speed in waves, the body acts as a stabiliser by countering pitching motions for the vessel. Oncoming waves will to a large extent be flattened out by the top surface of the body and led under the bow portion without resulting in slamming against the bow portion. The weight of the wave crests on the top surface of the body will seek to weigh the vessel down, and therefore a wave crest will not cause displacement buoyancy in the same way as for a conventional bow. Similarly, a wave trough will reduce the weight of the water mass at the top surface of the body.

The body will also be able to utilise parts of the potential energy that oncoming wave crests represent for forward movement when the wave crests is lowered, due to gravity, in the downward direction at the rear top surface of the body or as increased speed of the water mass that is led under the vessel's hull.

Since the vessel's seagoing characteristics are improved, waves will to a lesser degree limit the vessel's speed in waves.

To help understand the physics involved and how the invention is working, it should be noted that the velocity distribution of a water mass passing the top surface of a foil located close to the water surface, as is the case for the invention, will be fundamentally different from the same foil located deeper under the water surface. FIGS. 6A and B can help illustrate this. In FIG. 6A it is shown a ball rolling in air over a profile having the same shape as the foil shown in FIG. 5A. The ball has an initial velocity $V_0$ at position 1 and at "the leading edge" of the profile at position 2. Due to the gravitational force, the velocity is gradually reduced until the ball reaches a minimum velocity $V_{min}$ at the thickest part of the body profile at position 3. From position 3, via a position 4 at the rear top surface of the profile, to position 5, the velocity of the ball increases until the initial velocity $V_0$ has been regained at position 5. FIG. 6B illustrates the velocity V of the ball graphically at position 1 to 5. When comparing FIG. 6B with FIG. 5B (sufficiently submerged foil) it can be seen that the velocity distribution of the two examples are fundamentally different.

FIGS. 7A, B and C illustrate schematically the streamlines of a mass of water flowing with an initial velocity $V_0$ over a foil in the direction of the double lined arrow. The straight water surface 5 is indicated in the figures.

In FIG. 7A the body is submerged deep under the water surface. The foil thus generates a lift, and the velocity of the water mass passing the top side of the foil is decreasing from the thickest part of the foil profile towards the trailing edge of the foil.

In FIG. 7B the body is submerged at an intermediate location under the water surface. The foil still generates a lift, and the velocity of the water mass passing the top side of the foil is still decreasing from the thickest part of the foil profile towards the trailing edge of the foil. The underpressure at the top side of the foil thus creates at wave trough at the water surface as indicated.

In FIG. 7C the body is located at, or close to, the water surface. With this arrangement of the top surface of the foil a lift is not generated, and the velocity of the water mass passing the top side of the foil is increasing from the thickest part of the foil profile towards the trailing edge of the foil, where the water mass might forms a supercritical flow at the trailing edge.

Differences from the Prior Art

With reference to the description above, the invention differs from the prior art in the following areas:

Bulb:
1. A bulb is designed to generate a wave in the surrounding water masses, which at a given speed is as much as possible in antiphase to the hull's wave system. The invention however is designed to produce a stationary wave trough, independent of the vessel's speed, in a large part of the hull width, and where the hull bow area is located such that the bow area itself displaces as little water as possible.
2. A bulb works within a narrow speed range, whereas the invention works over a wide speed range.
3. A bulb works in practice only at lower speeds determined by the distance between the bulb and the hull behind, whereas the invention also functions at higher speeds without the body being moved further forward.
4. For a vessel with a bulb, it will be the vessel's bow area that displaces oncoming water masses because of the limited area of the bulb seen from in front, whereas in the case of the invention it is the body that displaces all or a substantial proportion of the oncoming water masses and leads them away from the bow area.
5. A bulb will displace approximately equally large water masses in the horizontal plane as in the vertical plane, whilst the body according to the invention displaces the water masses in the vertical plane, as the body has a significantly larger width/height ratio than a bulb, seen from in front.
6. A bulb does not have a defined trailing edge, unlike the body, which does have a defined trailing edge.
7. A bulb, unlike the invention, is not designed to impart to the water particles that pass over its top surface a velocity and direction at its trailing edge that leads the water particles away from the bow area and/or parallel to the bow area, such that the bow area itself displaces as little water as possible.

Thin Wave-Making Plate (U.S. Pat. No. 4,003,325):
1. The thin plate according to U.S. Pat. No. 4,003,325 is configured to make a wave in the surrounding water masses which, at a given speed, is as much as possible in antiphase to the hull's bow wave. The invention, on the other hand, is designed to produce a stationary wave trough, independent of the vessel's speed, in a large part of the hull width where the bow area is located such that the bow area itself displaces as little water as possible.
2. The thin plate according to U.S. Pat. No. 4,003,325 works within a narrow speed range, whereas the invention works over a wide speed range.
3. The thin plate according to U.S. Pat. No. 4,003,325 works in practice only at lower speeds determined by the distance between the leading edge of the thin plate and the hull behind, whereas the invention also works at higher speeds without the body being moved further forward.
4. For a vessel equipped with the thin plate according to U.S. Pat. No. 4,003,325, it will be the vessel's bow area that displaces oncoming water masses because of the limited area of the thin plate seen from in front; cf. U.S. Pat. No. 4,003,325 with appurtenant FIG. 5, whereas in the case of the invention, it is the body that displaces all, or a substantial proportion, of the oncoming water masses and leads them away from the bow area.
5. The thin plate according to U.S. Pat. No. 4,003,325 has a straight/planar top surface. The straight/planar top surface of the plate will thus not accelerate the water mass that passes on the top surface of the thin plate. The body according to the invention will, on the other hand, have a top surface that is configured to accelerate the water that passes on the body's top surface.
6. The highest point of the thin plate according to U.S. Pat. No. 4,003,325, seen from in front, is located lower than half the vessel's deepest draft when the vessel, without payload and without ballast, is lying motionless and is floating in a mass of water, unlike the body according to the invention.
7. The straight/planar top surface of the plate according to U.S. Pat. No. 4,003,325 can only to a very limited degree control the mass of water that passes over its top surface, whereas the primary object of the top surface of the body, on the other hand, is to be configured so that water mass on the top surface of the body is controlled and given a desired velocity vector at the trailing edge of the body.
8. The thin plate according to U.S. Pat. No. 4,003,325, unlike the invention, is not configured so that its top surface accelerates the water particles that pass the top surface to impart the water particles a velocity and direction at its trailing edge which leads the water particles away from the bow area and/or parallel to the bow area, such that the bow area itself displaces as little water as possible.

Wing Profile Shaped Flange (JPS58-43593U):

1. The wing profile shaped flange according to JPS58-43593U seeks to reduce the height of a bow wave already formed by the vessel's bow area by giving the mass of water that forms the bow wave increased velocity at the top surface of the wing profile. The body according to the invention, on the other hand, is configured to impart to the water mass at its trailing edge a velocity and direction that leads the water mass away from the bow area and/or parallel to the bow area before the water mass meets the bow area, so that the bow area itself displaces as little water as possible.
2. The description in JPS58-43593U uses the term "wing profile-shaped flange" which means that the size of the wing profile is limited. According to JPS58-43593U, it is primarily the vessel's bow area that displaces oncoming water masses and the wing profile shaped flange displaces only a small proportion of the oncoming water masses the vessel must displace; cf. JPS58-43593U with appurtenant FIG. 3. In the case of the invention, on the other hand, the body displaces all, or a substantial proportion, of the oncoming water masses and leads them away from the bow area.
3. The top surface of the wing profile-shaped flange has an outer contour line, seen from in front, that lies adjacent to the bow area; cf. JPS58-43593U with appurtenant FIG. 3 and FIG. 1. The water mass that passes over the top surface of the flange therefore cannot be lowered in the downward direction downstream of this contour line due to gravity, in contrast to the invention.
4. According to JPS58-43593U, the top surface of the wing profile-shaped flange, is not configured such that the oncoming water mass that passes over the top surface obtains a direction downstream of the contour line that leads the water mass away from and/or parallel to the bow area, unlike at least one embodiment of the invention.
5. According to JPS58-43593U, the leading edge of the wing profile shaped flange extends right out to the maximum width of the flange. The wing profile shaped flange therefore does not have a defined trailing edge.

Lifting Foil (for Example U.S. Pat. No. 7,191,725 B2):

1. The solution in U.S. Pat. No. 7,191,725 B2 describes bodies that are configured to create lift ("lifting body"). The object of the body according to the invention is not to create lift, but to prevent the formation of waves at the bow area.
2. The solution in U.S. Pat. No. 7,191,725 B2 creates lift that reduces the vessel's draft while at speed, so that the vessel's total resistance is reduced. The body according to the invention is not configured to reduce the vessel's draft while at speed, so as thus to reduce the vessel's total resistance.
3. For a vessel with a lifting body according to U.S. Pat. No. 7,191,725 B2, it will primarily be the vessel's bow area that displaces oncoming water masses because of the lifting body's limited area seen from in front and its location relative to the bow area, whereas in the case of the invention it is the body that displaces a substantial proportion of the oncoming water masses and leads them away from the bow area.
4. According to U.S. Pat. No. 7,191,725 B2, the lifting body's highest point, seen from in front, is located lower than half of the vessel's deepest draft when the vessel, without payload and without ballast, is lying motionless and is floating in a mass of water, unlike the body according to the invention.
5. The lifting body according to U.S. Pat. No. 7,191,725 B2, unlike the invention, is not configured to impart to the water particles that pass over its top surface a velocity and direction at its trailing edge that leads the water particles away from the bow area and/or parallel to the bow area, such that the bow area itself displaces as little water as possible.
6. The water mass at the top surface of the lifting body according to U.S. Pat. No. 7,191,725 B2 will have a decreasing velocity over its rear top surface, cf. FIGS. 7A and B. The water mass at the top surface of the body according to the invention will have an increasing velocity over its rear top surface, cf. FIG. 7C.

Wing Board (JP 1-314686):

1. The wing board according to JP 1-314686 is located at sufficient depth under the water surface to obtain a strong negative pressure region at the back surface of the wing board. This is in contrast to the invention where the top surface of the body is located sufficiently high relative to the water surface to avoid a substantial underpressure at the top surface of the body.
2. The wing board according to JP 1-314686 is designed and located to create a strong underpressure in a mass of water which shall equalize an overpressure created by the bow area of the hull (i.e. not create a wave crest and not create a wave trough). To the contrary, the body according to the invention is designed to create a stationary wave trough, independent of the speed of the vessel, in a substantial part of the width of the hull, wherein the bow area is arranged such that the bow area itself displaces as little water as possible.
3. The wing board according to JP 1-314686 is located lower than half the vessel's deepest draft, when the vessel, without payload and without ballast, is lying motionless and is floating in a mass of water, contrary to the body according to the invention.
4. For a vessel with a wing board according to JP 1-314686, it will be the vessel's bow area that displaces oncoming water masses because of the limited area of the wing board seen from in front. Whereas in the case of the invention it is the body that displaces all or a substantial proportion of the oncoming water masses and leads them away from the bow area.
5. The wing board according to JP 1-314686 will generate a substantial vortex. The body according to the invention is designed and arranged in such a way that a vortex is not created or to a smallest possible degree.
6. The wing board according to JP 1-314686 is, in contrast to the invention, not designed to give the water particles passing over its top surface a speed and direction at its trailing edge which leads the water particles away from the bow area and/or substantially parallel to the bow area (ref. also the vortex created by JP 1-314686) such that the bow area itself displaces as little water as possible.
7. The water mass at the top surface of the wing board according to JP 1-314686 will have a decreasing velocity over its rear top surface, cf. FIG. 7B. The water mass at the top surface of the body according to the invention will have an increasing velocity over its rear top surface, cf. FIG. 7C.

Vortex Inducing Wing (JP S60 42187A):

1. The wing according to solution in JP S60 42187A is designed to generate vortex having opposite direction of rotation to the wave breaking vortex generated by the bow of a ship. The body of the invention, on the other hand, is designed and arranged to prevent creation of a vortex.

2. The solution JP S60 42187A is designed to reduce the wave breaking resistance [CWB] from the bow area of a vessel. The invention, on the other hand, is designed to reduce the wave pattern resistance [CWP], the wave breaking resistance [CWB] and the spray resistance [CS] for a vessel (cf. FIG. 1).

3. For the solution disclosed in JP S60 42187A it is mainly the bow area of the vessel that displaces the oncoming water masses since the area of the wing seen from in front is very limited (cf. FIG. 5-14 of JP S60 42187A), whereas in the case of the invention it is the body that displaces all or a substantial proportion of the oncoming water masses and leads them away from the bow area.

4. The wing disclosed in JP S60 42187A is, in contrast to our invention, not designed to give the water particles passing over its top surface a speed and direction at its trailing edge which leads the water particles away from the bow area and/or substantially parallel to the bow area such that the bow area itself displaces as little water as possible (ref also the vortex created by JP S60 42187A).

BRIEF DESCRIPTION OF FIGURES

Preferred embodiments of the present invention will now be described with reference to the attached figures, wherein:

FIG. 7A shows the flow pattern when the body is located deep under the water surface.

FIG. 10A is a top view of the forepart.

FIG. 11A is a top view of the forepart.

FIG. 12A is a top view of the forepart.

FIG. 13A is a top view of the forepart.

FIG. 14A is a top view of the forepart.

FIG. 15A is a top view of the forepart.

FIG. 17B is a line drawing made to illustrate a photograph of a front oblique view of the model boat in FIG. 17A;

FIG. 18B is a line drawing made to illustrate a photograph of a front oblique view of the model boat in FIG. 18A;

FIG. 19B is a line drawing made to illustrate a photograph where the model boat has a modified bow according to the third embodiment of the invention, as shown in FIGS. 18A and B, but without a V-wedge, and where the measured speed is 1.25 m/s;

FIG. 21A is a top view of the forepart.

FIG. 22A is a top view of the forepart.

FIG. 23A is a top view of the forepart.

FIG. 24A is a top view of the forepart.

DETAILED DESCRIPTION OF THE INVENTION

Definitions

Throughout this document, the following definition shall apply:

Vessel 1:
All displacement vessels and vessels that operate up to planing speeds.

Hull 2:
The part of the vessel 1 that is, or can come, in contact with water while at speed and which makes the vessel seaworthy, but not including the body 4 according to the invention, or bulb and the like for conventional vessels 1. The hull has a widest part 2'.

Figure 17A:
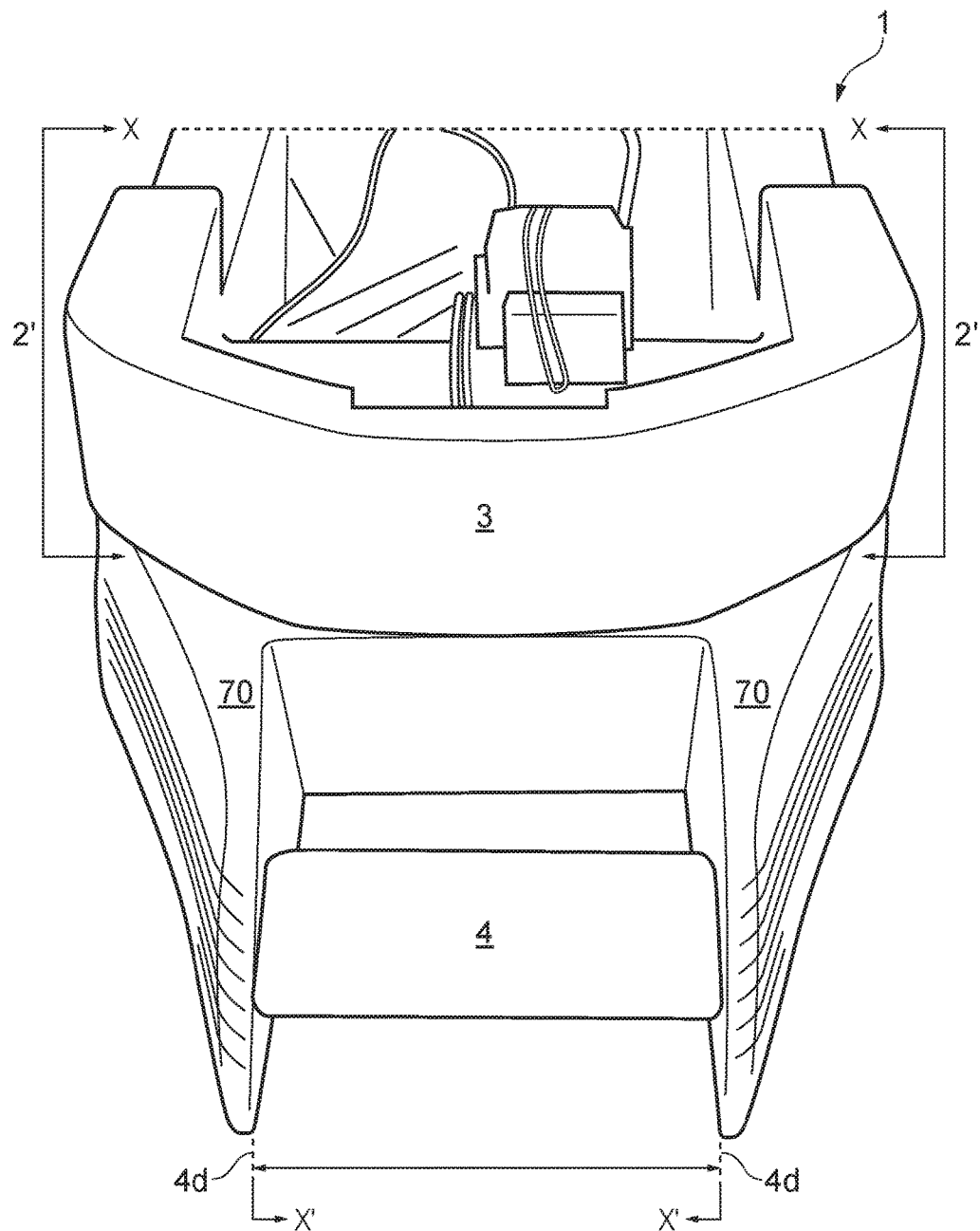
FIG. 17A shows a line drawing made to illustrate a photograph of a front view of the model boat where the bow section has been replaced by a modified bow according to the seventh embodiment of the invention.
Figure 18A:
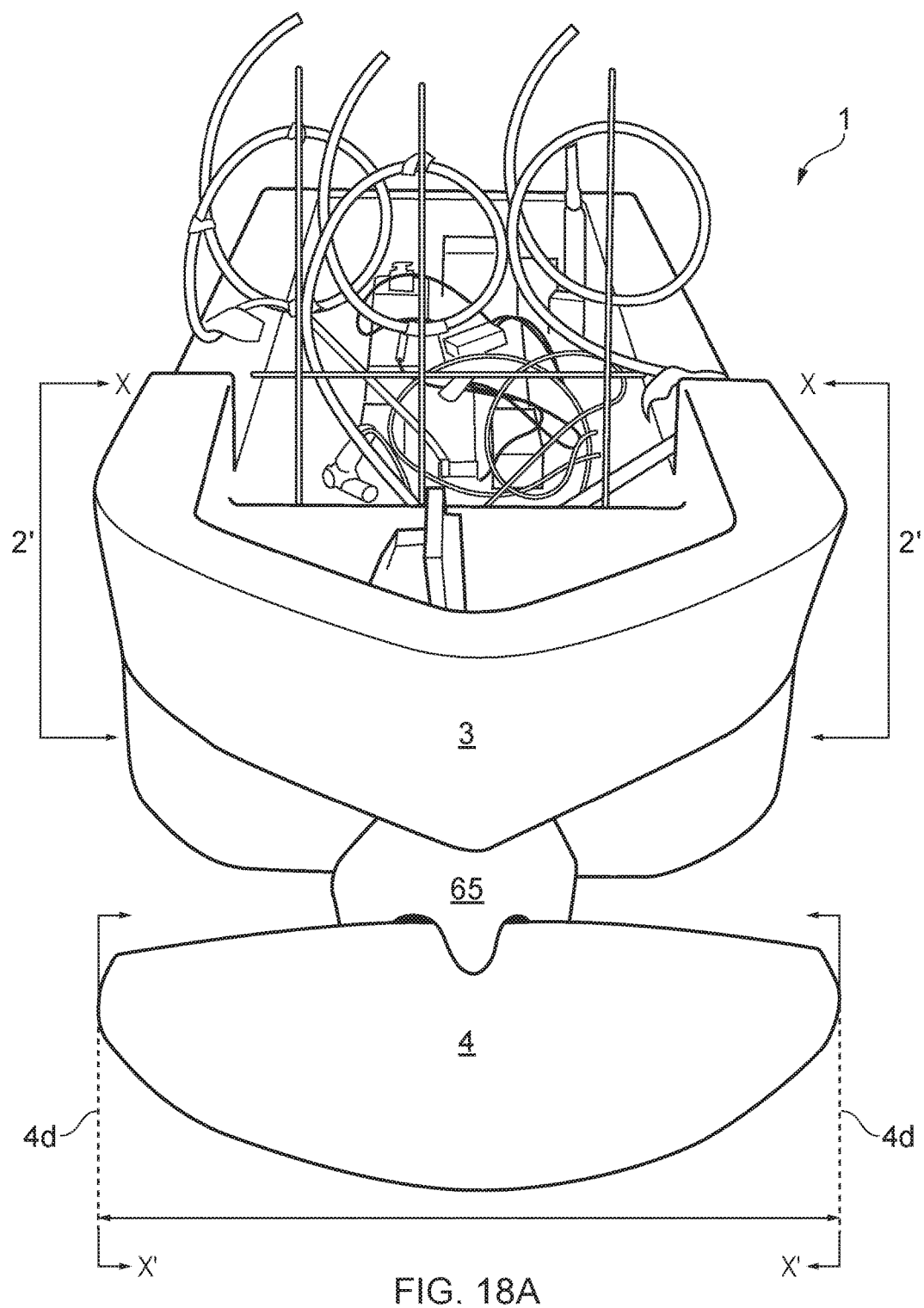
FIG. 18A is a line drawing made to illustrate a photograph of a front view of the model boat where the bow section has been replaced by a modified bow according to the third embodiment of the invention, with a V-wedge.

Bow Portion 3:
A portion of the hull 2 below a water line and forward of a cross section in the direction of arrows X at the foremost widest part 2' of the hull as illustrated in FIGS. 17A and 18A.

Bow Area 3c:
The area of a cross section in the direction of arrows X at the widest part 2' of the hull 2 seen from in front under the water surface 5 when vessel 1 is floating in a mass of water. The cross section is shown in the direction of arrows X, though the widest part of the hull 2', in FIGS. 17A and 18A, with the bow area 3c being illustrated by cross hatched areas in FIGS. 10C-15C.

The Body 4:
The body that is arranged at the bow portion 3. According to one aspect, the body is a forward protrusion of the bow portion. In another aspect the body is arranged separate from, and connected at a distance forward of the bow portion, for example by one more side plates 70.

The Body Area 4c:
The body 4 has a body area 4c defined as a projected two dimensional area of the body as seen from in front below the water line (shown as cross hatched area in FIGS. 10C-15C). The projected two dimensional area is defined by the body's maximum horizontal width X' (between vertical planes 4d in FIGS. 17A and 18A). the body's maximum height (H) and contour lines corresponding to the underside and top surface of the body as seen from in front.

Deepest draft 104: Defined as the vertical distance between the water line 5 and a lowest portion of the hull.

Water Surface 5:
A straight surface that the surface of the sea or the water forms when there are no waves.

Forepart of a Vessel 6:
From amidships in the vessel's 1 longitudinal direction up to the vessel's 1 most forward point, i.e., including the body 4 according to the invention, or bulb and the like for conventional vessels 1.

Bow Wave:
A wave crest formed ahead of the bow area 3 because of the hull's 2 deceleration of the oncoming water mass.

The Body's Leading Edge 41:
The foremost edge of the body 4, equivalent to "the leading edge" of an air plane wing.

The Body's Trailing Edge 42:
The defined rearmost edge of the body 4, where the water masses from the body's top surface 47 leave the body 4, equivalent to "the trailing edge" of an air plane wing.

Forward Top Surface 43 of the Body:
The top surface area of the body 4 that extends from the body's leading edge 41 to a contour line 53 of the body 4 seen from in front.

Rear Top Surface 44 of the Body:
The top surface area of the body 4 that starts where the body's forward top surface 43 ends and extends back to the trailing edge 42 of the body.

Underside 45 of the Body:
The underside area of the body 4 that extends from the leading edge 41 of the body to it's trailing edge 42.

Forward Part 46 of the Body:
The volume of the body 4 that extends from the leading edge 41 of the body and backwards to a vertical cross-section through the contour line 53.

Top Surface 47 of the Body:
The top surface area of the body 4 that extends from the leading edge 41 of the body and backwards to its trailing edge 42.

Contour Line 53:
A line that extends across the width of the body 4 on the body's top surface 47, formed by the highest visible point of the body 4 along the body's transverse direction when the body 4 is seen from in front. The tangent to the body 4 in the vessel's 1 direction of travel is thus horizontal at points of intersection along the whole contour line.

Interface 54:
The boundary between the body's leading edge 41 and its trailing edge 42.

Interface 55:
The boundary between the top surface 47 of the body and the bow area 3 or V-wedge 65.

Interface 56:
The boundary between the hull 2 bottom and the bow area 3.

V-Wedge 65:
A device for securing the body 4 to the hull 2 and/or to improve the flow conditions at the trailing edge 42 of the body, where the device seen from above has a V-shape or approximate V-shape.

Lifted Water Mass 80:
The total water mass, including escaped water mass 80A, that is lifted above the water surface 5 as a result of the body's 4 displacement of oncoming water masses when the vessel 1 is at speed.

Escaped Water Mass 80A:
The part of the water mass that is lifted above the water surface 5 as a result of the body's 4 displacement of oncoming water masses when the vessel 1 is at speed and which escapes as waves to the surrounding water masses.

Velocity Vector 85:
The water mass that passes over the top surface 47 of the body has at the trailing edge 42 of the body a velocity and a direction that can be given in the form of a velocity vector. This velocity vector is in turn the resultant of the velocity vector of each individual water molecule.

Figure 9:
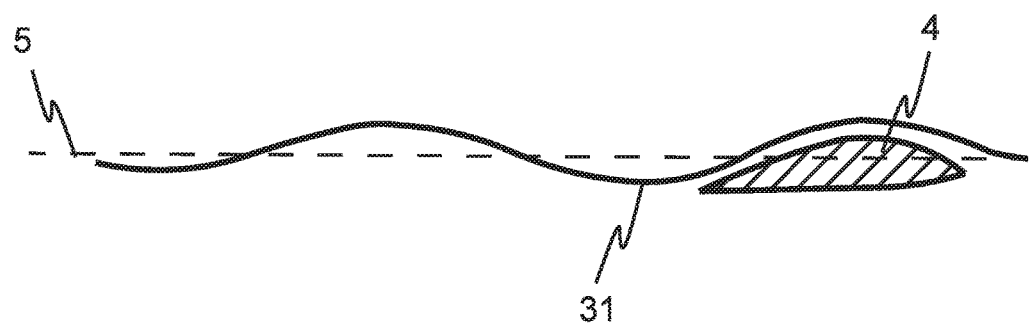
FIG. 9A is a schematic vertical longitudinal section of a body according to the invention and shows waves created by the body alone.
FIG. 9B shows schematically the interactions between the body and a hull according to the invention.
Figure 9:
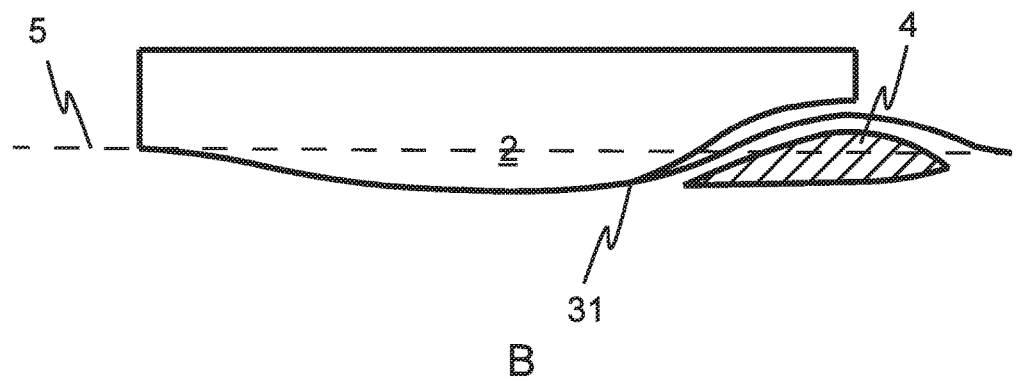
Figure 10:
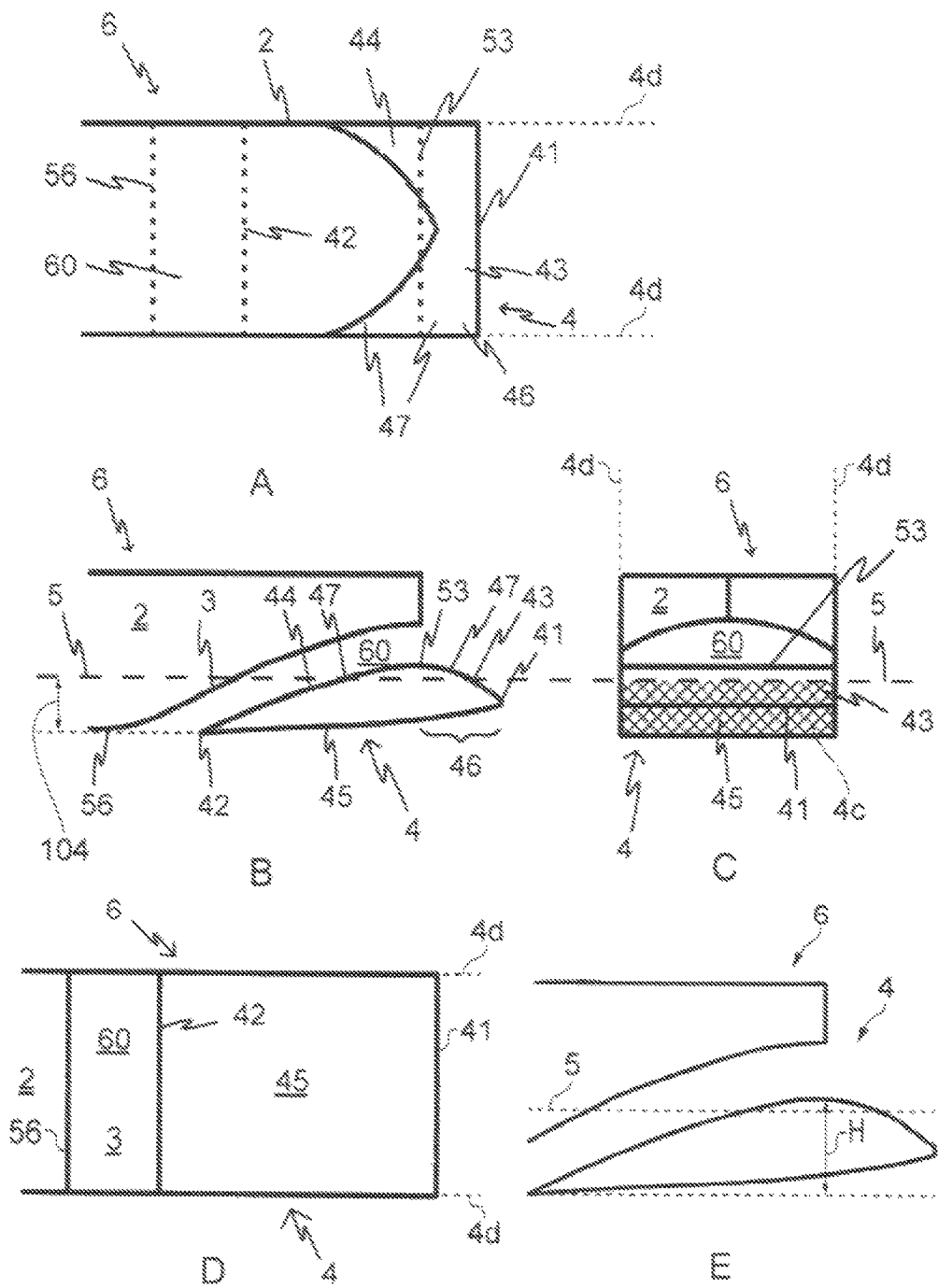
FIGS. 10A, B, C and D show the forepart of a vessel according to a first embodiment of the invention, where
FIG. 10B is a vertical longitudinal section of the forepart.
FIG. 10C is a front view of the forepart and FIG. 10D is a bottom view of the forepart.
FIG. 10E shows the maximum height (H) of the body, from a lowest point to a highest point, which when viewed from in front of the vessel will determine the body area below a water line as seen in FIG. 10C.
Figure 11:
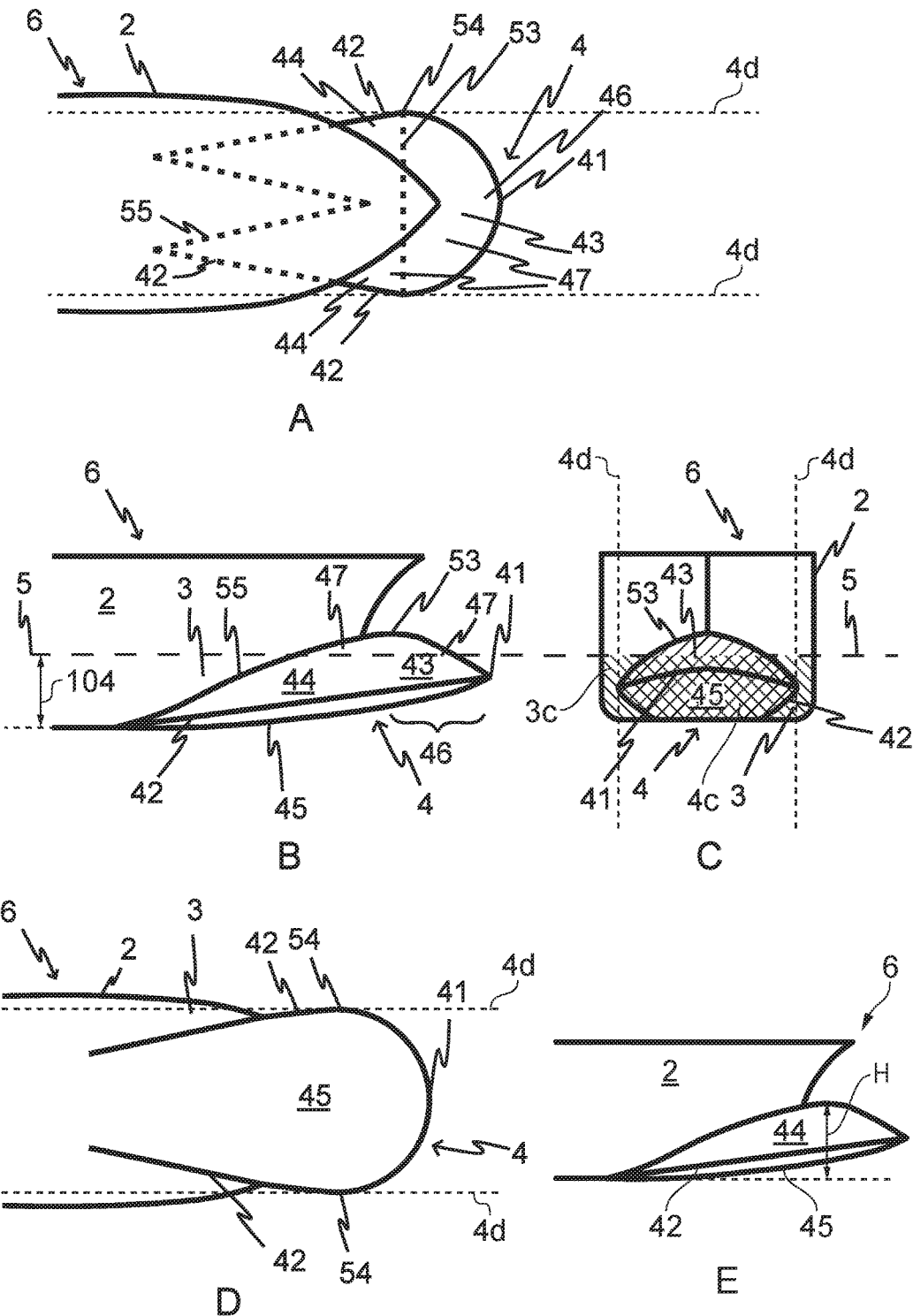
FIGS. 11A, B, C and D show the forepart of a vessel according to a second embodiment of the invention, where
FIG. 11B is a side view of the forepart.
FIG. 11C is a front view of the forepart and FIG. 11D is a bottom view of the forepart.
FIG. 11E shows the maximum height (H) of the body, from a lowest point to a highest point, which when viewed from in front of the vessel will determine the body area below a water line as seen in FIG. 11C.
Figure 12:
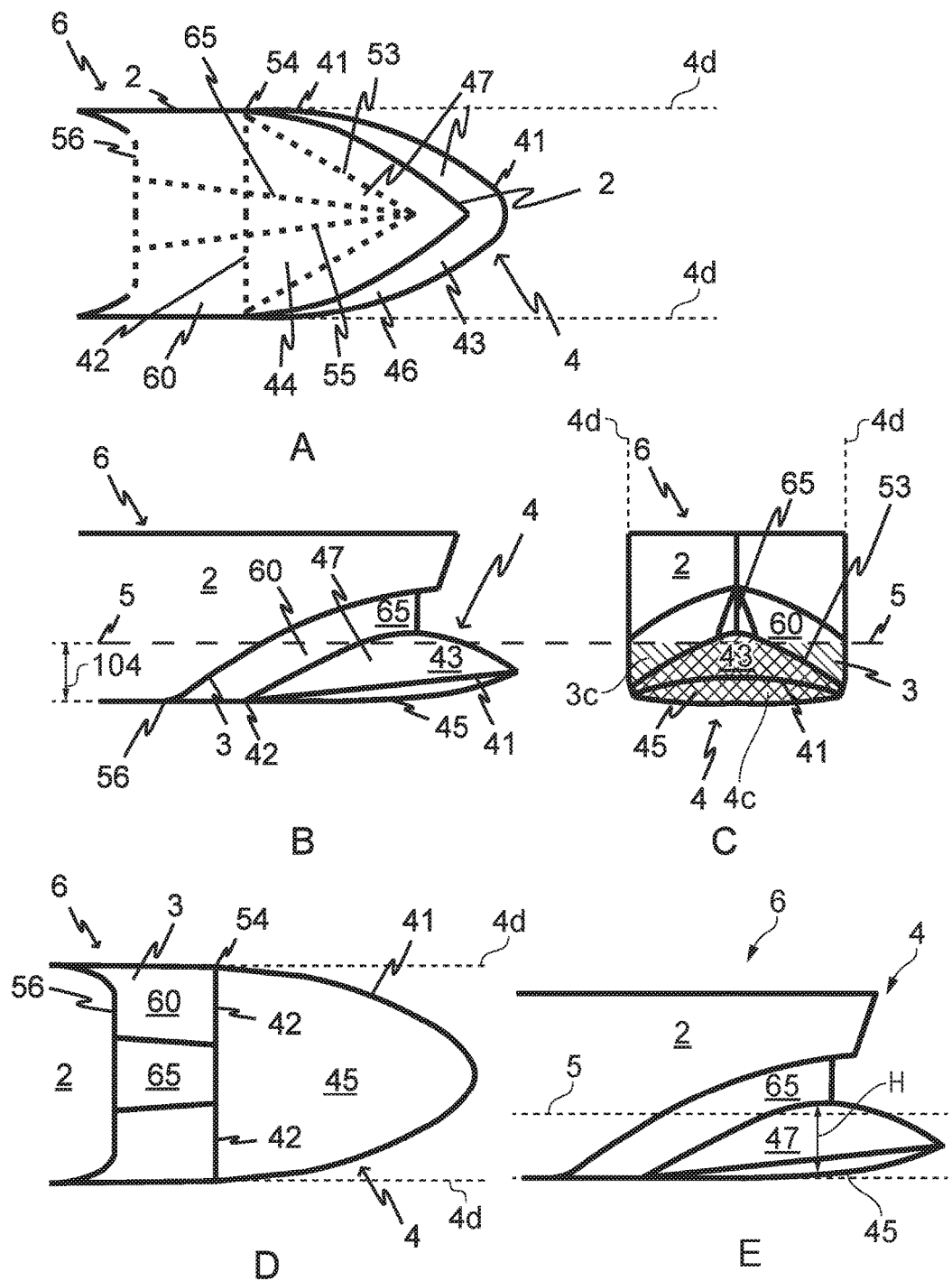
FIGS. 12A, B, C and D show the forepart of a vessel according to a third embodiment of the invention, where
FIG. 12B is a side view of the forepart.
FIG. 12C is a front view of the forepart and FIG. 12D is a bottom view of the forepart.
FIG. 12E shows the maximum height (H) of the body, from a lowest point to a highest point, which when viewed from in front of the vessel will determine the body area below a water line as seen in FIG. 12C.
Figure 13:
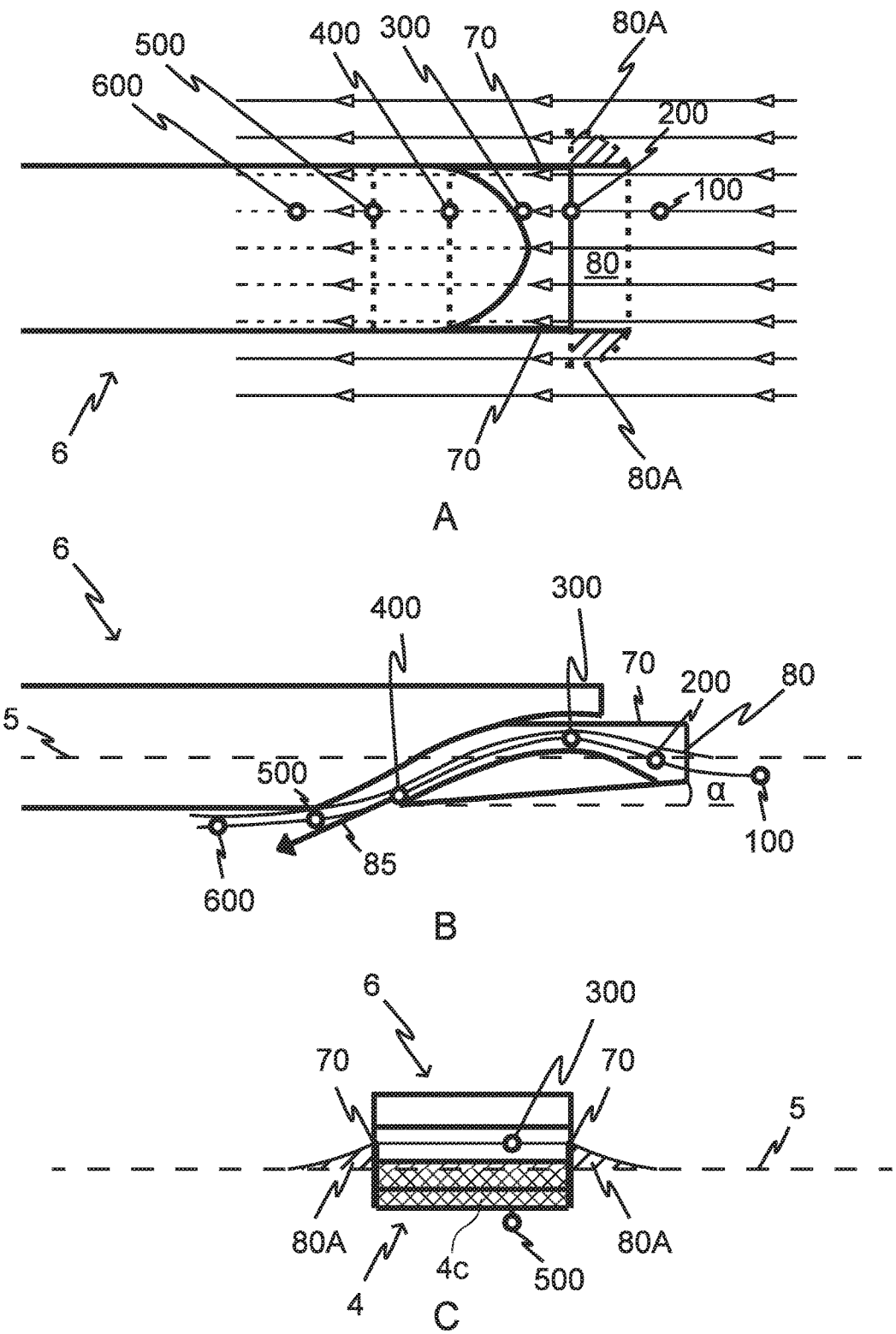
FIGS. 13A, B and C show the forepart of a vessel according to the first embodiment of the invention (also shown in FIGS. 10A-D) which to a greater degree illustrate the mode of operation of the invention, where
FIG. 13B is a vertical longitudinal section of the forepart and FIG. 13C is a front view of the forepart.
Figure 14:
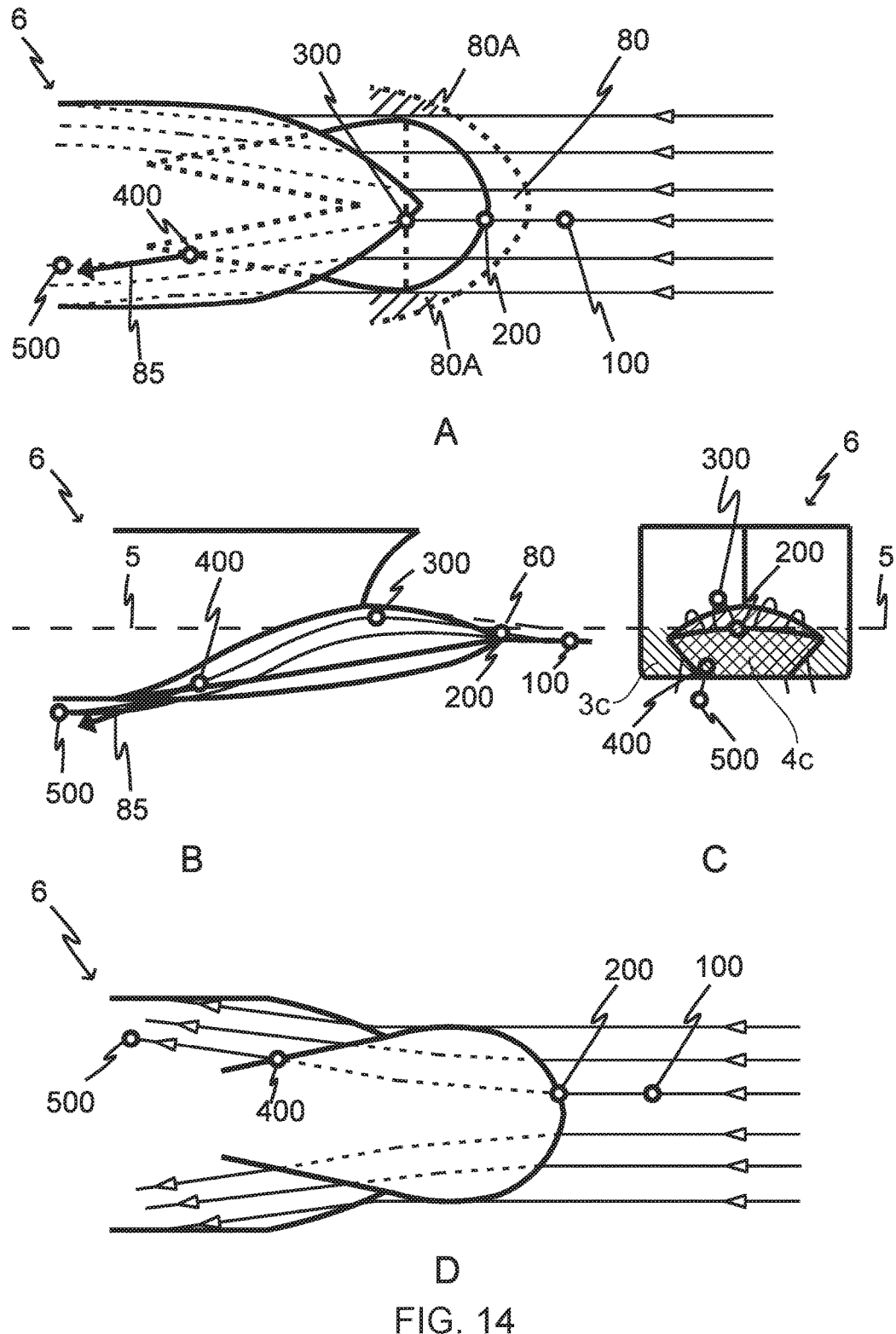
FIGS. 14A, B, C and D show the forepart of a vessel according to the second embodiment of the invention (also shown in FIGS. 11A-D) which to a greater extent illustrates the mode of operation of the invention, where
FIG. 14B is a side view of the forepart.
FIG. 14C is a front view of the forepart and FIG. 14D is a bottom view of the forepart.
Figure 15:
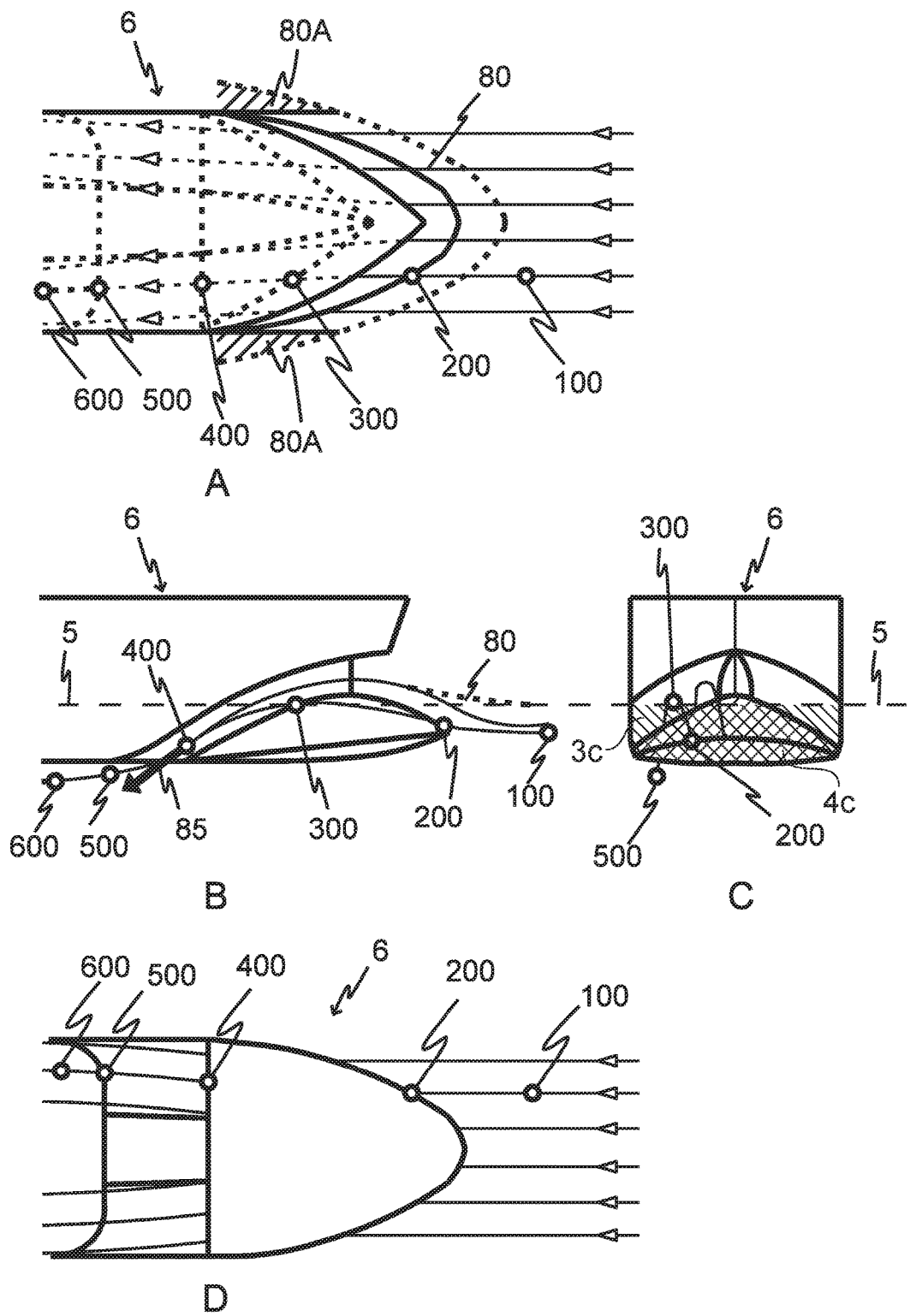
FIGS. 15A, B, C and D show the forepart of a vessel according to the third embodiment of the invention (also shown in FIGS. 12A-D) which to a greater extent illustrates the mode of operation of the invention, where
FIG. 15B is a side view of the forepart.
FIG. 15C is a front view of the forepart and FIG. 15D is a bottom view of the forepart.

FIGS. 9A and B show the general mode of operation of the invention for the particular embodiment in which the oncoming water masses are led under the hull. The position of the water surface 5 is shown with broken line. FIG. 9A shows the wave 31 formed behind the body 4 when only the body 4 is passed through a water mass. FIG. 9B shows the interaction between the body 4 and the hull 2 and how the hull 2 prevents the wave 31 from rising.

The invention can be configured in several ways, but the main principles of the mode of operation are common to all the embodiments.

A First Embodiment

This section describes the structure and mode of operation of a first embodiment of a vessel 1 according to the invention. See FIGS. 10A, B, C, D and E and FIGS. 13A, B and C.

FIGS. 10A E and FIGS. 13A-C show the forepart 6 of a vessel 1 comprising a hull 2 with a bow portion 3 and a body 4 according to the invention, with the body 4 partly submerged in a water mass when the vessel 1 is lying motionless. The position of the water surface 5 is indicated in FIGS. 10B and C and in FIGS. 13B and C. The body 4 is located at a distance from the bow portion 3 such that a passage 60 is formed between the body 4 and the bow portion 3. As best shown in FIGS. 10A-D, the body 4 comprises a leading edge 41, a trailing edge 42, a forward top surface 43, a contour line 53, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44. The broken lines for the body's trailing edge 42, the contour line 53 and interface 56 in FIG. 10A are not visible from above, but are shown in order to better illustrate the configuration of the hull 2 and the body 4. Reference numeral 3c represents the area of a cross section through the widest part of the hull 2' as seen from in front below a water surface, hereafter referred to as the "bow area" 3c. Reference numeral 4c represents the area of a cross section through the body at the body's maximum horizontal width as seen from in front below the water surface, hereafter referred to as the "body area" 4c. In embodiments, such as here, where these respective areas are coextensive the areas appear entirely cross hatched.

With particular reference to FIGS. 13A-C, a water mass is displaced with laminar flow across the body's forward top surface 43. The body's 4 curved top surface 47, with tapering profile towards the trailing edge 42 of the body, accelerates the water mass and allows it to be lowered, due to gravity, in the downward direction. At the body's trailing edge 42, the water mass has a high velocity that results in the water mass having a smaller vertical extent. This, together with the velocity vector 85 of the water mass at the body's trailing edge 42, leads the volume of water under the bow area 3, such that the bow portion 3 does not displace oncoming water masses. The bow portion 3 is thus dry or basically dry while at speed.

Ahead of or upstream of the body 4, the water masses will be slowed down in the same way as ahead of a conventional skip's bow. This results in a lifted water mass 80 ahead of the body 4. The transverse extent of the body 4, and side plates 70 located on each side of the body 4 (cf. FIGS. 13A-C), lead a major part of the lifted water mass 80 in over the body 4, such that only a minor proportion 80A of the lifted water mass 80 ahead of the body 4 escapes as waves to the surrounding water masses. The lifted water mass 80 that is formed by the body 4, including the escaped water mass 80A, is illustrated in FIGS. 13A-C.

As the body 4 has a large width, delimited by side plates 70, and lifts oncoming water masses in the vertical plane, the water mass on the body's top surface 47 is isolated from the surrounding water masses, such that few or no waves are produced in surrounding water masses when the water mass is accelerated on the top surface 47 of the body. A water mass can thus be accelerated from point 200 to point 400 and here give the water mass a favourable velocity vector 85 (cf. FIG. 13B) without significant waves being produced in the surrounding water masses.

Parts of the energy that help to lift the water mass 80 ahead of the body 4 accompany the water mass as potential energy in over the top surface 47 of the body, where the water mass is lowered, due to gravity, in the downward direction at the body's rear top surface 44. Thus, parts of the increased potential energy in the lifted water mass 80 are utilised for forward movement, or to give the water mass on the top surface 47 of the body increased speed at the trailing edge 42 of the body, instead of being lost to the surrounding water masses as waves.

As the body 4 is located close to the water surface 5, a lift is not obtained as is done with a sufficiently submerged lifting foil. The weight of the water masses on the body's top surface 47 will weigh the forepart 6 of the vessel 1 down. To counter this, the body's underside 45 can be shaped and/or angled to give a dynamic lift that balances the weight of the whole or parts of the water mass on the body's top surface 47. As can be seen from FIG. 13B, the dynamic lift is created in that the body's underside 45 forms the angle of attack a to the horizontal plane. As the trailing edge 42 of the body is thus lowered, the velocity of the water mass on the body's top surface 47 increases further.

The distance between the trailing edge 42 of the body and the area in which the water masses strike the hull 2 is adapted such that the water mass flows with as much laminar flow as possible over the body's rear top surface 44 and further with as much laminar flow as possible to below points 500 and 600 (FIG. 13B) where the hull 2 behind prevents wave formation. Points 100 and 300 are the location of the water masses respectively upstream of the leading edge 41 (i.e., upstream of point 200) and at the body's 4 highest point, along a flow line. Points 100, 200, 300, 400, 500 and 600 are also marked in FIG. 13A.

The invention has thus reduced the formation of waves from the vessel 1 that spread to the surrounding water masses.

At increasing speed, the velocity of the laminar flow on the body's top surface 47 will increase proportionally to the increase in the vessel's 1 speed, and thus prevent further accumulation of water masses 80 ahead of the body 4. The percentage 80A of the lifted water mass 80 ahead of the body 4 that escapes as wave will remain relatively constant. Similarly, the height of the lifted water mass 80 ahead of the body 4 will remain relatively constant, and thus the wave height formed by the forepart 6 of the vessel 1 will not increase as in the case of a conventional vessel 1.

The water mass on the top surface 47 of the body will, because of the Coanda effect, follow the body's top surface 47 also at high speeds.

The invention thus reduces the wave resistance of the vessel 1 within a wide speed range.

The laminar flow on the body's forward top surface 43 prevents spray and wave-breaking resistance and will therefore also reduce or eliminate these resistance components.

In this first embodiment, the body 4 can be secured to the hull 2 by means of the side plates 70 as shown in FIGS. 13A-C. The body 4 may also be secured to the hull 2 by one or more V-wedges 65 (see for example FIGS. 12A-D) between the bow portion 3 and the body's top surface 47. At lower speed of the vessel 1, model tests have shown that it may be favourable to have a certain width of the V-wedge 65. This is because the turbulence that easily arises when the water mass is to be led under the hull decreases, and/or that the area in which the turbulence is formed decreases. At higher speeds, the fastening means can be configured such that they slow down as little as possible the water masses flowing on the body's top surface 47.

A Second Embodiment

This section describes the structure and mode of operation of a second embodiment according to the invention. See FIGS. 11A, B, C and D and FIGS. 14A, B, C and D.

As the main principles for the mode of operation are common to all the embodiments, the following description will be similar to the explanation given in the section above.

FIGS. 11A-D and FIGS. 14A-D show the forepart 6 of a vessel 1 comprising a hull 2 and a body 4 according to the invention where the body 4 is incorporated in the bow portion 3. Furthermore, the body 4 is partly submerged in a water mass when the vessel 1 is lying motionless. The position of the water surface 5 is indicated in FIGS. 11B and C and in FIGS. 14B and C.

As best shown in FIGS. 11A-D, the body 4 comprises a leading edge 41, two trailing edges 42, a forward top surface 43, a contour line 53, an interface 55, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44 and interface 54 indicate the boundary between the body's leading edge 41 and the body's trailing edges 42. The broken lines in FIG. 11A that indicate the body's trailing edges 42, the contour line 53 and the interface 55 are not visible from above, but are shown in order better to illustrate the design of the hull 2 and the body 4. Reference numeral 3c represents the area of a cross section through the widest part of the hull as seen from in front below a water surface. Reference numeral 4c represents the area of a cross section through the body at the body's maximum horizontal width as seen from in front below the water surface.

With particular reference to FIGS. 14A-D, a water mass is displaced with laminar flow in over the body's forward top surface 43. The body's curved top surface 47 accelerates the water mass. As the body's rear top surface 44 is configured with a tapering cross-section out towards the periphery of the body 4 in the transverse direction, the water mass will be lowered, due to gravity, in the downward direction at the body's trailing edges 42 without coming in contact with the bow portion 3, such that undesired slowing down of the water mass on the body's top surface 47 is prevented. The configuration of the bow area 3 can, like the V-wedge 65, help to control the water mass at the body's top surface 47. At the body's trailing edges 42, the water mass has a high velocity that results in the water mass having a smaller vertical extent. This, together with the velocity vectors 85 of the water mass at the body's trailing edges 42, leads the water mass under the bow portion 3 and/or out towards the sides of the hull 2. This means that the bow portion 3 will only displace a small proportion of the oncoming water masses the forepart 6 of the vessel 1 must displace; cf. FIG. 14C showing the front view of the vessel 1.

If the whole or parts of the water mass from the body's top surface 47 are not led under the bow portion 3, the body 4 can be configured such that the velocity vectors 85 of water masses at the body's trailing edges 42 and the velocity vector of the oncoming water masses that are not displaced by the body 4, obtain a velocity vector that is as parallel as possible to the bow area 3.

Ahead of, or upstream of, the body 4, the water masses will be slowed down in the same way as ahead of a conventional ship's bow. This results in a lifted water mass 80 ahead of the body 4. The forward top surface 43 of the body has a tapering cross-section out towards the periphery of the body 4 in a transverse direction. This causes primarily a lifting of water masses 80 towards the middle of the body 4 and to a small extent out towards the body's 4 periphery, seen from in front. The transverse extent of the body 4 thus leads more than 50% of the lifted water mass 80 in over the body 4, such that only a minor proportion 80A of the lifted water mass 80 ahead of the body 4 escapes as waves to surrounding water masses. The lifted water mass 80 and 80A formed by the body 4 is illustrated in FIGS. 14A and B.

As the body 4 has a large transverse extent, and also lifts oncoming water masses in the vertical plane, the water mass on the top surface of the body 47 is to a large extent isolated from the surrounding water masses, such that significant waves are not produced in surrounding water masses as a result of the water mass being accelerated on the body's top surface 47. A water mass can thus be accelerated from point 200 to point 400 (cf. FIGS. 14A-D) without significant waves being produced in the surrounding water masses. The water masses flow with as much laminar flow as possible under the hull 2 to point 500. Point 100 and point 300 are the location of the water masses respectively upstream of the leading edge 41 (i.e., upstream of point 200) and at the highest point of the body 4, along a flow line.

Parts of the energy that helped to lift the water mass 80 ahead of the body 4 accompany the water mass as potential energy in over the body's top surface 47 and is lowered, due to gravity, in the downward direction at the rear top surface 44 of the body. Thus, parts of the increased potential energy in the lifted water mass 80 are utilised for forward movement, or to give the water mass on the body's top surface 47 increased velocity at the trailing edges 42 of the body, instead of being lost to surrounding water masses as waves.

As the body 4 is located close to the water surface 5, a lift is not obtained as is done with a sufficiently submerged lifting foil. The weight of the water masses on the body's top surface 47 will weigh the forepart 6 down. To counter this, the body's underside 45 can be shaped and/or angled to give a dynamic lift that balances the weight the whole of or parts of the water mass on the body's top surface 47. As can be seen from FIGS. 14B and C, the dynamic lift is produced in that the body's trailing edge 42 is positioned lower than its leading edge 41. Thus, the velocity of the water mass on the body's top surface 47 increases further.

The invention has thus reduced the formation of waves from the vessel 1 that spread to the surrounding water masses.

If the vessel 1 is to be designed to travel at high speed, it will be expedient to allow the width of the body 4 to decrease from the body's 4 largest width and backwards, seen from above (i.e. downstream of interface 54), so as thus to lead a larger proportion of the water mass that passes through on the top surface 47 of the body under the bow portion 3 instead of out towards the sides of the hull 2.

The laminar flow on the body's forward top surface 43 prevents spray and wave-breaking resistance and will therefore also reduce these resistance components.

The body 4 in this second embodiment is incorporated in the bow portion 3 and secured to the hull 2 in that the hull 2 beams and support system are extended and continue on the interior of the body 4. This embodiment thus does not require any form of external strut or other form of external attachment.

A Third Embodiment

This third embodiment according to the invention, shown in FIGS. 12A, B, C, D and E and FIGS. 15A, B, C and D, has a structure and mode of operation that is somewhere between the two embodiments described above. The model boat, described later in this document under the section entitled Model tests is, in Tests B, made according to this third embodiment; cf. FIGS. 18A and 18B, but without the V-wedge 65.

FIG. 12AE and FIGS. 15A-D show the forepart 6 of a vessel 1 comprising a hull 2 with a bow portion 3 and a body 4 according to the invention with the body 4 partly submerged in a water mass when the vessel 1 is lying motionless. The position of the water surface 5 is indicated in FIGS. 12B and C and in FIGS. 15B and C.

The body 4 is located at a distance from the bow portion 3 such that passage 60 is formed between the body 4 and the bow portion 3. As best shown in FIGS. 12A-D, the body 4 comprises a leading edge 41, a trailing edge 42, a forward top surface 43, a contour line 53, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44 and the interface 54 indicates the boundary between the body's leading edge 41 and its trailing edge 42. The body 4 is located a distance from the bow portion 3 such that passage 60 is formed between the body 4 and the bow area 3. The broken lines for the body's trailing edge 42, the contour line 53, the interface 55 and the interface 56 in FIG. 12A are not visible seen from above, but are shown in order better to illustrate the configuration of the vessel 1. Reference numeral 3c represents the area of a cross section through the widest part of the hull as seen from in front below a water surface. Reference numeral 4c represents the area of a cross section through the body at the body's maximum horizontal width as seen from in front below the water surface.

With particular reference to FIGS. 15A-D; a water mass is displaced with laminar flow in over the body's forward top surface 43. The body's curved top surface 47, with tapering profile towards the trailing edge 42 of the body, accelerates the water mass and allows it to be lowered, due to gravity, in the downward direction. At the body's trailing edge 42, the water mass has a high velocity that causes the water mass to have a smaller vertical extent. This, together with the velocity vector 85 of the water mass at the trailing edge 42 of the body, leads the water mass under the bow portion 3, such that the bow portion 3 only displaces a small proportion of the oncoming water masses at the sides of the bow area 3; cf. FIG. 15C. Large parts of the bow portion 3 are thus dry or basically dry during motion.

Ahead of or upstream of the body 4, the water masses will be slowed down in the same way as ahead of a conventional ship's bow. This causes a lifted water mass 80 ahead of the body 4. The forward top surface 43 of the body has a tapering cross-section out towards the periphery of the body 4 in the transverse direction. This causes primarily a lifting of water masses 80 towards the middle of the body 4 and only to a small extent out towards the periphery of the body 4 in the transverse direction. The width of the body 4 thus leads more than 50% of the lifted water mass 80 in over the body 4, such that only a small proportion 80A of the lifted water mass 80 ahead of the body 4 escapes as waves to surrounding water masses. The lifted water mass 80 that is formed by the body 4, including escaped water mass 80A, is illustrated in FIGS. 15A and B.

As the body 4 has a large width and lifts oncoming water masses in the vertical plane, the water mass on the body's top surface 47 will to a large extent be isolated from the surrounding water masses, such that significant waves are not produced in surrounding water masses when the water mass is accelerated on the body's top surface 47. Thus, a water mass can be accelerated from point 200 to point 400, and here the water mass can be given a favourable velocity vector 85, (cf. FIGS. 15A-D) without significant waves being produced in the surrounding water masses.

Parts of the energy that help to lift the water mass 80 ahead of the body 4 accompany the water mass as potential energy in over the top surface 47 of the body, the water mass being lowered, due to gravity, in the downward direction at the rear top surface 44 of the body. Thus, parts of the increased potential energy in the lifted water mass 80 are utilised for forward movement, or to give the water mass on the body's top surface 47 increased velocity at the trailing edge of the body 42, instead of being lost to surrounding water masses as waves.

As the body 4 is located close to the water surface 5, a lift is not obtained as is achieved with a sufficiently submerged lifting foil. The weight of the water masses on the body's top surface 47 will weigh the forepart 6 down. To counter this, the body's underside 45 can be shaped and/or angled to give a dynamic lift that balances the weight of the whole or parts of the water mass on the body's top surface 47. As can be seen from FIGS. 15B and 14C, the dynamic lift is produced in that the body's trailing edge 42 is positioned lower than its leading edge 41. Thus, the velocity of the water mass on the body's top surface 47 increases further.

The distance between the body's trailing edge 42 and the area where the water masses meet the hull 2 is adapted such that the water mass flows with as much laminar flow as possible over the body's rear top surface 44 and further with as much laminar flow as possible under the hull 2 to points 500 and 600 (FIG. 15A-D) where the hull 2 behind prevents wave formation. Points 100 and 300 are the location of the water masses respectively upstream of the leading edge 41 (i.e., upstream of point 200) and at the body's 4 highest point, along a flow line.

The invention has thus reduced the formation of waves from the vessel 1 that spread to surrounding water masses.

With rising speed, the velocity of the laminar flow on the body's top surface 47 will increase proportionally to the increase of the vessel's 1 speed, and thus prevent further accumulation of water masses 80 ahead of the body 4. The percentage 80A of the lifted water mass 80 ahead of the body 4 that escapes as wave will remain relatively constant.

Figure 19A:
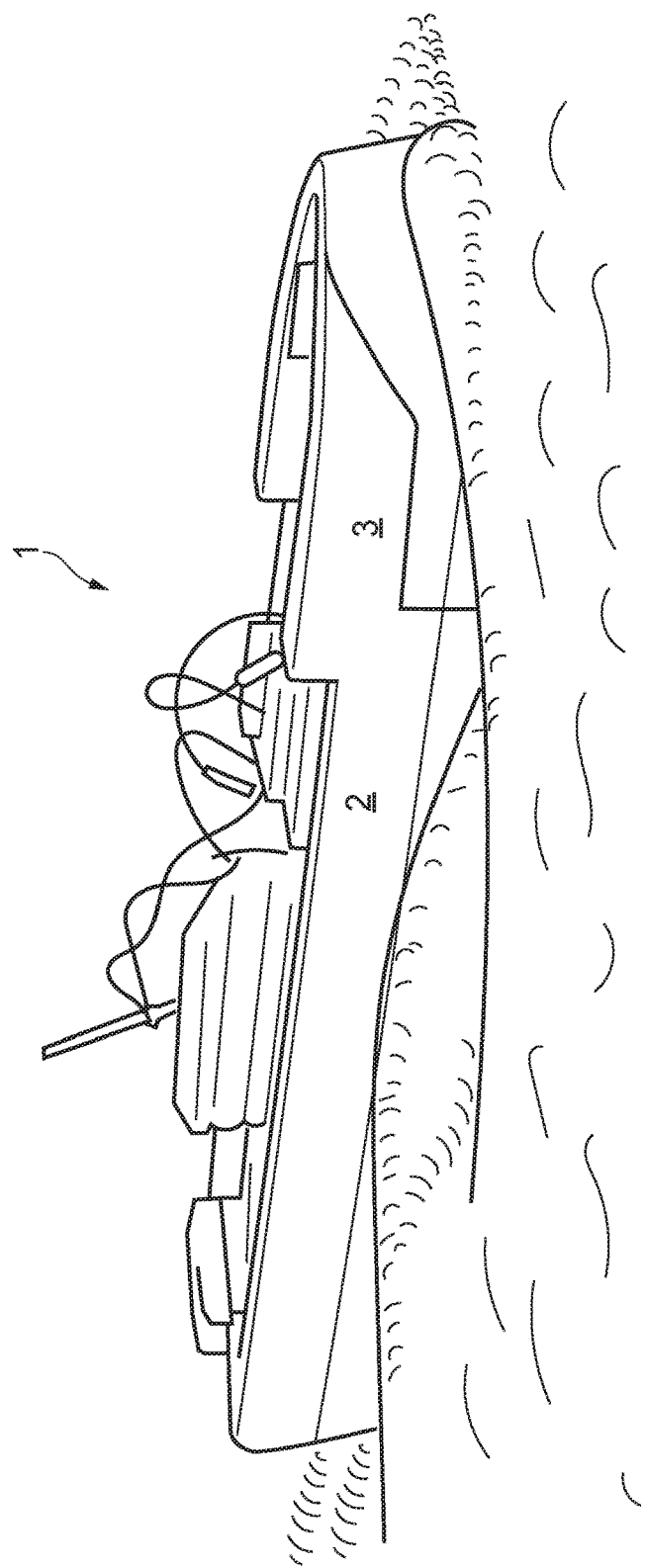
FIG. 19A is a line drawing made to illustrate a photograph where the model boat has a conventional bow according to the prior art as shown in FIGS. 16A-C, and where the measured speed is 1.25 m/s.
Figure 19C:
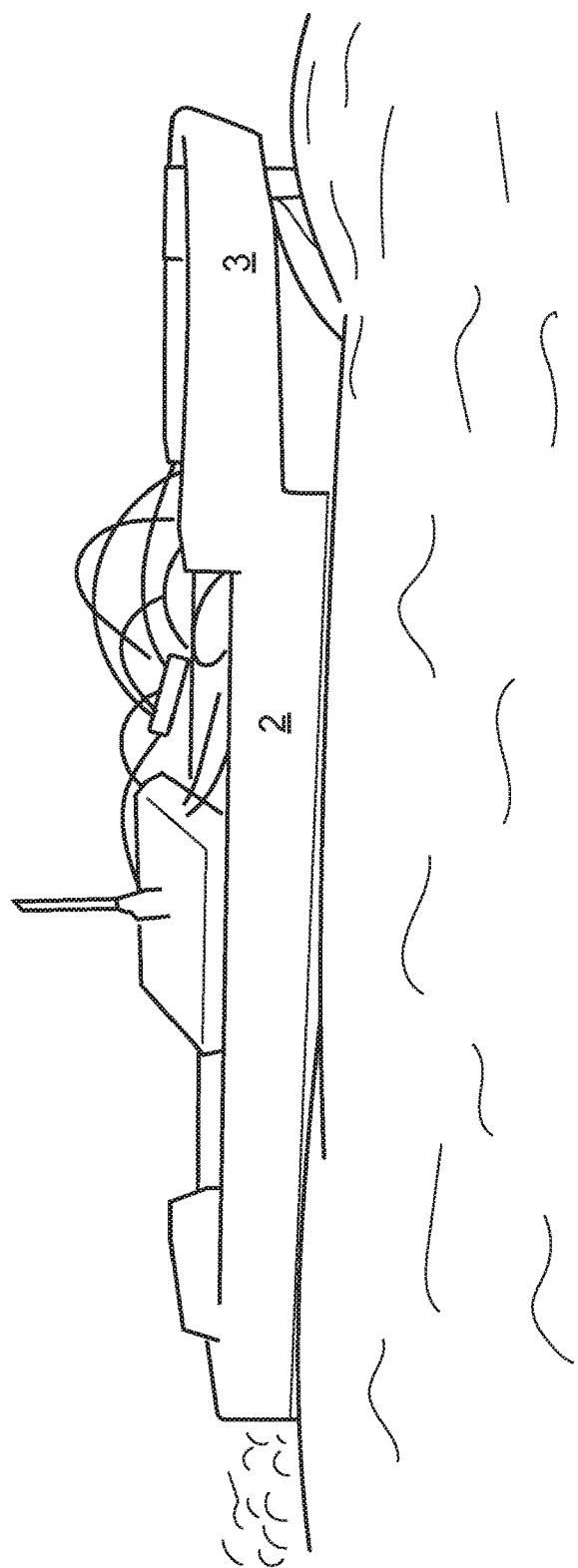
FIG. 19C is a line drawing made to illustrate a photograph where the model boat has a modified bow according to the third embodiment of the invention, as shown in FIGS. 18A and B, but without a V-wedge, and where the measured speed is 1.34 m/s.

Similarly, the height of the lifted water mass 80 ahead of the body 4 will remain relatively constant at increasing speed, and thus the wave height formed by the forepart 6 will not increase as for a conventional vessel 1; cf. FIGS. 19A-C from the model tests.

The water mass on the body's top surface 47 will, because of the Coanda effect, follow the body's top surface 47 also at higher speeds.

Thus, the invention reduces the wave resistance within a wide speed range.

The laminar flow on the body's forward top surface 43 prevents spray and wave-breaking resistance and will therefore also reduce or eliminate these resistance components. This can be seen clearly from FIGS. 20A and B, which show respectively non-laminar and laminar flow characteristics of a displaced water mass that is lifted over the body's forward top surface 43.

The body 4 can in this third embodiment be secured to the hull 2 by means of one or more V-wedges 65, seen from above, as shown in FIGS. 12A-D, as also can be seen in FIGS. 18A and B. At lower speed of the vessel 1, model tests have shown that it may be favourable to have a certain width of the V-wedge 65. This is because the turbulence that easily arises when the water mass is to be led under the hull diminishes, and/or that the area where the turbulence is formed diminishes. At higher speeds, the body 4 can be fastened to the hull 2 using struts or plates so that the water masses on the top surface 47 of the body slow down as little as possible.

General Design Criteria—Miscellaneous

The body 4 and the hull 2 are configured so that the total resistance for the vessel 1 is as low as possible. The configuration and location of the body 4 is determined to a large extent by the hull's 2 draft, width/draft ratio, variation in draft (load/ballast) and speed range. In addition, regard must be had to seagoing characteristics and to what otherwise is a practical design in relation to the use of the vessel.

The body 4 should be configured such that maximum laminar flow is achieved at the body's top surface 47.

In general, an attempt can be made to lead more than 50% of oncoming water mass over the body's top surface 47. The proportion of water mass that must be displaced by the body's underside 45 and/or by the hull 2 is thus smaller. This can be advantageous as the water mass that is displaced by the body's underside 45 and/or by the hull 2 causes increased water velocity, which in turn causes negative pressure and loss of buoyancy, and also wave formation.

In the case of vessel 1 that operates at low to moderate speed, typically $F_N$ 0.1-0.25, it may be the dynamic pressure in oncoming water masses that limits the proportion of the oncoming water masses that is lifted over the forward top surface 43 of the body.

To obtain laminar flow over the body's forward top surface 43, the body 4 can therefore be configured such that the body's 4 profile has little fullness at the body's forward part 46, and where the body's 4 forward underside may have a small angle of attack; cf. FIGS. 26B, 26C, 26D and 26F. This gives little deceleration of water masses ahead of the body 4. The rear underside of the body 4 may have a gradually increasing angle of attack to more easily lead water masses under the vessel 1; cf. FIGS. 26C, 26D and 26F.

Figure 26:
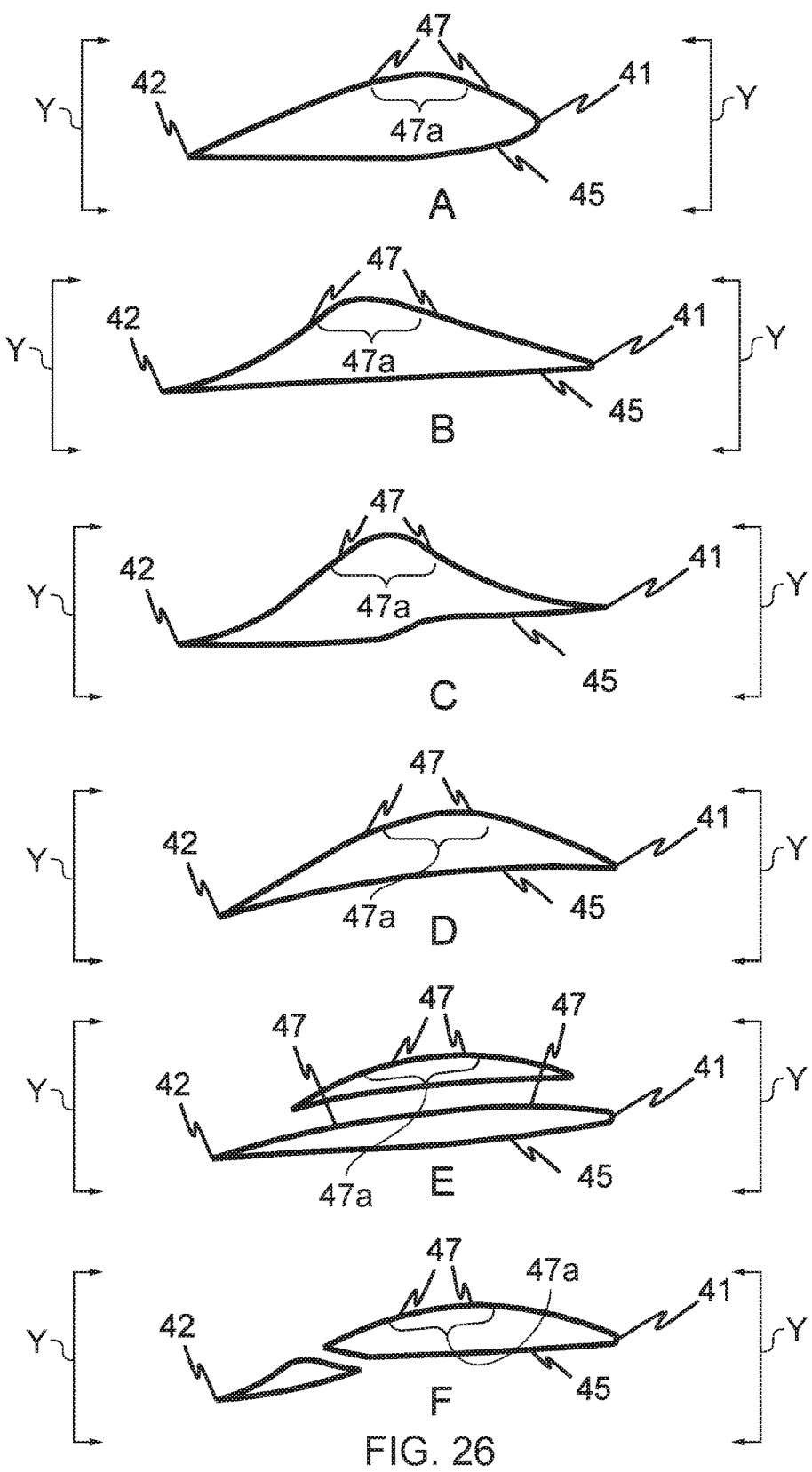
FIGS. 26A, B, C, D, E and F show different configurations of how the vertical longitudinal section of the body in the direction of arrows Y can be formed according to the invention.
FIG. 26E shows examples of two bodies where one of the bodies is placed above the other.
FIG. 26F shows a body comprising two parts. As shown, the body may have a convex portion 47a that constitutes at least 10% of the body's top surface 47.

FIG. 26F has a gap that allows some water from the body's underside 45 to flow through the gap and up onto the body's rear top surface, so as thereby to improve the flow conditions in the area around the body's trailing edge 42, thereby reducing any turbulence problems. Such gap in the body 4 is prior art that is, inter alia, used in the aircraft industry.

FIG. 26E shows an example of two bodies 4 that are located at different heights. A configuration of this kind can be used when a vessel 1 operates in different load conditions. When the vessel 1 operates with light load or ballast, the upper body 4 can be placed so high that water masses are not led over this body, but that the lower body 4 functions as otherwise described in this document. When the vessel 1 is heavily loaded, the water masses can pass over both bodies 4 and the effect of the bodies 4 here too will be as otherwise described in this document.

At higher speeds, where dynamic pressure is higher, it may be expedient to let a larger proportion of oncoming water be led over the body's top surface 47.

In the case of vessel 1 that operates at medium to higher speeds, typically from $F_N=0.25$ to over $F_N=1.0$, it may be expedient to give body 4 about the same width as the hull 2.

In the case of hull 2 with a larger width compared to draft, typically barges, it may also be expedient to give the body 4 a width about the same as the width of the hull 2 so that the lifted water mass 80 in front of the hull is led under the hull 2.

At a low width/draft ratio for the vessel 1, the body 4 can be configured to displace a larger proportion of oncoming water masses laterally than is the case with a larger width/draft ratio.

The cross-section of the body 4 out towards the periphery of the body 4 in the transverse direction can be made slimmer and thus reduce lifting of water masses 80 upstream of the body's 4 periphery; cf. FIGS. 11C, 12C, 21C, 22C and 23C.

For another embodiment, the trailing edges 42 of the body can also be configured parallel to the sides of the hull 2, so that more water is led out towards the sides of the hull 2.

Figure 21:
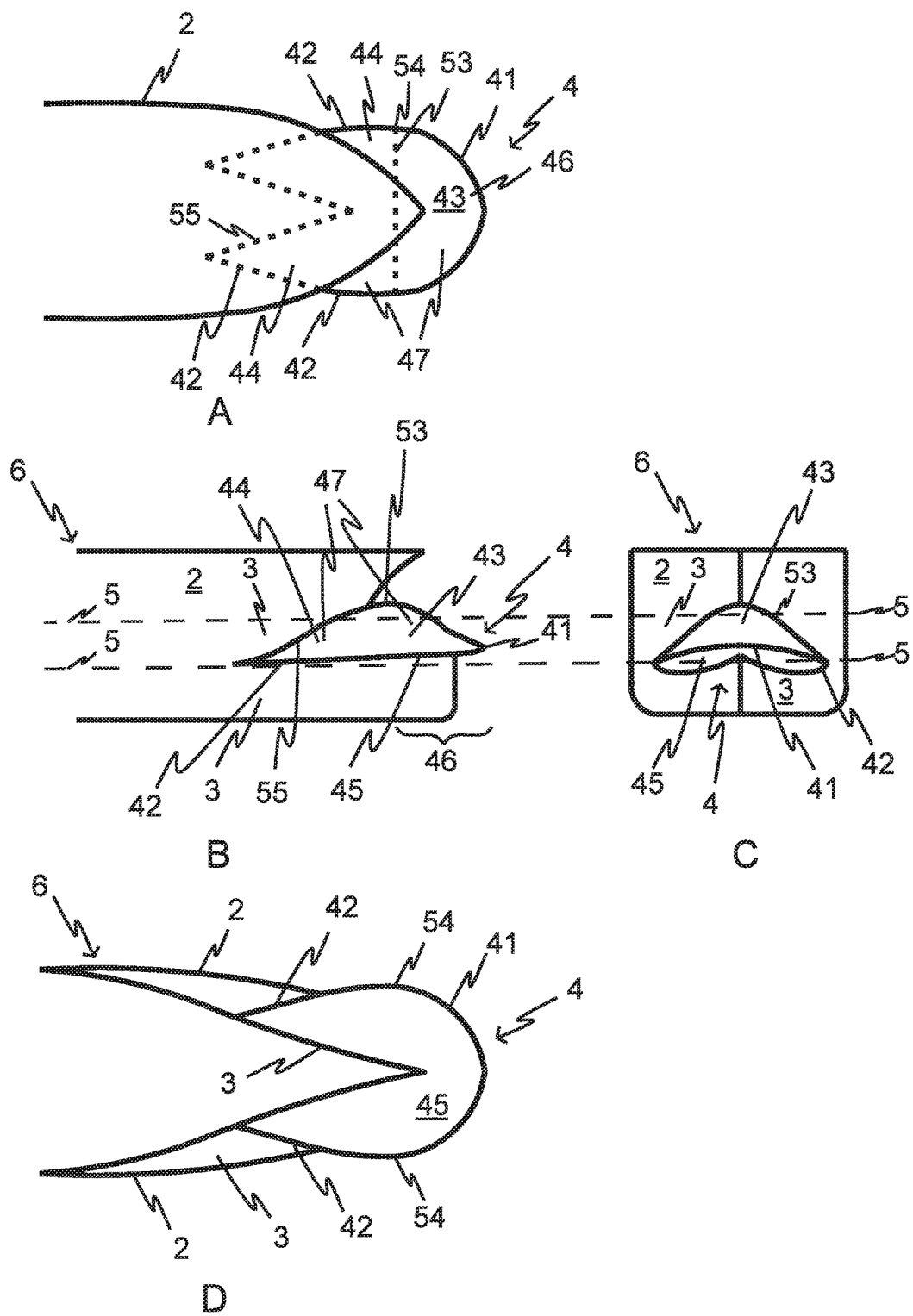
FIGS. 21A, B, C and D show the forepart of a vessel according to a fourth embodiment of the invention, where
FIG. 21B is a side view of the forepart.
FIG. 21C is a front view of the forepart and FIG. 21D is a bottom view of the forepart.

The body 4 can be adapted such that its underside 45 or its leading edge 41 is positioned just above the water surface 5 when the vessel 1 is ballasted, such that the body's underside 45 physically prevents formation of a bow wave; cf. FIGS. 21A, B, C and D. When the vessel 1 is in loaded condition, the body 4 will be fully or partly submerged as otherwise described in this document.

The body 4 can be secured to the hull 2 in a fixed position. The attachment can also be effected such that the position of the body 4 in the vertical plane, horizontal plane and/or the angle of attack can be changed during motion. Furthermore, the body 4 can be equipped with one or more passive or active flaps at the trailing edge 42 of the body to minimise the total resistance for the vessel 1 to different depth/speed. Furthermore, active flaps can be used to reduce the vessel's 1 motions in waves.

Figure 27:
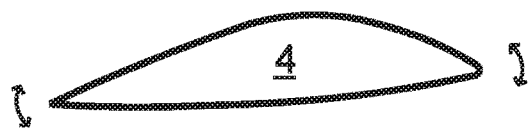
FIGS. 27A, B, C, D and E are vertical longitudinal sections of different embodiments according to the invention and show how the dynamic lift of the body can be changed, where FIGS. 27B, C and D show how the flow at the trailing edge of the body can be changed by means of flaps/control surfaces.
Figure 27:
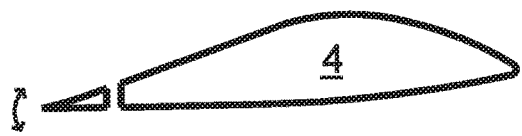
Figure 27:
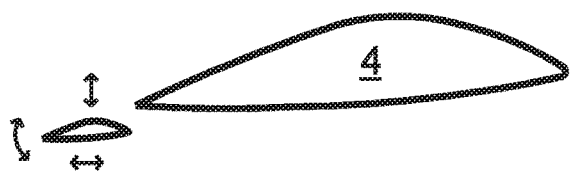
Figure 27:
Figure 27:
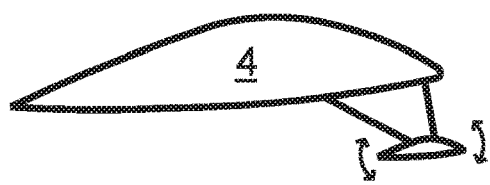
Figure 28:
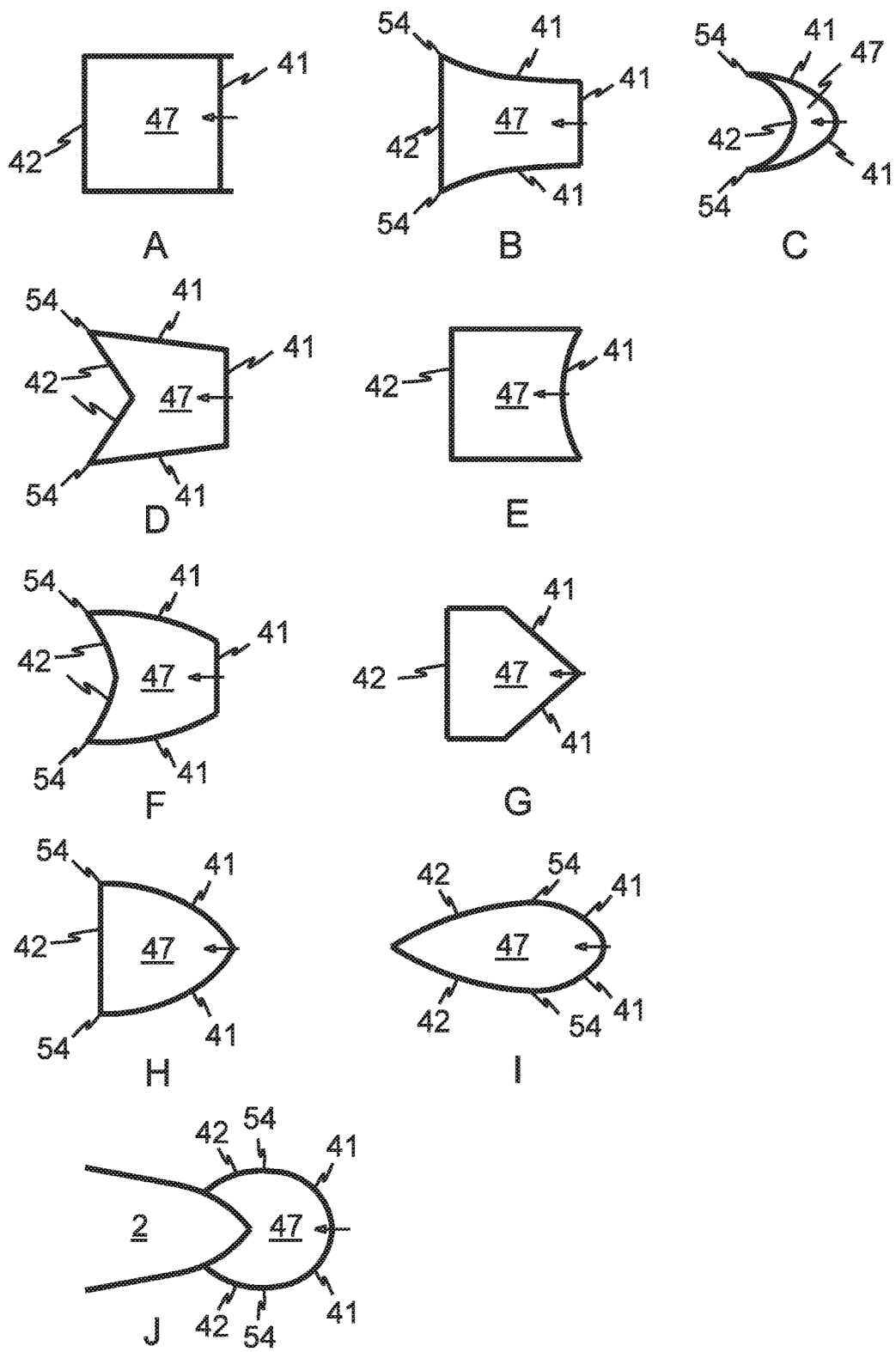
FIGS. 28A, B, C, D, E, F, G, H, I and J are top views of different configurations showing how the body can be configured, according to the invention.

The underside 45 of the body can be shaped and/or angled such that at speed a dynamic lift is generated from the body's underside 45, where the dynamic lift balances the whole or parts of the extra weight the water masses at the body's top surface exert on the body 4 when the vessel 1 is at speed. Since the weight from the water masses in the flow at the body's top surface 47 is constant, whilst the dynamic lift from the body's underside 45 increases with increasing speed, higher speed will require a smaller angle of attack. It may therefore be advantageous to construct a vessel 1 according to the invention where said angle of attack of the body 4 can be adjusted at speed, as indicated by arrows in FIG. 27A. Furthermore, FIG. 27B shows a body 4 fitted with one or more remote controlled flaps able to move as indicated by the arrow. The dynamic lift and the flow picture at the trailing edge 42 of the body will thus be capable of being changed at speed. FIG. 27C shows body 4 fitted with one or more remote controlled flaps able to move as one or more of the arrows indicate. The dynamic lift and the flow picture at the trailing edge 42 of the body will thus be capable of being changed at speed. FIG. 27D shows a body 4 fitted with one or more remote controlled flaps able to move as indicated by one or more of the arrows. The dynamic lift and the flow picture at the trailing edge 42 of the body will thus be capable of being changed at speed. The dynamic lift can also be provided by fitting the body 4 with one or more fixed and/or movable lifting foils at the underside 45 of the body. This is illustrated in a possible embodiment in FIG. 27E. The arrows indicate how the angle of attack of the lifting foil can be changed at speed.

The underside 45 of the body can also be mounted at a small or no angle of attack, where necessary lift at the body's underside is generated by increase in pressure at the bow portion 3 under body 4 as a result of displacement of oncoming water masses; cf. FIGS. 21B-D. The underside 45 of the body will thus also suppress formation of bow wave in at least one load condition.

FIGS. 21A-D show a forepart 6 of a vessel 1 comprising a hull 2 and a body 4 according to a fourth embodiment of the invention. As can be seen here, the body 4 comprises a leading edge 41, two trailing edges 42, a forward top surface 43, a contour line 53, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44, and the interfaces 54 indicate the boundary between the body's leading edge 41 and its trailing edges 42. The vessel water surface 5 is indicated in two load conditions, which also thus defines the bow area 3c for the two load conditions. The broken lines for the body's trailing edges 42, the contour line 53 and the interface 55 in FIG. 21A are not visible from above, but are shown in order better to illustrate the configuration of the hull 2 and the body 4.

Sufficient water masses should be led over the body's top surface 47 with resulting velocity vector 85 at the trailing edge 42 of the body so that least possible turbulence is created between the body's trailing edge 42 and the bow portion 3.

Increasing distance between the body's trailing edge 42 and the bow portion 3 can lead to increasing turbulence problems, especially at lower speeds. The distance between the bow portion 3 and the body's trailing edge 42 must also not be so small that the water masses from the body's top surface 47 are prevented from flowing under the hull 2.

The passage or channel 60 between the body 4 and the bow portion 3 should be dimensioned so that the water mass that passes over the body 4 flows freely (i.e., with little or no deceleration) with maximum laminar flow further under the hull 2 and optionally out to the sides of the bow area 3. At deepest draft 104, there should be sufficient distance from the body's top surface 47 and the body's trailing edge 42 to the bow portion 3 to allow the water masses on the body's top surface 47 to flow freely.

To counteract turbulent flow behind a body 4 that laterally displaces water masses at the body's trailing edge 42, (cf., for example, FIG. 14A), it may be advantageous that water masses are also laterally displaced in a similar manner by the body's underside 45; cf., e.g., FIG. 14D in which the broken lines illustrate flow lines at the body's underside 45.

The body 4, cf. e.g. the first embodiment, can be configured with or without side plates 70. The side plates 70 can be extended to the leading edge 41 of the body, or they can be extended further forward past the body's leading edge 41. In general, it can be said that the further forward the side plates 70 are extended, the smaller the proportion 80A of the lifted water mass 80 ahead of the body 4 will escape as wave in the surrounding water masses. If the body 4 is configured without side plates 70, the body 4 can be fastened to the bow area using struts or plates that are not secured right out at the sides of the body 4, seen from in front. Furthermore, the body 4 can be secured using one or more V-wedges 65 as described in the first and the third embodiment. The body 4 can with these attachments also be configured with a tapering cross-section out towards the sides of the body 4 seen from in front, as shown in FIGS. 22A, B, C and D.

Figure 22:
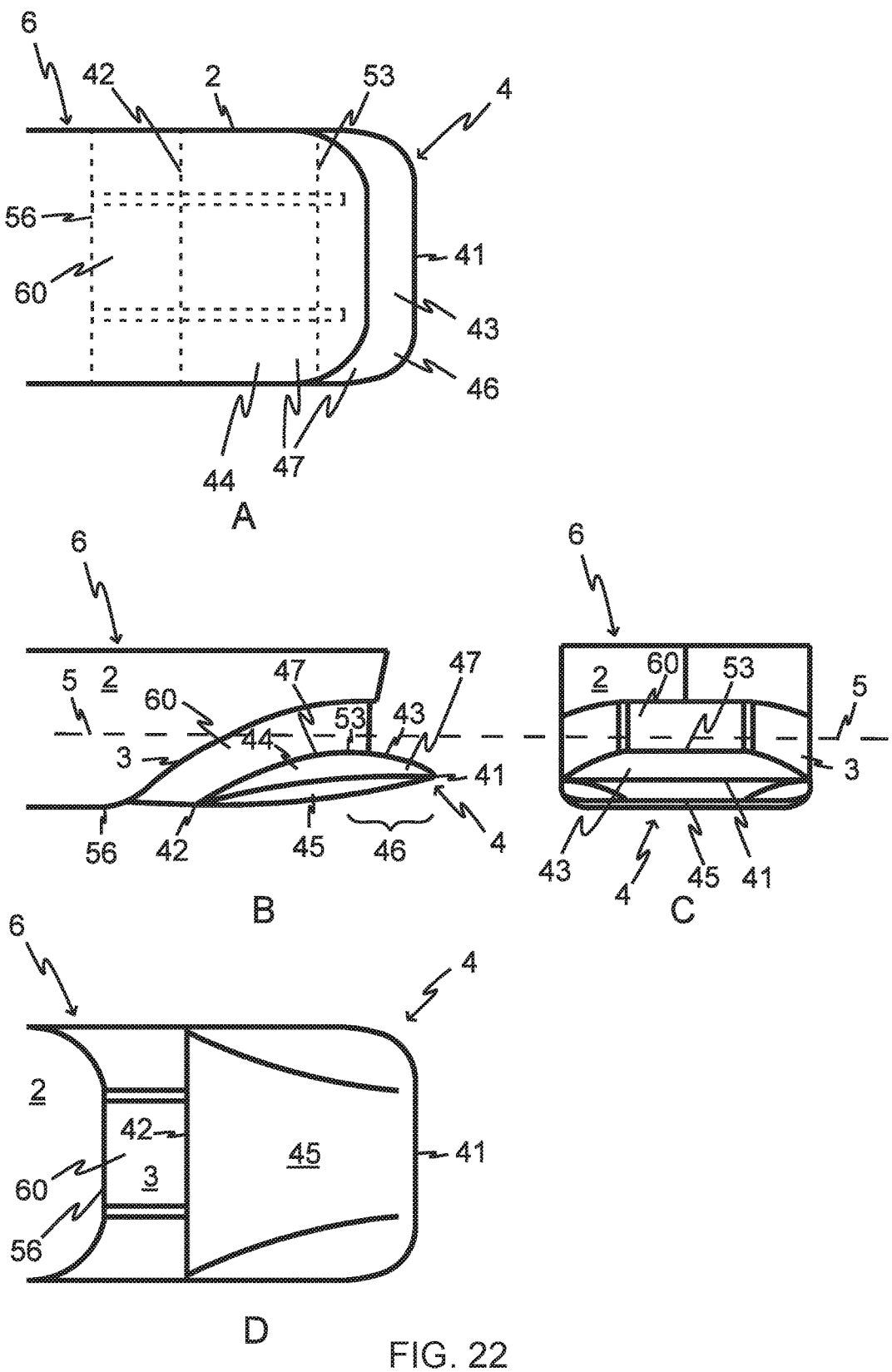
FIGS. 22A, B, C and D show the forepart of a vessel according to a fifth embodiment of the invention, where
FIG. 22B is a side view of the forepart.
FIG. 22C is a front view of the forepart and FIG. 22D is a bottom view of the forepart.

FIGS. 22A-D show the forepart 6 of a vessel 1 comprising a hull 2 and a body 4 according to a fifth embodiment of the invention with the body 4 completely submerged in a water mass when the vessel 1 is lying motionless. The position of the water surface 5 is indicated in FIGS. 22B and C. The body 4 is placed at a distance from the bow portion 3 such that passage 60 is formed between the body 4 and the bow portion 3. The body 4 comprises a leading edge 41, a trailing edge 42, a forward top surface 43, a contour line 53, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44. The broken lines for the body's trailing edge 42, the contour line 53, interface 56 and the fastening means in FIG. 22A are not visible from above, but are shown in order better to illustrate the configuration of the hull 2 and the body 4.

Figure 23:
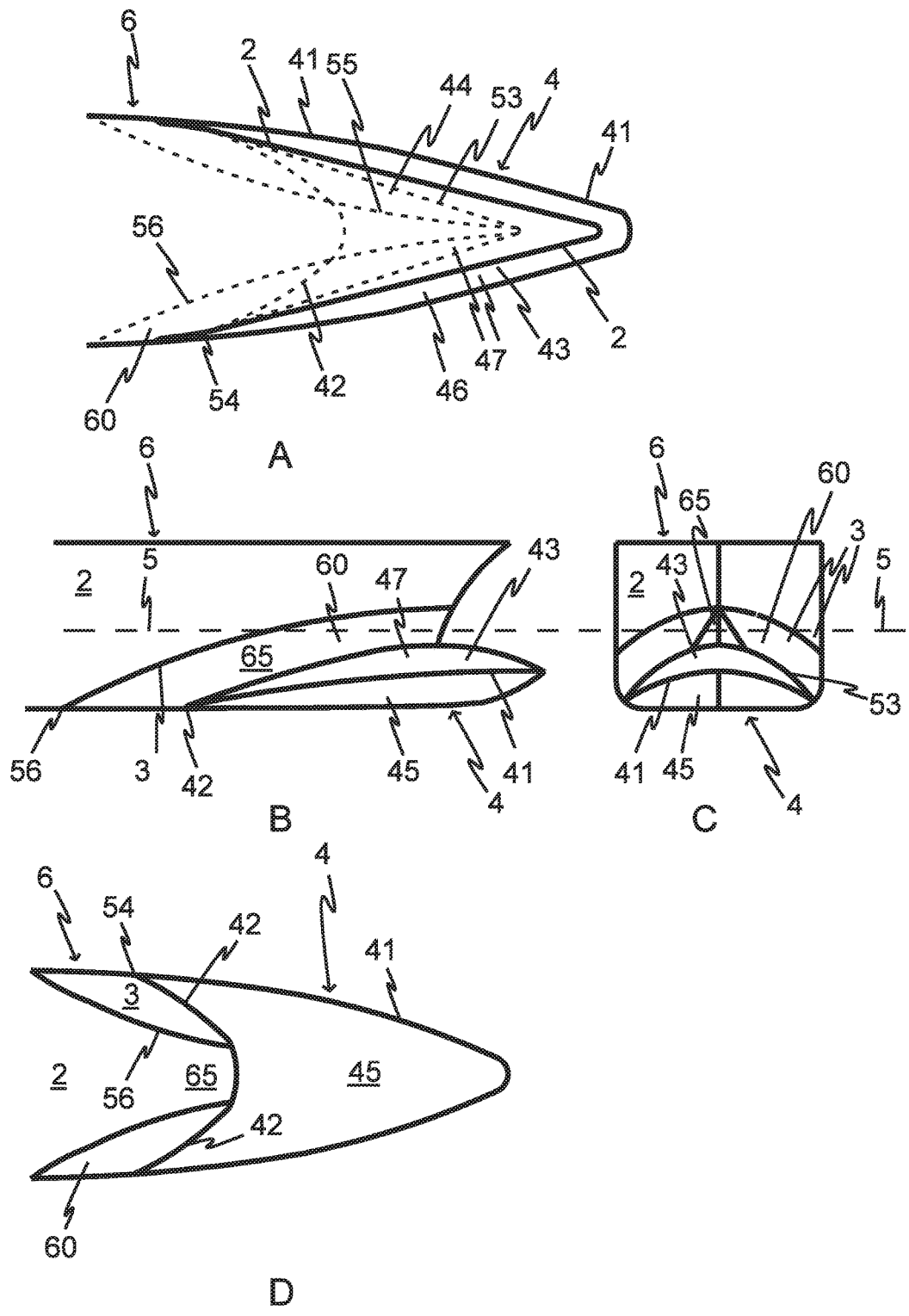
FIGS. 23A, B, C and D show the forepart of a vessel according to a sixth embodiment of the invention, where
FIG. 23B is a side view of the forepart.
FIG. 23C is a front view of the forepart and FIG. 23D is a bottom view of the forepart.

FIGS. 23A-D show the forepart 6 of a vessel 1 comprising a hull 2 and a body 4 according to a sixth embodiment of the invention with the body 4 completely submerged in a water mass when the vessel 1 is lying motionless. The position of the water surface 5 is indicated in FIGS. 23B and C. The body 4 is placed at a distance from the bow portion 3 such that passage 60 is formed between the body 4 and the bow portion 3. The body 4 comprises a leading edge 41, a trailing edge 42, a forward top surface 43, a contour line 53, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44, and the interfaces 54 indicate the boundary between the body's leading edge 41 and its trailing edge 42. The broken lines in FIG. 23A that indicate the body's trailing edge 42, the contour line 53 and the interfaces 55 and 56 are not visible from above, but are shown in order better to illustrate the configuration of the hull 2 and the body 4.

Figure 24:
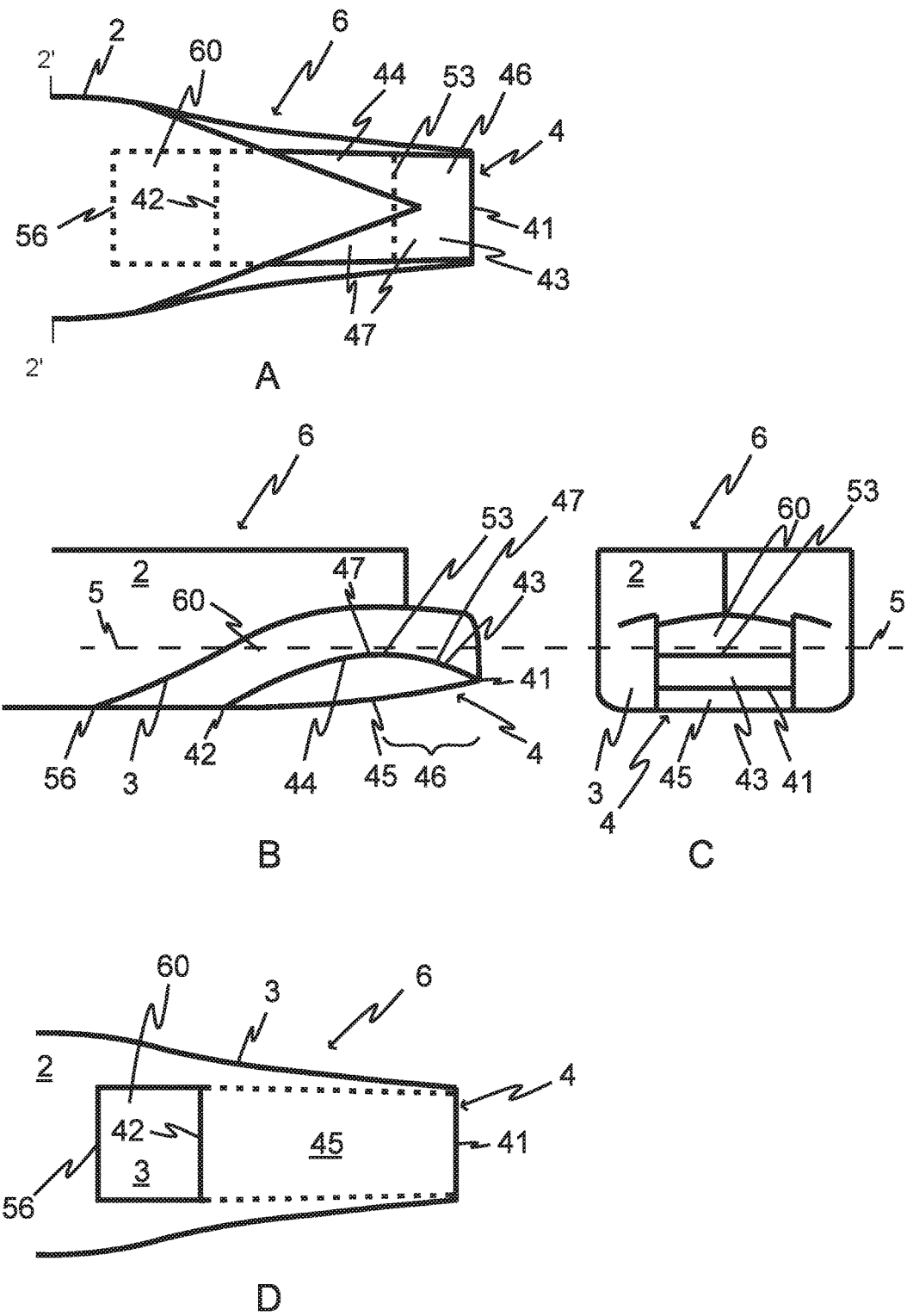
FIGS. 24A, B, C and D show the forepart of a vessel according to a seventh embodiment of the invention, where
FIG. 24B is a side view of the forepart.
FIG. 24C is a front view of the forepart and FIG. 24D is a bottom view of the forepart.

FIGS. 24A-D show the forepart 6 of a vessel 1 comprising a hull 2 and a body 4 according to a seventh embodiment of the invention. The model boat, described later in this document under the section entitled Model tests, is in Test C made according to this seventh embodiment; cf. FIGS. 17A and B. This embodiment combines the properties as described in the first embodiment with the properties of a pointed conventional bow. The position of the water surface 5 is indicated in FIGS. 24B and C. The body 4, seen from in front, does not in this embodiment extend out to the largest width 2' of the vessel 1. The body 4 is positioned at a distance from the bow portion 3 behind such that passage 60 is formed between the body 4 and the bow portion 3, as described in the first embodiment of the invention. The body 4 comprises a leading edge 41, a trailing edge 42, a forward top surface 43, a contour line 53, a rear top surface 44, an underside 45 and a forward part 46. The sum of the forward top surface 43 and the rear top surface 44 constitutes the body's top surface 47. The contour line 53 indicates the boundary between the forward top surface 43 and the rear top surface 44. The broken lines for the body's trailing edge 42, the passage 60, the contour line 53 and interfaces 56 in FIG. 24A are not visible from above, but are shown in order better to illustrate the configuration of the hull 2 and the body 4. Further, the broken lines in FIG. 24D mark the boundary between the body 4 and the hull 2.

In heavy sea, the top surface 47 of the body will flatten out oncoming waves and lead them under the hull 2 such that the bow portion 3 to a lesser extent encounters resistance from waves. It may therefore be advantageous with sufficient distance between the body's top surface 47 and the bow portion 3 to allow waves of a certain height to pass freely in the passage 60 between the top surface 47 of the body and the bow portion 3, and then be led under the hull 2.

Furthermore, it may be an advantage in a higher sea that the hull 2 is given a bow configuration as shown in FIGS. 23A-D and FIGS. 24A-D where oncoming high sea that cannot pass freely in the passage 60 between the body 4 and the bow portion 3 thus can as freely as possible be displaced laterally.

In a high sea slamming may also occur at the body's underside 45. To counteract this, the body's underside 45 can be made curved or V-shaped, seen from in front; cf. respectively FIGS. 14B-C and FIGS. 23B-C. Furthermore, the body's leading edge 41 can be rounded (cf. FIGS. 14A and D), or the body 4 can be made with a "sweep back" configuration; cf. FIGS. 23A-D. The body's 4 area at the underside may also be critical since smaller area can give less slamming. By positioning the body 4 deeper in the water mass, the body's underside 45 may also be less exposed to slamming.

Figure 25:
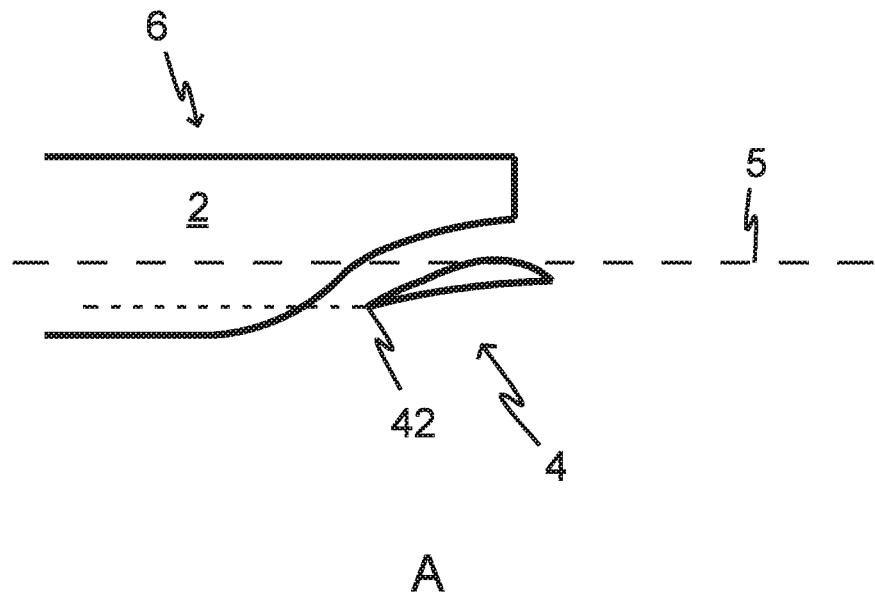
FIGS. 25A and B are side views of the forepart of a vessel according to the invention where the trailing edge of the body is located higher than the hull bottom and deeper than the hull bottom, respectively.
Figure 25:
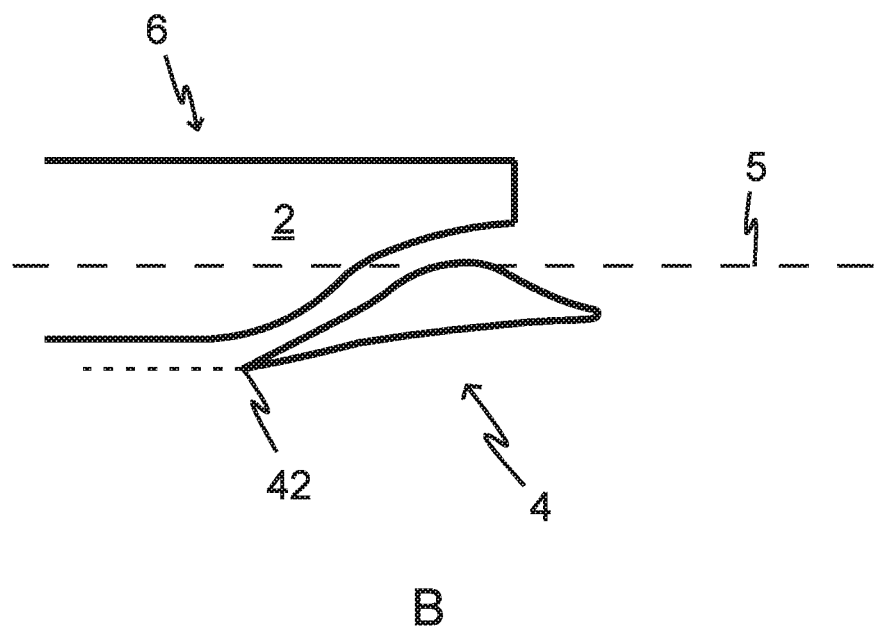

FIGS. 25A and B show the forepart 6 of a vessel 1 comprising a hull 2 and a body 4 according to the invention where the highest point of the body 4 is located at the water surface 5. The body's trailing edge 42 is located higher and lower than the hull 2 bottom, respectively. At low speed, it may be an advantage that the body's trailing edge 42 is located lower than the hull 2 bottom, in part because the turbulence problems that may arise when the water mass from the body's top surface 47 is to be led under the hull 2 will thus be smaller.

The body's 4 radius, seen in a vertical section in the vessel's 1 direction of travel, at the leading edge 41 of the body may be important for the body's 4 seagoing characteristics. If the radius of the body 4 here is unduly sharp, i.e., with small radius at the body's leading edge 41 (cf., e.g., FIGS. 26B, C and D), cavitation and turbulence may occur when the vessel 1 is at speed and/or is exposed to waves. A configuration of the body's leading edge 41 as shown in FIG. 26A may be more advantageous as regard cavitation. Furthermore, cavitation problems may occur if there are other areas on the top surface 47 and/or underside 45 with a small radius of curvature. By small here is meant substantially smaller than typical dimensions for the body 4, for example, a radius of curvature of less than 20% of the body's length.

Since a vessel 1 designed according to the invention has reduced wave resistance at increasing speed compared to a conventional vessel 1, and since the vessel's 1 wave resistance is less dependent on the length of the vessel 1, it may be advantageous to design the vessel 1 according to the invention with larger width and smaller length compared with a conventional vessel 1. A vessel 1 according to the invention with the same load capacity as a conventional vessel 1 can thus be less costly to build.

The top surface 47 of the body may have a single, double or triple curvature, as illustrated respectively in FIGS. 26A, B and C. The top surface 47 may also have one or more straight portions. Furthermore, the body's 4 contour line 53 can be moved forwards or backwards in the longitudinal direction of the body 4 with reference to what is shown in FIGS. 26A-D. The body 4 may have different profiles and profile thicknesses across the transverse extent of the body 4. The body's underside 45 can be straight (cf. FIG. 26B) or have a single curvature (cf. FIGS. 26A and D) or have a double curvature (cf. FIG. 26C). The body 4 can be made as one or more combinations of FIGS. 26A-D. However, the configurations shown in FIGS. 26A-D are not exhaustive as regards showing all possible configurations of the body 4.

If it is desirable to steer the water masses in towards the middle of the body 4, the body 4 can in an alternative embodiment be made with most fullness out towards the periphery of the body 4 in the transverse direction and least fullness about the centre axis, seen from in front.

Furthermore, the rear top surface 44 of the body can be made with a defined/marked trailing edge 42, for example, pointed or almost pointed, where the defined trailing edge 42 can be located lower than the body's leading edge 41.

The body's leading edge 41 seen from above can be made straight, concave, convex, "sweep back", "forward sweep" or a combination thereof. The same applies to the body's trailing edge 42. FIGS. 28A-J illustrate examples of these and show the body's top surface 47, seen from above. The arrow indicates the direction of flow of the water mass. The body's leading edge 41, trailing edge 42 and interface 54 are indicated. However, FIGS. 28A-J are not exhaustive as regards showing all possible configurations of the body 4.

The body's top surface 47 and underside 45 can be configured with a V or U shape, seen from in front, when the vessel 1 is lying motionless in order to be adapted for heeling. This will be particularly relevant for sailing boats.

The width of the body 4 seen from in front should normally be between 50 and 100% of the hull 2 width for the first, second, third, fourth, fifth and sixth embodiment. For the seventh embodiment, the width of the body 4 seen from in front can also be smaller than 50% of the width of the hull 2.

Seen from in front, the body 4 should preferably have a width/height ratio greater than 1.5.

Model Tests

To document the invention and its mode of action, and to verify change of resistance to forward movement, the inventor has carried out tests using a model boat.

To be able optimally to compare the resistance to forward movement for different configurations of the forepart 6 of a vessel 1, the model boat has interchangeable bow sections. It is thus easy to switch between different bow sections whilst the rest of the model boat has the same structure. Repeated runs can thus be carried out under otherwise identical conditions.

The model boat is radio-controlled using an electric propulsion engine. The battery is well dimensioned so that the voltage loss is insignificant. The propeller shaft of the model is mounted horizontally or close to horizontally, and is supported by simple brass bearings which does not absorb thrust forces. The propeller shaft mounted directly on the electric motor, which in turn is mounted in a carriage which rolls smoothly in the direction of the propeller shaft. The carriage does absorb the torsional moment of the propeller and the electric motor, but not the propellers thrust-forces. The carriage impinges a pressure sensor so that the propellers thrust-force in Newton [N] may be logged. When the model boat is driven with constant speed the thrust-force from the propeller is equal to the propulsion resistance of the model boat. The speed of the model boat is measured by a GPS logger. The test results of achieved speed [m/s] and the propulsion resistance [N] are for each of the three model tests plotted in FIG. 2 as tests A, B and C. Based on the length and speed of the model the models Froude number $[F_N]$ is also provided along the x axis. For each measuring point the average thrust-force is registered through a time period of 5-10 seconds and correspondingly plotted against the speed during the same time period.

Figure 16A:
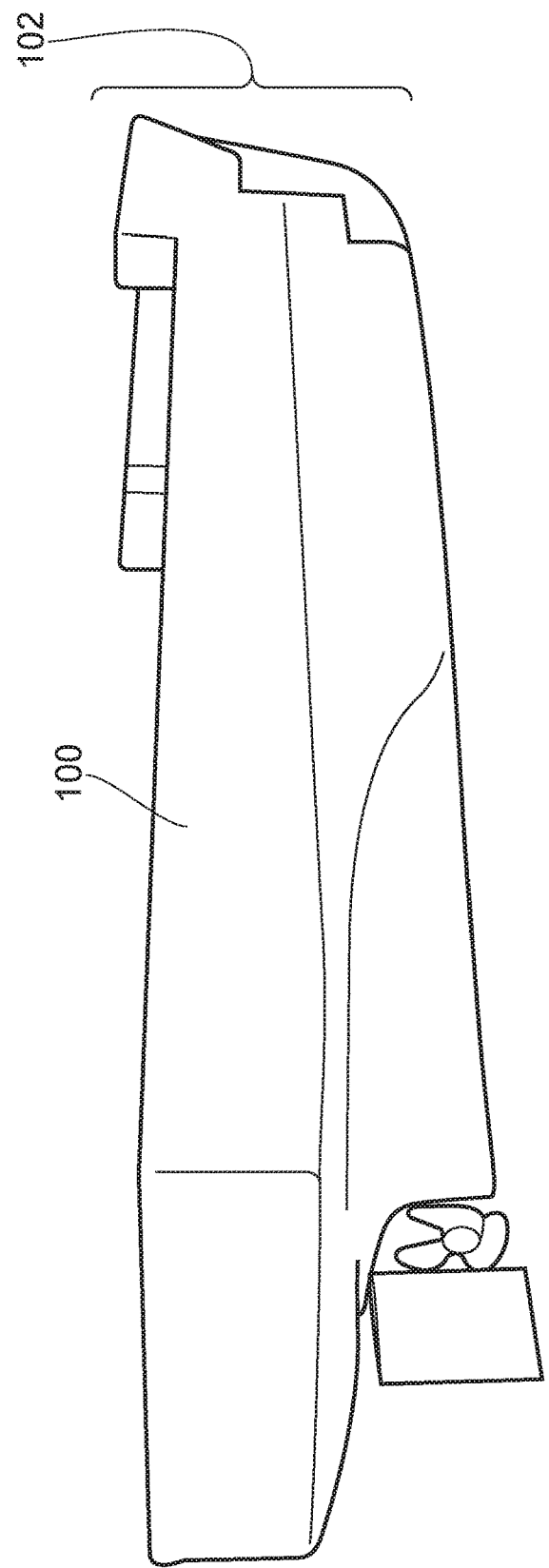
FIG. 16A shows a line drawing made to illustrate a photograph of a model boat used in model tests seen at an angle from astern, with a conventional bow according to the prior art.
Figure 16B:
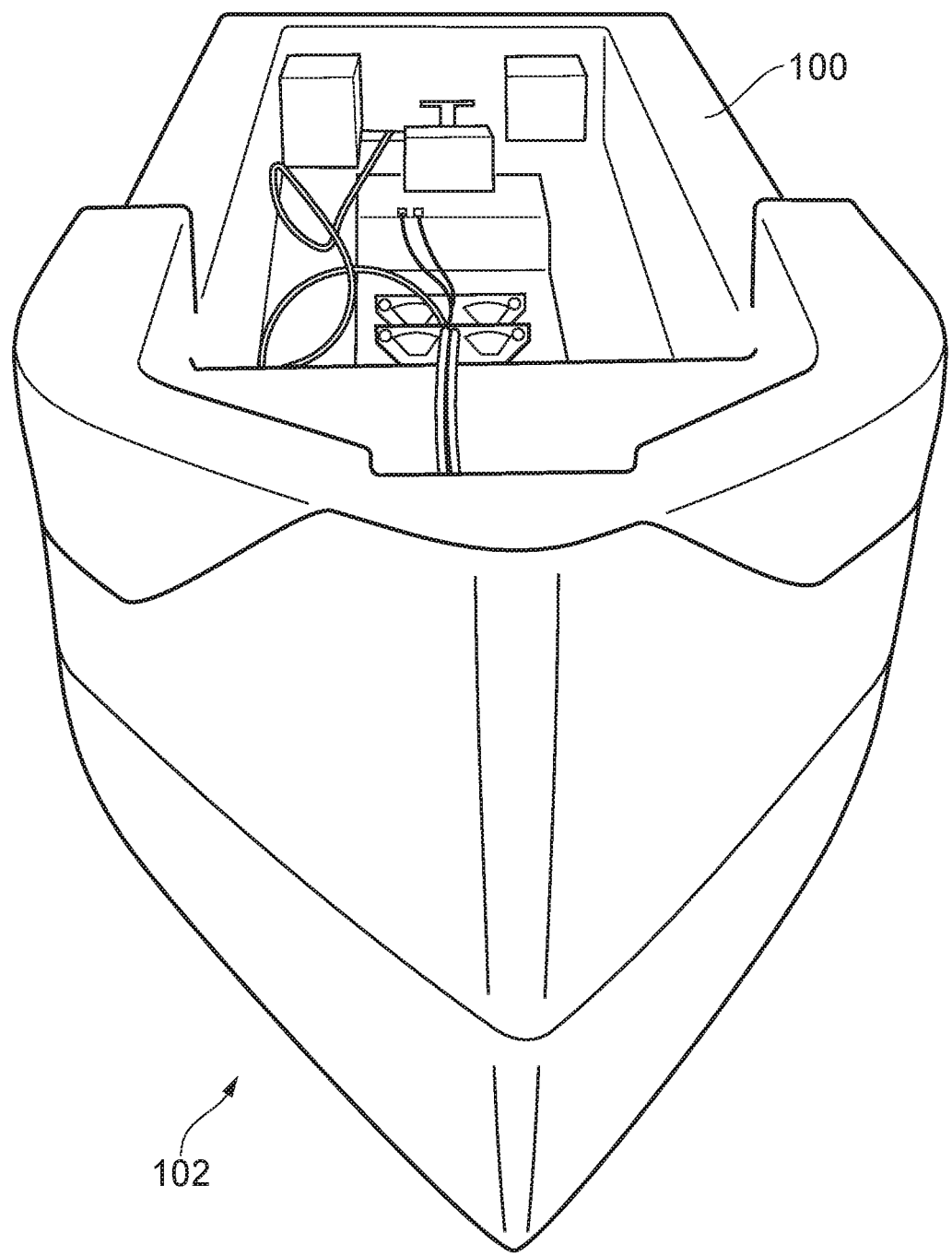
FIG. 16B shows a line drawing made to illustrate a photograph of a front view of the model boat in FIG. 16A.
Figure 16C:
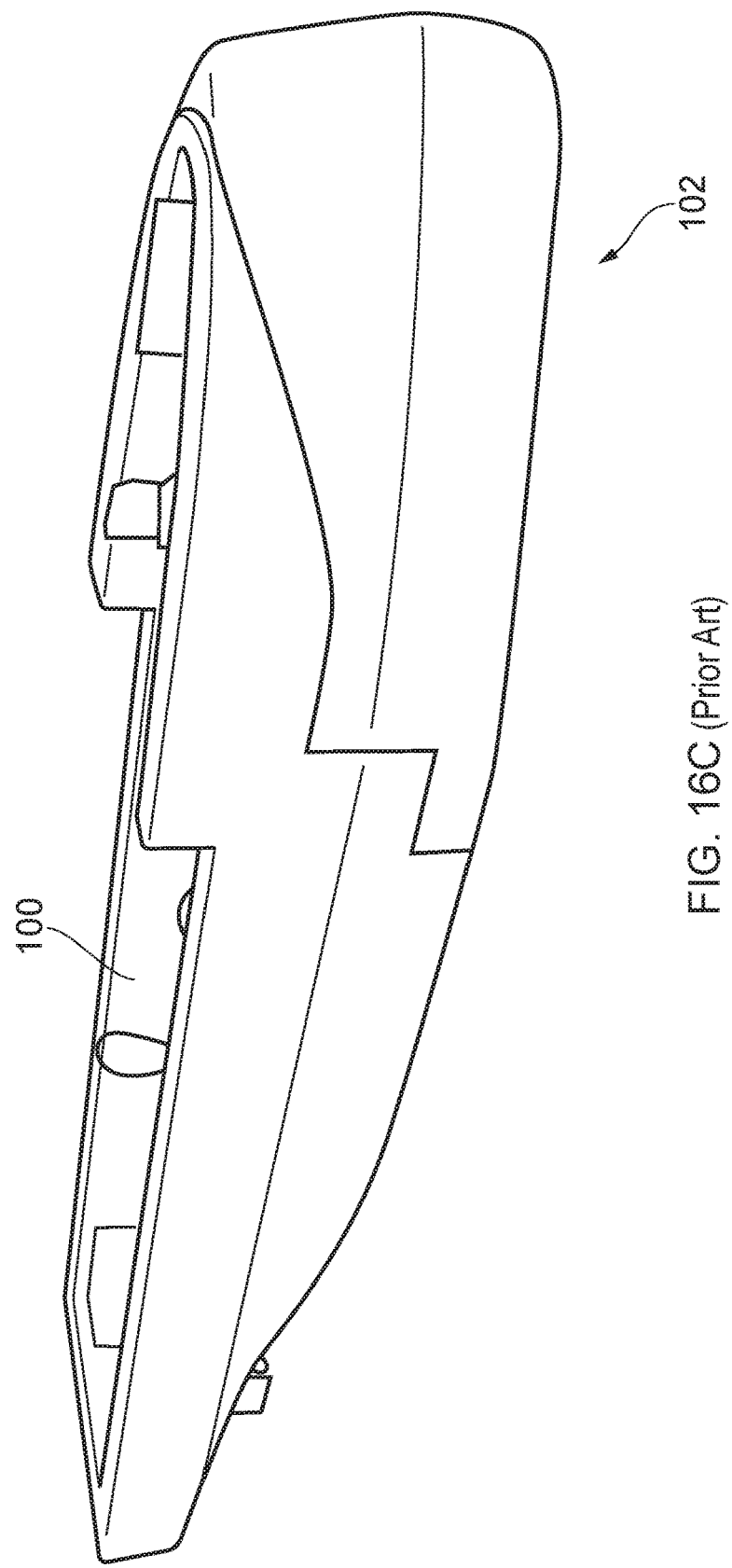
FIG. 16C shows a line drawing made to illustrate a photograph of a front oblique view of the model boat in FIG. 16A.

In Test A the model boat 100 is driven using a conventional bow configuration 102 according to the prior art, as shown in FIGS. 16A, B and C.

Figure 20B:
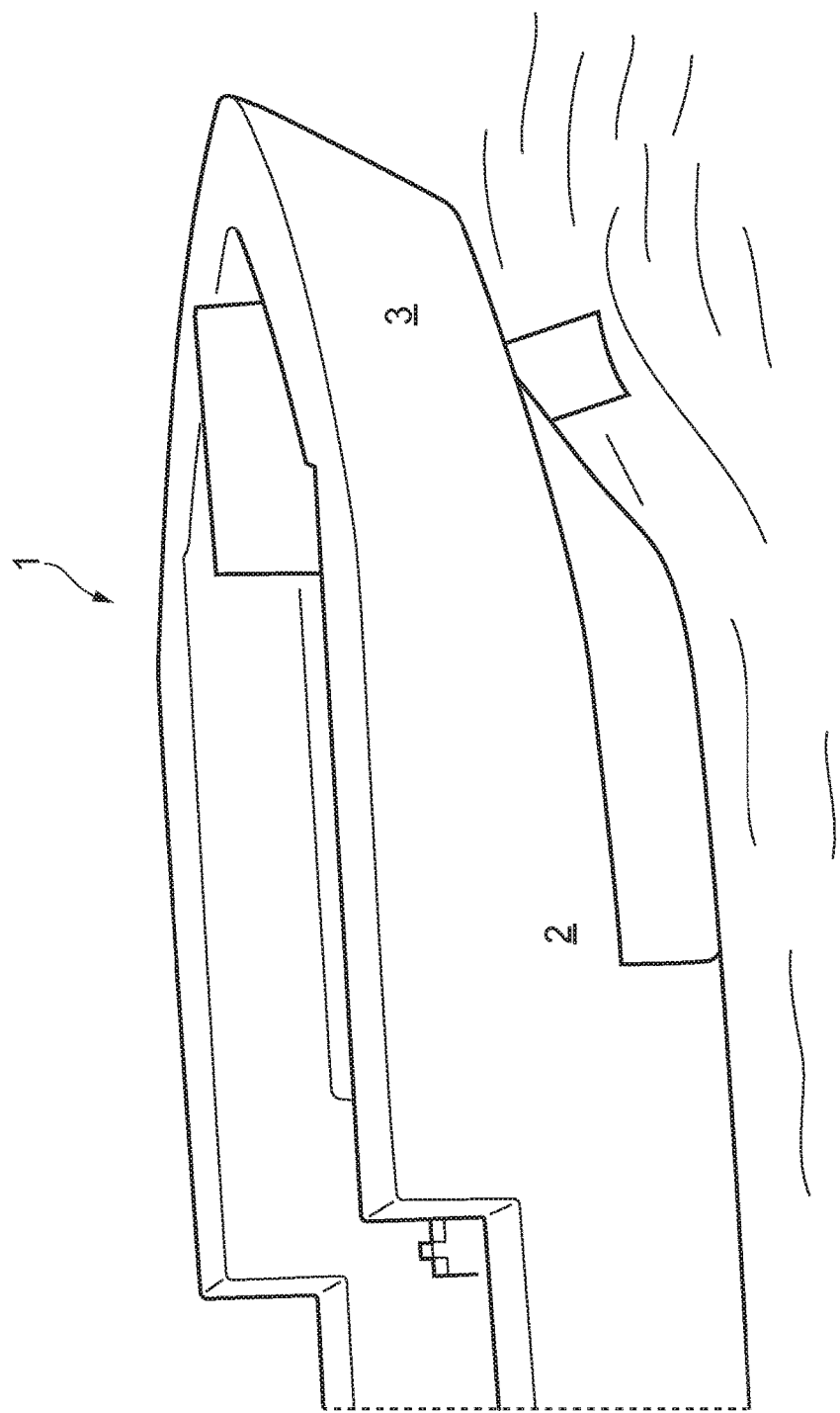
FIGS. 20A and B are line drawings made to illustrate photographs of the bow portion of the model boat with a modified bow according to the third embodiment of the invention, as shown in FIGS. 18A and B, but without a V-wedge.

In Test B the model boat is driven using a modified bow configuration according to the third embodiment of the invention without a V-wedge 65, as described earlier in this document. The bow sections in Test B is the same as shown in FIGS. 18A and B with the exception that the modified bow configuration in FIGS. 18A and B is shown with a V-wedge 65. The body 4 is in Test B secured to the model boat using a thin plate, as can be seen in FIG. 20A.

In Test C the model boat is driven using a modified bow configuration according to the seventh embodiment of the invention as shown in FIGS. 17A and B, and as described earlier in this document, cf. FIGS. 24A, B, C and D.

The model boat with a conventional bow in Test A is built as a typical displacement hull. The model has a maximum length of 154 cm and a width of 33 cm. The transition between the model boat's hull sides and bow area 3 is about 115 cm from the stern of the model boat. During the model tests the model boat weighed 34.5 kg, which gave a draft of about 9.7 cm. The model boat was trimmed such that it had almost neutral trim when it lay motionless and floated in the water. Neutral trim means to say that the model boat is oriented such that the bottom of the model boat is parallel to the water surface 5.

The model boat in Tests B has a maximum length of 153.5 cm. The width, weight and trim of the model are otherwise unchanged from Test A. The draft of the model boat was about 10.2 cm. The maximum width of the body 4, seen from in front, is 33.0 cm and the body's 4 maximum length, seen from the side, is 31.0 cm. The maximum vertical thickness of the body 4 is 8.0 cm and is located about 13 cm from the foremost point on the body's leading edge 41. The body's trailing edge 42 is positioned 1.0 cm above the bottom of the model boat. The foremost point on the body's leading edge 41 in the vessel's 1 direction of travel is located 4.9 cm higher than the bottom of the model boat. The curvature in the transition between the model boat's bottom and the bow area 3 has a radius of about 15.0 cm. The distance of the passage 60 between the body's trailing edge 42 and the hull 2, measured in the horizontal plane, is about 11.0 cm. The distance of the passage 60 between the body's top surface 47 and the hull 2, measured perpendicular to the body's top surface 47 is about 6.0 cm. The radius of the curvature in the transition between the sides of the model boat and the bow area 3 is about 5.5 cm.

The model boat in Test C has a maximum length of 154 cm. The width, weight and trim of the model are otherwise unchanged from Test A. The draft of the model boat was about 9.8 cm. The width of the body 4, seen from in front, is 16 cm and the body's 4 length, seen from the side, is 26.5 cm. The body's 4 maximum vertical thickness is 4.0 cm and is located 12 cm from the body's leading edge 41. The trailing edge 42 of the body is located at the same height as the model boat's bottom. The foremost point on the body's leading edge 41 is located 4.7 cm higher than the model boat's bottom. The curvature between the model boat's bottom and the bow area 3 forming the passage 60 has a radius of about 10 cm. The distance of the passage 60 between the body's trailing edge 42 and the hull 2, measured in the horizontal plane is about 7.0 cm. The distance of the passage 60 between the body's top surface 47 and the hull 2, measured perpendicular to the body's top surface 47, is about 8 cm. The transition between the model boat's hull sides and the bow area 3 is about is about 110 cm from the stern of the model boat, where the bow area 3 begins with a convex shape and then a concave shape as can be seen in FIG. 17A.

Figure 1:
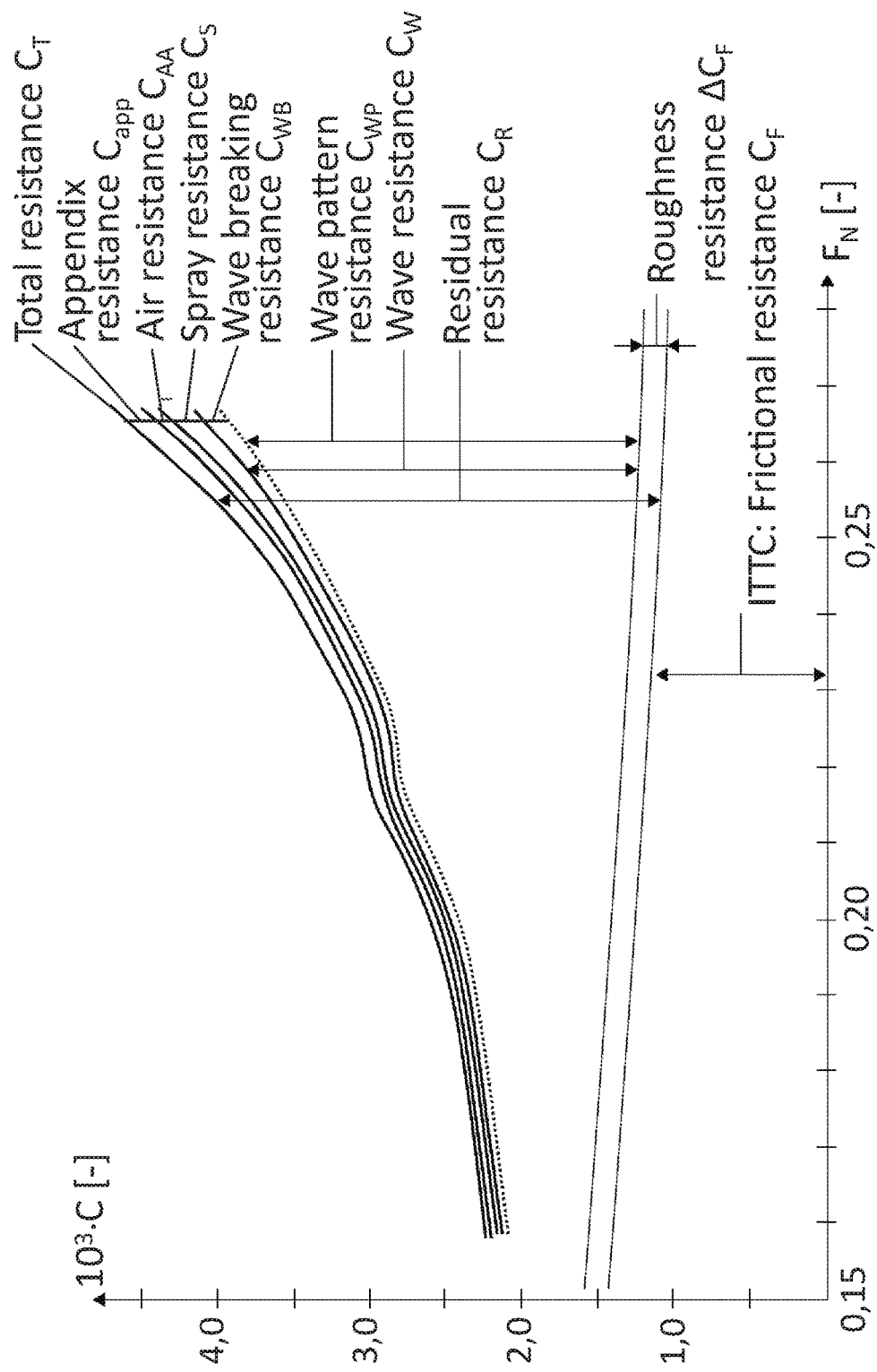
FIG. 1 is a graph indicating the different resistance coefficients as a function of Froude's number $[F_N]$ which act on a typical prior art vessel moving at the surface of a water mass.
Figure 2:
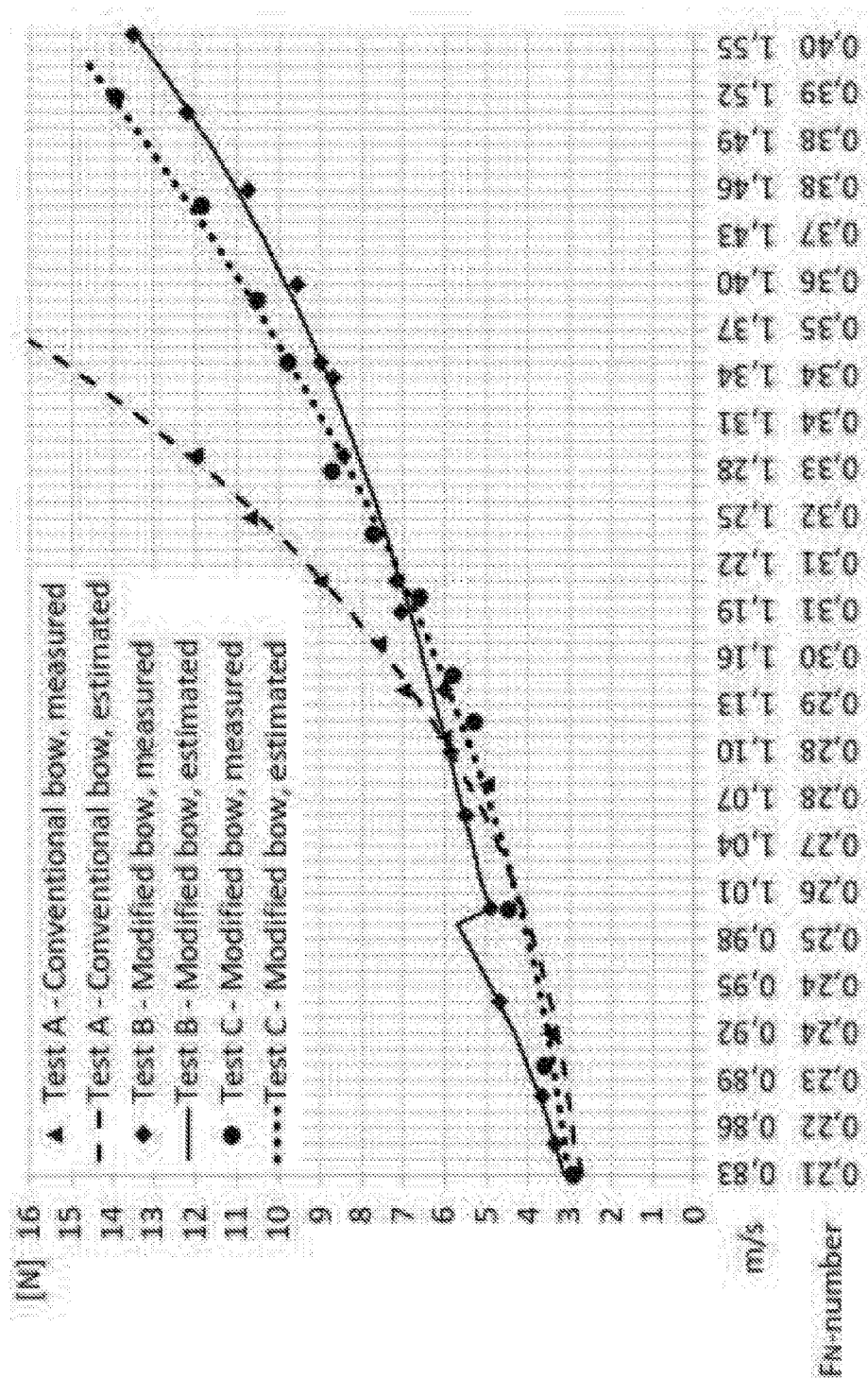
FIG. 2 is a graph indicating the resistance to forward movement as a function of speed for model tests that use:
  A: a vessel with a conventional bow according to the prior art;
  B: a vessel with a modified bow according to a third embodiment of the invention without a V-wedge; and
  C: a vessel with a modified bow according to a seventh embodiment of the invention without a V-wedge.
Figure 3:
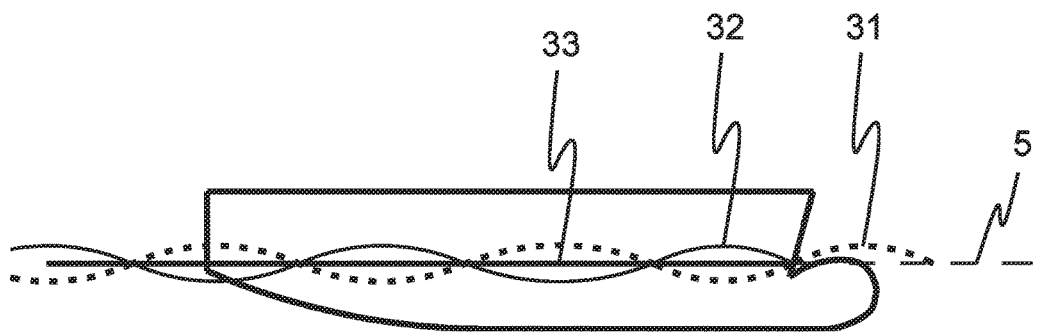
FIG. 3A is a side view of a vessel with a bulb according to the prior art.
FIG. 3B is a side view of the vessel according to FIG. 3A.
Figure 3:
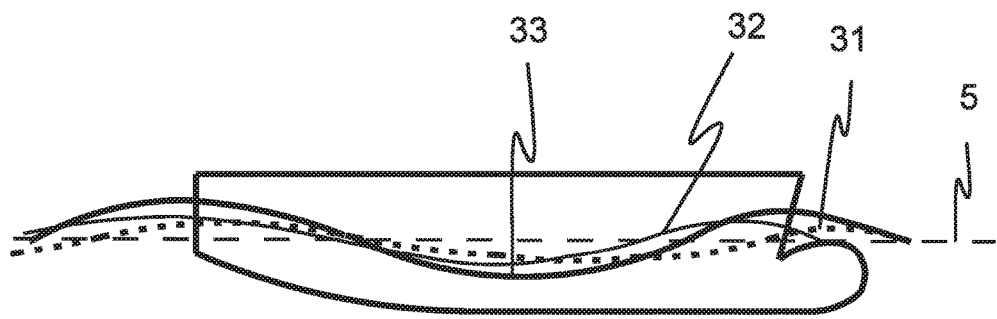
Figure 4:
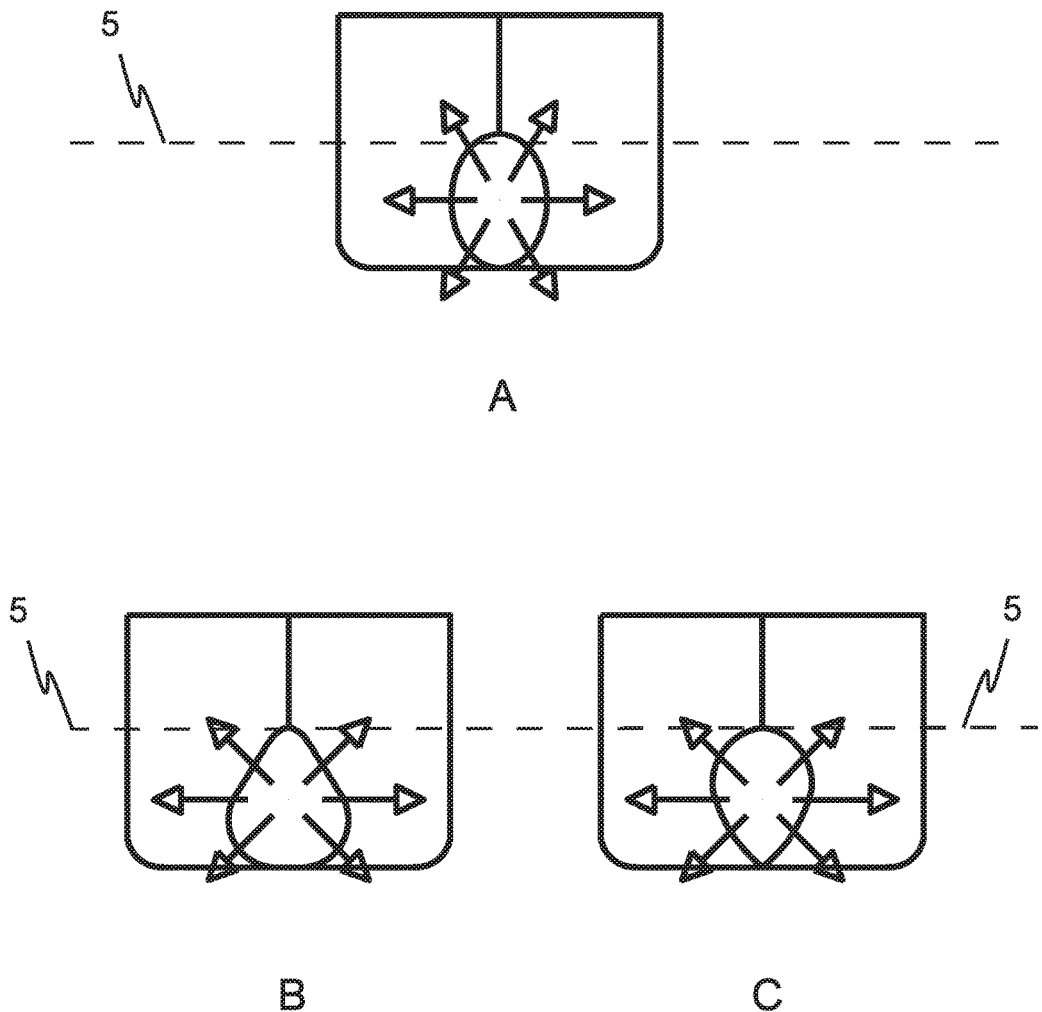
FIGS. 4A, B and C are front views of a prior art vessel with different bulb shapes, showing how the bulb shapes displace oncoming water masses.
Figure 5:
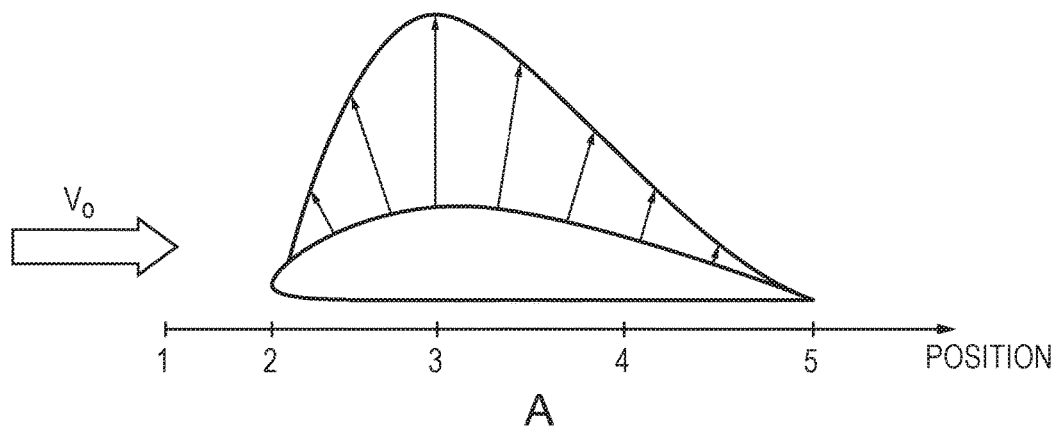
FIG. 5A is an illustration of a foil profile showing a typical underpressure distribution above its top surface when fully submerged and when a mass of water is flowing toward and across the foil with an initial velocity $V_0$ in the direction of the double lined arrow.
FIG. 5B is a graph illustrating the corresponding velocity distribution of a water mass passing the top surface of the foil profile having the underpressure distribution shown in FIG. 5A.
Figure 5:
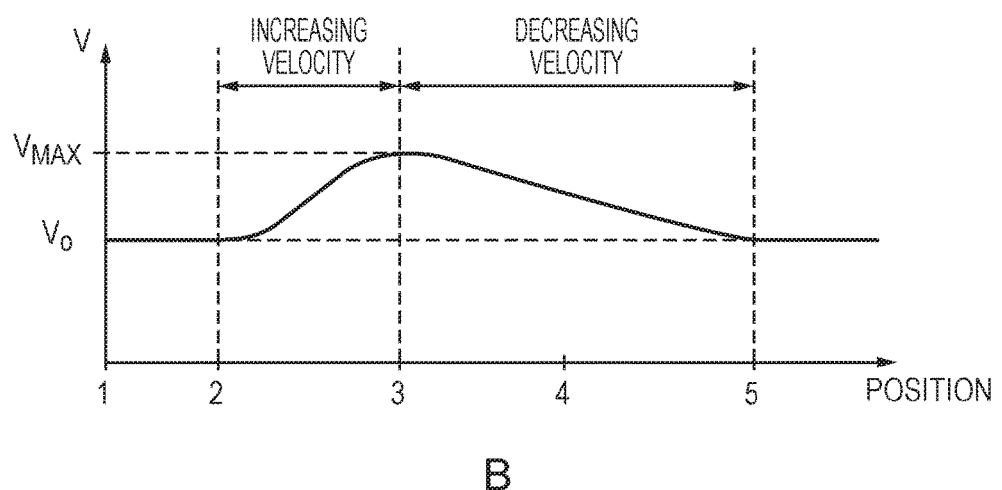
Figure 6:
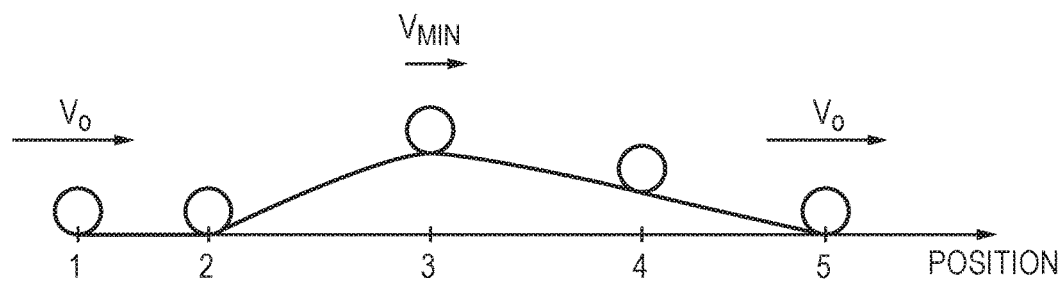
FIG. 6A is an illustration showing the velocity vectors of a ball rolling in air over a profile similar to the foil profile shown in FIG. 5A.
FIG. 6B is a graph illustrating the velocity of the ball rolling in air shown in FIG. 6A at different positions along the profile.
Figure 6:
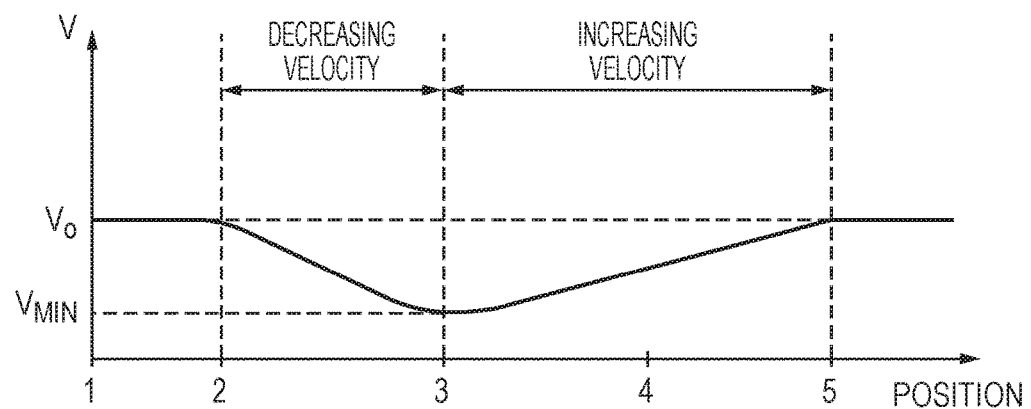
Figure 7:
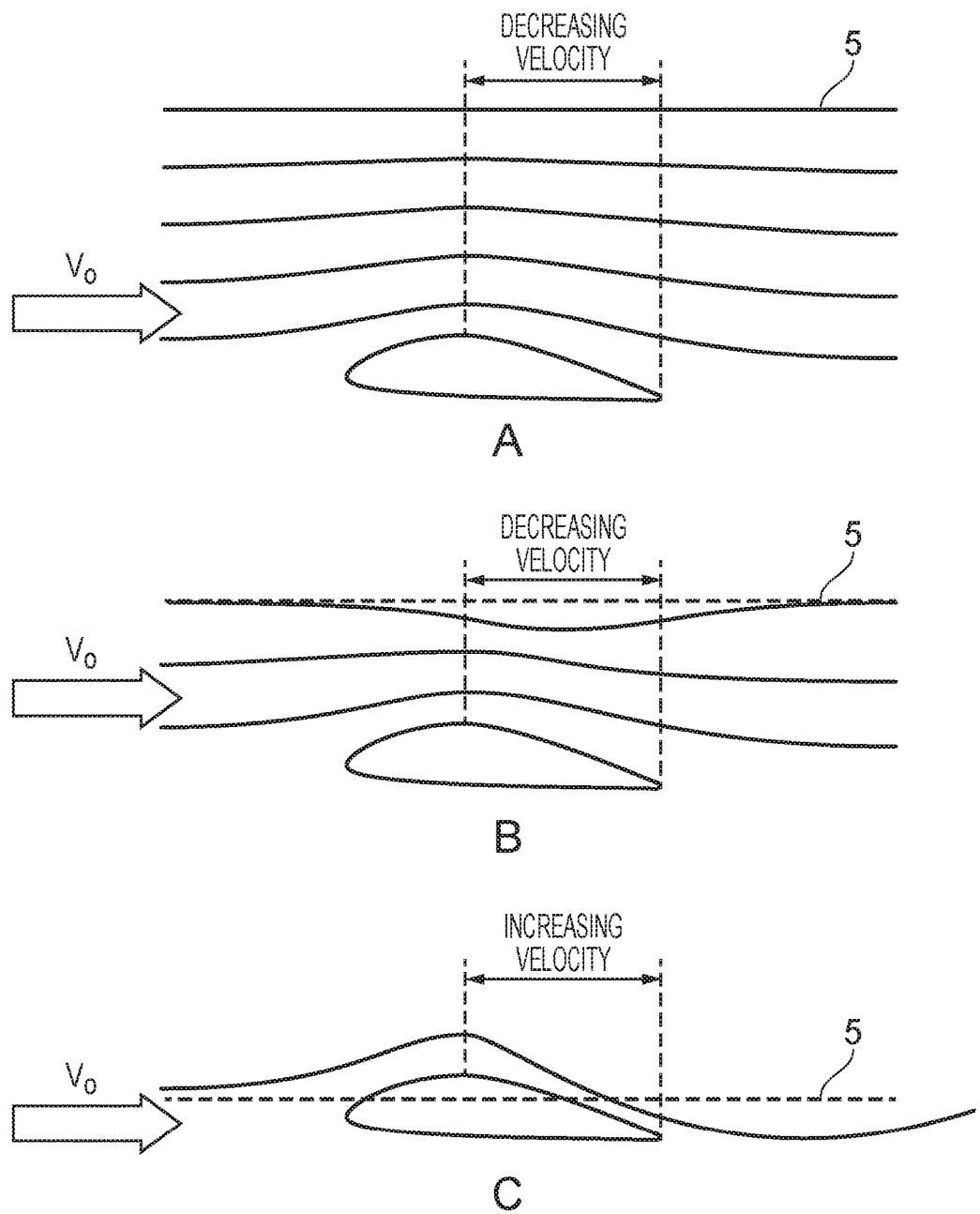
FIGS. 7A, B and C show a body, having the same angle of attack, and the resulting flow pattern of water flowing towards and above the body in the direction of the double-lined arrow when the body is located at different depths under the water surface.
FIG. 7B shows the flow pattern when the body is located at an intermediate depth and FIG. 7C shows the flow pattern when the body is located close to or at the water surface.
Figure 8:
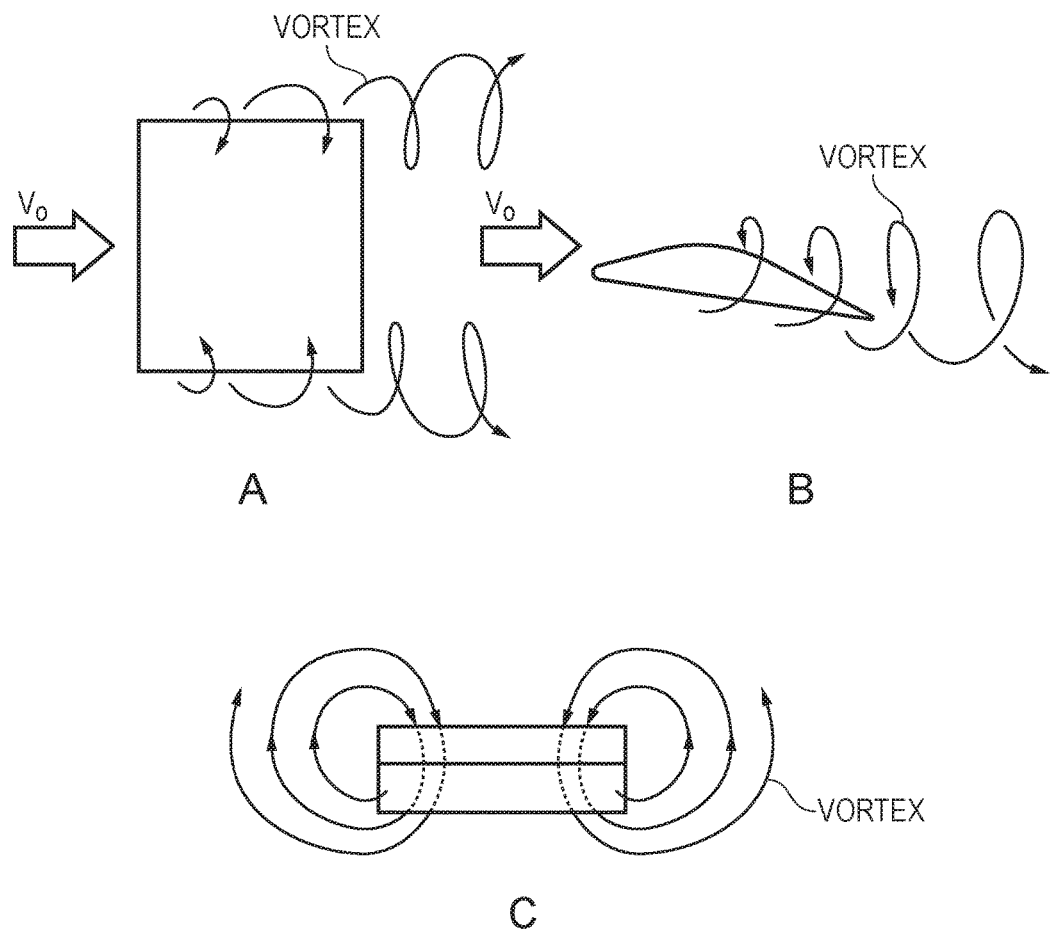
FIGS. 8A, B and C is showing a foil seen from above, from the side and from in front respectively. A water mass is flowing towards the foil in the direction of the double lined arrow. The curved arrows are illustrating the vortex generated at each side of the foil.

As can be seen from the estimated curves in FIG. 2, the modified bow in Test B has lowest resistance to forward movement at speeds above about 1.23 m/s, whilst the modified bow in Test C gives lower resistance to forward movement in the speed range between about 1.03 m/s and 1.23 m/s. The propulsion resistance for the conventional bow in Test A is lower than the two alternatives with modified bow below about 1.03 m/s FIGS. 19A, B and C show photographs taken during model tests. FIG. 19A is taken when the model is fitted with the conventional bow configuration as in Test A, whilst FIGS. 19B and C are taken when the model is fitted with the modified bow configuration, as in Test B. Measured speed for FIGS. 19A, B and C is respectively 1.25 m/s, 1.25 m/s and 1.34 m/s. It is shown visually in FIGS. 19A, B and C that the wave formation from the model with a modified bow according to the invention is substantially smaller than the same model with a conventional bow configuration.

From the estimated curves in FIG. 2 at a speed of 1.25 m/s, which is the speed of the model boat in FIGS. 19A and B, it can be read that the model boat with a conventional bow configuration in Test A is given about 38.3% more propulsion resistance than the model boat with a modified bow in Test B (the estimated propulsion resistance is respectively 10.44 N and 7.55 N).

If the model boat is scaled up 50 times, a full-scale ship will be obtained that is 77 meters long. A speed of the model boat of 1.25 m/s will correspond to a speed of 8.84 m/s for the full-scale ship by using the equation (1) given above, corresponding to 17.2 knots. At this speed, the model test indicates that the full-scale ship built with a conventional bow according to the model used in Test A will be given 47.1% more propulsion resistance than the full-scale ship built with a modified bow according to the model used in Test B (the calculated propulsion resistance is respectively 1,158 KN and 787 KN). The measurement data were translated from the model to full scale according to procedure described by Håvard Holm and Sverre Steen—Motstand og framdrift—NTNU (Norway). It is assumed that the model boat with conventional and with modified bow will have a wetted surface of $S_m$=0.71 m$^2$, and further that both will have a length in the water line $L_{vl,m}$=1.54 m.

In the preceding description, different aspects of the vessel according to the invention have been described with reference to the illustrative embodiments. For the purpose of providing a thorough understanding of the vessel and it's mode of operation, explanations, specific numbers, systems and configurations have been presented. However, this description is not intended to be interpreted in a limiting manner. Different modifications and variations of the illustrative embodiments, as well as other embodiments of the vessel that will be obvious to those of skill in the art regarding the described content, will be within the scope of the present invention.

The invention claimed is:

1. A vessel comprising
   a. A hull with a bow portion defined as a portion of the hull below a water line and forward of a widest part of the hull, the bow portion having a bow area defined as a cross sectional area of a cross section through the widest part of the hull as seen from in front below a water line when the vessel is lying motionless and is floating in a mass of water without payload and without ballast, said vessel having a deepest draft defined as a vertical distance between the water line and a lowest point of the hull,
   b. A body arranged either as a forward protrusion of the bow portion, or arranged separate from and at a distance forward of the bow portion, the body comprising a leading edge, a trailing edge located downstream of the leading edge, an underside and a top surface, said body having a maximum horizontal width, a highest point in the vertical direction located intermediate the leading edge and the trailing edge, and a maximum height (H) defined as a vertical distance between said highest point and a lowest point of the body,
   c. Wherein, when seen from in front of the vessel, the body has a projected two dimensional body area, the projected two dimensional body area defined by the body's maximum horizontal width as seen from in front, the maximum height (H) of the body as seen from in front, and one or more contour lines corresponding to the underside and top surface of the body as seen from in front,
   d. Wherein said projected two dimensional body area is equal to 20% or more of a part of the bow area, said part of the bow area being located between two vertical planes in the longitudinal direction of the vessel, the two planes spaced apart at a distance corresponding to the maximum horizontal width of the body,
   e. Wherein said top surface slopes away from the highest point to the trailing edge, and wherein the top surface of the body is configured to direct oncoming water away from the bow portion or parallel to the bow portion when the vessel is in motion, and
   f. Wherein the maximum height (H) of the body is equal to at least 40% of the hull's deepest draft when the vessel is neutrally trimmed and loaded with 10% of the vessel's maximum payload.

2. A vessel according to claim 1, wherein a forward part of the top surface is arranged such that water flowing over the forward part of the top surface obtains a laminar flow, and wherein the top surface of the body from the body's highest point to the trailing edge is arranged to accelerate oncoming water over the top surface in a downward direction under an influence of gravity.

3. A vessel according to claim 1 or 2 wherein the trailing edge of body has a maximum thickness that is less than 5% of the body's maximum thickness.

4. A vessel according to claim 1 or 2 wherein the maximum horizontal width of the body divided by the maximum vertical height of the body has a ratio of between 1.5 to 8.0.

5. A vessel according to claim 1 or 2 wherein the top surface of the body, seen in a longitudinal vertical cross section, comprises a convex portion that constitutes more than 10% of the body's top surface.

6. A vessel according to claim 1 or 2 wherein the body is arranged to lift more than 20% of an oncoming water mass flowing over the body above the waterline when the vessel is in motion.

7. A vessel according to claim 1 or 2, wherein the maximum horizontal width of the body is at the leading edge.

8. A vessel according to claim 1 or 2 wherein the body has a shape of a hydrofoil.

9. A vessel according to claim 1 or 2, wherein the body is arranged as an incorporated, forward projecting part of the bow portion, and wherein oncoming water is directed away from the bow area due to a portion of the top surface of the body sloping away from a centerline of the body to outer edges of the body, at an angle of attack sufficient to direct the oncoming water away from the bow area.

10. A vessel according to claim 1 or 2, wherein the body is mounted on one or more brackets forward of the bow portion, creating a passage between the bow portion and the body, and wherein oncoming water is directed away from the bow area by being directed under the hull via said passage.

11. A vessel according to claim 10 wherein the portion of the top surface that slopes to the outer edges comprises at least 20% of the length of the body.

12. A vessel according to claim 10, wherein the body is configured such that more than 20% of oncoming water which passes over the top surface of the body is directed downward under the hull.

* * * * *